US006819439B2

(12) United States Patent
Hayashi et al.

(10) Patent No.: US 6,819,439 B2
(45) Date of Patent: *Nov. 16, 2004

(54) IMAGE FORMING APPARATUS INCLUDING AN IMAGE SEPERATION UNIT

(75) Inventors: Koji Hayashi, Kanagawa (JP); Kazumi Kuwata, Tokyo (JP)

(73) Assignee: Ricoh Company, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/058,199

(22) Filed: Apr. 10, 1998

(65) Prior Publication Data

US 2001/0048530 A1 Dec. 6, 2001

(30) Foreign Application Priority Data

| Apr. 10, 1997 | (JP) | 9-133032 |
| May 2, 1997 | (JP) | 9-114838 |
| May 6, 1997 | (JP) | 9-132908 |
| Aug. 8, 1997 | (JP) | 9-215252 |
| Mar. 27, 1998 | (JP) | 10-80982 |

(51) Int. Cl.$^7$ .............. G03F 3/00; H04N 1/00; G06K 15/00
(52) U.S. Cl. ............ 358/1.13; 358/1.15; 358/505; 358/474; 358/2.1; 358/519; 358/521; 382/169
(58) Field of Search ............ 358/1.1–1.9, 1.11–1.18, 358/2.1, 505, 521, 3, 474, 519, 3.01–3.09, 3.11–3.19, 3.1, 3.2, 3.21–3.24, 3.26, 3.27; 715/515, 520, 521; 382/169

(56) References Cited

U.S. PATENT DOCUMENTS

| 4,742,041 | A | * | 5/1988 | Ikeda et al. ............ 503/200 |
| 4,958,221 | A | * | 9/1990 | Tsuboi et al. ............ 358/538 |
| 5,113,251 | A | * | 5/1992 | Ichiyanagi et al. ............ 358/75 |
| 5,194,946 | A | * | 3/1993 | Morikawa et al. ............ 358/75 |
| 5,831,626 | A | * | 11/1998 | Sano et al. ............ 345/431 |
| 5,910,849 | A | * | 6/1999 | Tamagaki ............ 358/442 |
| 5,974,171 | A | * | 10/1999 | Hayashi et al. ............ 382/162 |
| 5,977,985 | A | * | 11/1999 | Ishii et al. ............ 345/433 |
| 5,999,191 | A | * | 12/1999 | Frank et al. ............ 345/435 |
| 6,008,812 | A | * | 12/1999 | Ueda et al. ............ 345/418 |
| 6,021,256 | A | * | 2/2000 | Ng et al. ............ 358/1.9 |
| 6,026,182 | A | * | 2/2000 | Lee et al. ............ 382/173 |
| 6,026,416 | A | * | 2/2000 | Kanerva et al. ............ 707/515 |

FOREIGN PATENT DOCUMENTS

| EP | 0 313 796 | 5/1989 |
| EP | 0 665 675 | 8/1995 |
| JP | 1-232878 | 9/1989 |
| JP | 5-130640 | 5/1993 |
| JP | 6-86068 | 3/1994 |
| JP | 6-334854 | 12/1994 |
| JP | 8-58158 | 3/1996 |

* cited by examiner

*Primary Examiner*—King Y. Poon
(74) *Attorney, Agent, or Firm*—Oblon, Spivak, McClelland, Maier & Neustadt, P.C.

(57) ABSTRACT

In an image forming apparatus having a particular area setting unit for setting an arbitrary area of a document image as a particular area, an image processing unit (scanner/IPU section) receives, when a particular area is specified, image data for the particular area, and generates a plurality of monitor image data having been subjected to image processing by setting a different image quality mode for each particular area, and further an image forming unit (printer section) receives the plurality of monitor image data and forms a plurality of monitor images on the same transfer material by arranging the monitor images at different positions on the transfer material.

5 Claims, 53 Drawing Sheets

FIG.11

| INK JET MODE | MANUFACTURER OF PRINTER | RESOLUTION OF DOCUMENT | RESULT OF IMAGE SEPARATION | TYPE OF COLOR CORRECTION COEFFICIENT | SPACE FILTER COEFFICIENT | YMCK GRADATION CORRECTION TABLE | GRADATION PROCESSING |
|---|---|---|---|---|---|---|---|
| 1 | COMPANY A | FINE | USED | 4-COLOR INK A | WEAKLY SMOOTHING | 4-COLOR INK | DITHER 1 |
| 2 | COMPANY A | FINE | USED | 6-COLOR INK A | WEAKLY SMOOTHING | 6-COLOR INK | DITHER 1 |
| 3 | COMPANY A | ROUGH | NOT USED | 4-COLOR INK A | THROUGH | 4-COLOR INK | DITHER 2 |
| 4 | COMPANY B | FINE | USED | 4-COLOR INK B | WEAKLY SMOOTHING | 4-COLOR INK | DITHER 1 |
| 5 | COMPANY B | A LITTLE ROUGH | USED | 6-COLOR INK B | STRONGLY SMOOTHING | 6-COLOR INK | ERROR DIFFUSION |
| 6 | COMPANY B | ROUGH | NOT USED | 4-COLOR INK B | THROUGH | 4-COLOR INK | DITHER 1 |
| 7 | COMPANY C | FINE | USED | 4-COLOR INK C | WEAKLY SMOOTHING | 4-COLOR INK | DITHER 1 |
| 8 | COMPANY C | ROUGH | NOT USED | 4-COLOR INK C | STRONGLY SMOOTHING | 4-COLOR INK | DITHER 1 |

FIG.16

| IMAGE QUALITY MODE | PEN AS OBJECT | RESOLUTION OF DOCUMENT | RESULT OF IMAGE SEPARATION | TYPE OF COLOR CORRECTION COEFFICIENT | SPACE FILTER COEFFICIENT | YMCK GRADATION CORRECTION TABLE | GRADATION PROCESSING |
|---|---|---|---|---|---|---|---|
| CHARACTER | OTHER THAN FLUORESCENT PEN | ORDINAL | USED | FOR CHARACTER | THROUGH | FOR CHARACTER | THROUGH |
| FLUORESCENT PEN 1 | FLUORESCENT PEN, MARKER PEN, COLORED PENCIL | ORDINAL | USED | FOR FLUORESCENT PEN 1 | THROUGH | FOR FLOURSCENT PEN | THROUGH |
| FLUORESCENT PEN 2 | FLUORESCENT PEN NOT AVAILABLE AS FLUORESCENT PEN 1 | ORDINAL | USED | FOR FLUORESCENT PEN 2 | THROUGH | FOR FLOURSCENT PEN | THROUGH |

FIG.17

| IMAGE QUALITY MODE | MANUFACTURER OF DOCUMENT PREPARED WITH TONER | RESOLUTION OF DOCUMENT | RESULT OF IMAGE SEPARATION | TYPE OF COLOR CORRECTION COEFFICIENT | SPACE FILTER COEFFICIENT | YMCK GRADATION CORRECTION TABLE | GRADATION PROCESSING |
|---|---|---|---|---|---|---|---|
| PRINTED PICTURE DOCUMENT MODE | FOR PRINTING INK | MORE THAN 100 LINES | FOR HALF TONE AREA | FOR PRINTING INK | SMOOTHING FOR PRINTING | FOR PRINTING INK | DITHER FOR PICTURE MODE |
| COPIED DOCUMENT MODE 1 | TONER OF MAKER A | 400DPI | FOR COPIED DOCUMENT | A FOR TONER | SMOOTHING FOR COPIED DOCUMENT 1 | FOR COPIED DOCUMENT | DITHER FOR PICTURE MODE |
| COPIED DOCUMENT MODE 2 | TONER OF MAKER B | 400DPI | FOR COPIED DOCUMENT | B FOR TONER | SMOOTHING FOR COPIED DOCUMENT 1 | FOR COPIED DOCUMENT | DITHER FOR PICTURE MODE |
| COPIED DOCUMENT MODE 3 | TONER OF MAKER C | 600DPI | FOR COPIED DOCUMENT | C FOR TONER | SMOOTHING FOR COPIED DOCUMENT 2 | FOR COPIED DOCUMENT | DITHER FOR PICTURE MODE |
| COPIED DOCUMENT MODE 4 | TONER OF MAKER D | 400DPI | FOR COPIED DOCUMENT | D FOR TONER | SMOOTHING FOR COPIED DOCUMENT 1 | FOR COPIED DOCUMENT | DITHER FOR PICTURE MODE |
| COPIED DOCUMENT MODE 5 | TONER OF MAKER E | 400DPI | FOR COPIED DOCUMENT | E FOR TONER | SMOOTHING FOR COPIED DOCUMENT 1 | FOR COPIED DOCUMENT | DITHER FOR PICTURE MODE |

FIG.18

| IMAGE QUALITY MODE | MANUFACTURER OF DEVELOPMENT PAPER | RESOLUTION OF DOCUMENT | RESULT OF IMAGE SEPARATION | TYPE OF COLOR CORRECTION COEFFICIENT | SPACE FILTER COEFFICIENT | YMCK GRADATION CORRECTION TABLE | GRADATION PROCESSING |
|---|---|---|---|---|---|---|---|
| SILVER-SALT PICTURE MODE 1 | COMPANY A | HIGH RESOLUTION | FOR DEVELOPMENT PAPER | A FOR DEVELOPMENT PAPER | FOR DEVELOPMENT PAPER | FOR DEVELOPMENT PAPER | DITHER FOR PICTURE MODE |
| SILVER-SALT PICTURE MODE 2 | COMPANY B | HIGH RESOLUTION | FOR DEVELOPMENT PAPER | B FOR DEVELOPMENT PAPER | FOR DEVELOPMENT PAPER | FOR DEVELOPMENT PAPER | DITHER FOR PICTURE MODE |
| SILVER-SALT PICTURE MODE 3 | COMPANY C | HIGH RESOLUTION | FOR DEVELOPMENT PAPER | C FOR DEVELOPMENT PAPER | FOR DEVELOPMENT PAPER | FOR DEVELOPMENT PAPER | DITHER FOR PICTURE MODE |

FIG.29

SELECTION OF IMAGE QUALITY MODE [SETTING]

SELECT AN IMAGE QUALITY MODE FOR WHICH DEFAULT SETTING IS USED
(SELECTED NUMBER)/(NUMBER OF CHOICE)

| | | | | | |
|---|---|---|---|---|---|
| CHARACTER | 1 | /1 | COPIED DOCUMENT | 1 | /5 |
| PRINTED PICTURE | 2 | /3 | THERMMALLY-TRANSFERRED DOCUMENT | 1 | /2 |
| SILVER-SALT PICTURE | 3 | /4 | MAP | 1 | /3 |
| FLUORESCENT PEN | 1 | /2 | INK JET | 5 | /8 |
| TEXTILE | 1 | /2 | PICTROGRAPHY | 1 | /1 |

FIG.30

SELECT DEFAULT VALUES FOR USED IMAGE QUALITY MODE [SETTING]

SELECT DEFAULT VALUES FOR [INK JET MODE]

DESCRIPTION OF THE SELECTED NUMBER IS PROVIDED BELOW

| 1 | 2 | 3 | 4 | 5 | 6 | 7 | 8 | | |
|---|---|---|---|---|---|---|---|---|---|

No. 2 IS FOR AN INK JET PRINTER FROM COMPANY A. THIS 6-COLOR INK CONTAINING LIGHT CYAN AND LIGHT MAGENTA IN ADDITION TO YMCK IS AVAILABLE FOR A DOCUMENT WITH A RESOLUTION OF 3600 DPC OR MORE.

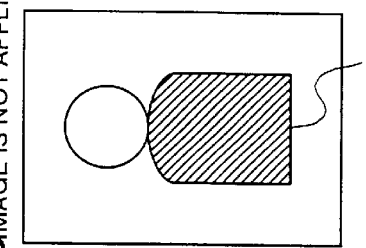
FIG.34A DOCUMENT
DOCUMENT WITH LOW RESOLUTION
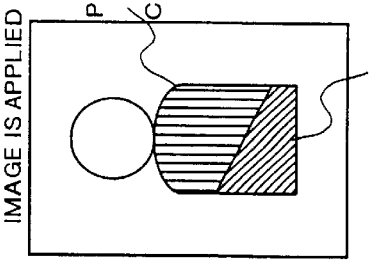
FIG.34B COPY 1 WHEN A RESULT OF IMAGE IS APPLIED
PROCESSING FOR CHARACTERS
PROCESSING FOR PICTURES
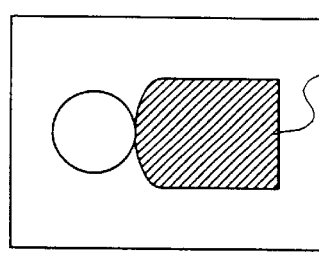
FIG.34C COPY 2 WHEN A RESULT OF IMAGE IS NOT APPLIED
PROCESSING FOR PICTURES
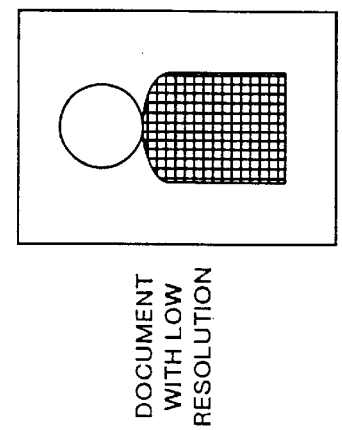
FIG.34D
DOCUMENT WITH HIGH RESOLUTION
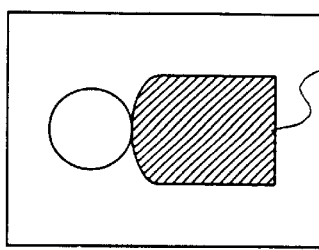
FIG.34E
PROCESSING FOR PICTURES
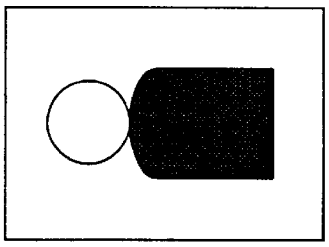
FIG.34F
PROCESSING FOR PICTURES

| 0 | 0 | 0 | 0 | 0 |
|---|---|---|---|---|
| 0 | 0 | 1 | 0 | 0 |
| 0 | 0 | 0 | 0 | 0 |

| 0 | 0 | 1 | 0 | 0 |
|---|---|---|---|---|
| 0 | 1 | 4 | 1 | 0 |
| 0 | 0 | 1 | 0 | 0 |

FIG.38

$(1/16) \times$
| 0 | 1 | 2 | 1 | 0 |
|---|---|---|---|---|
| 1 | 2 | 2 | 2 | 1 |
| 0 | 1 | 2 | 1 | 0 |

FIG.39

$(1/4) \times$
| 0 | 0 | 0 | 0 | 0 |
|---|---|---|---|---|
| -1 | 1 | 4 | 1 | -1 |
| 0 | 0 | 0 | 0 | 0 |

FIG.40

| SIGNAL<br>DOCUMENT | HALF TONE/NON-HALF TONE BIT | CHARACTER/PICTURE BIT | USED SPACE FILTER COEFFICIENT |
|---|---|---|---|
| PICTURE ON WHITE BACKGROUND | false (0) | false (1) | SPACE FILTER COEFFICIENT IN FIG.39 |
| CHARACTER ON WHITE BACKGROUND | false (0) | true (1) | SPACE FILTER COEFFICIENT IN FIG.36 |
| PICTURE ON HALF TONE AREA | true (1) | false (0) | SPACE FILTER COEFFICIENT IN FIG.38 |
| CHARACTER ON HALF TONE AREA | true (1) | true (1) | SPACE FILTER COEFFICIENT IN FIG.37 |

FIG. 41

| INK JET MODE | MANUFACTURER OF PRINTER | RESOLUTION OF DOCUMENT | RESULT OF IMAGE SEPARATION | TYPE OF COLOR CORRECTION COEFFICIENT | SPACE FILTER COEFFICIENT | YMCK GRADATION CORRECTION TABLE | GRADATION PROCESSING |
|---|---|---|---|---|---|---|---|
| 1 | COMPANY A | FINE | USED | A FOR 4-COLOR INK | WEAKLY SMOOTHING | FOR 4-COLOR INK | DITHER 1 |
| 2 | COMPANY A | FINE | USED | A FOR 6-COLOR INK | WEAKLY SMOOTHING | FOR 6-COLOR INK | DITHER 1 |
| 3 | COMPANY A | ROUGH | NOT USED | A FOR 4-COLOR INK | THROUGH | FOR 4-COLOR INK | DITHER 2 |
| 4 | COMPANY B | FINE | USED | B FOR 4-COLOR INK | WEAKLY SMOOTHING | FOR 4-COLOR INK | DITHER 1 |
| 5 | COMPANY B | A LITTLE ROUGH | USED | B FOR 6-COLOR INK | STRONGLY SMOOTHING | FOR 6-COLOR INK | ERROR DIFFUSION |
| 6 | COMPANY B | ROUGH | NOT USED | B FOR 4-COLOR INK | THROUGH | FOR 4-COLOR INK | DITHER 1 |
| 7 | COMPANY C | FINE | USED | C FOR 4-COLOR INK | WEAKLY SMOOTHING | FOR 4-COLOR INK | DITHER 1 |
| 8 | COMPANY C | ROUGH | NOT USED | C FOR 4-COLOR INK | STRONGLY SMOOTHING | FOR 4-COLOR INK | DITHER 1 |

FIG.42

| IMAGE QUALITY MODE | PEN AS OBJECT | RESOLUTION OF DOCUMENT | RESULT OF IMAGE SEPARATION | TYPE OF COLOR CORRECTION COEFFICIENT | SPACE FILTER COEFFICIENT | YMCK GRADATION CORRECTION TABLE | GRADATION PROCESSING |
|---|---|---|---|---|---|---|---|
| CHARACTER | OTHER THAN FLUORESCENT PEN | ORDINAL | USED | FOR CHARACTER (BLACK CHARACTER PROCESSING EXECUTED) | THROUGH | FOR CHARACTER | THROUGH |
| FLUORESCENT PEN 1 | FLUORESCENT PEN, MARKER PEN, COLORED PENCIL | ORDINAL | USED | FOR CHARACTER (BLACK CHARACTER PROCESSING EXECUTED) | THROUGH | FOR FLOURSCENT PEN | THROUGH |
| FLUORESCENT PEN 2 | FLUORESCENT PEN NOT AVAILABLE AS FLUORESCENT PEN 1 | ORDINAL | USED | FOR CHARACTER (BLACK CHARACTER PROCESSING NOT EXECUTED) | THROUGH | FOR FLOURSCENT PEN | THROUGH |

FIG.43

| IMAGE QUALITY MODE | MANUFACTURER OF DOCUMENT PREPARED WITH TONER | RESOLUTION OF DOCUMENT | RESULT OF IMAGE SEPARATION | TYPE OF COLOR CORRECTION COEFFICIENT | SPACE FILTER COEFFICIENT | YMCK GRADATION CORRECTION TABLE | GRADATION PROCESSING |
|---|---|---|---|---|---|---|---|
| PRINTED PICTURE DOCUMENT MODE | FOR PRINTING INK | MORE THAN 100 LINES | FOR HALF TONE AREA | FOR PRINTING INK | SMOOTHING FOR PRINTING | FOR PRINTING INK | DITHER FOR PICTURE MODE |
| COPIED DOCUMENT MODE 1 | TONER OF COMPANY A | 400DPI | FOR COPIED DOCUMENT | A FOR TONER (BLACK CHARACTER PROCESSING NOT EXECUTED) | SMOOTHING FOR COPIED DOCUMENT 1 | FOR COPIED DOCUMENT | DITHER FOR PICTURE MODE |
| COPIED DOCUMENT MODE 2 | TONER OF COMPANY B | 400DPI | FOR COPIED DOCUMENT | B FOR TONER (BLACK CHARACTER PROCESSING NOT EXECUTED) | SMOOTHING FOR COPIED DOCUMENT 1 | FOR COPIED DOCUMENT | DITHER FOR PICTURE MODE |
| COPIED DOCUMENT MODE 3 | TONER OF COMPANY C | 600DPI | FOR COPIED DOCUMENT | C FOR TONER (BLACK CHARACTER PROCESSING NOT EXECUTED) | SMOOTHING FOR COPIED DOCUMENT 2 | FOR COPIED DOCUMENT | DITHER FOR PICTURE MODE |
| COPIED DOCUMENT MODE 4 | TONER OF COMPANY D | 400DPI | FOR COPIED DOCUMENT | D FOR TONER (BLACK CHARACTER PROCESSING NOT EXECUTED) | SMOOTHING FOR COPIED DOCUMENT 1 | FOR COPIED DOCUMENT | DITHER FOR PICTURE MODE |
| COPIED DOCUMENT MODE 5 | TONER OF COMPANY E | 400DPI | FOR COPIED DOCUMENT | E FOR TONER (BLACK CHARACTER PROCESSING NOT EXECUTED) | SMOOTHING FOR COPIED DOCUMENT 1 | FOR COPIED DOCUMENT | DITHER FOR PICTURE MODE |

FIG.44

| IMAGE QUALITY MODE | MANUFACTURER OF DEVELOPMENT PAPER | RESOLUTION OF DOCUMENT | RESULT OF IMAGE SEPARATION | TYPE OF COLOR CORRECTION COEFFICIENT | SPACE FILTER COEFFICIENT | YMCK GRADATION CORRECTION TABLE | GRADATION PROCESSING |
|---|---|---|---|---|---|---|---|
| SILVER-SALT PICTURE MODE 1 | COMPANY A | HIGH RESOLUTION | FOR DEVELOPMENT PAPER | A FOR DEVELOPMENT PAPER (BLACK CHARACTER PROCESSING NOT EXECUTED) | FOR DEVELOPMENT PAPER | FOR DEVELOPMENT PAPER | DITHER FOR PICTURE MODE |
| SILVER-SALT PICTURE MODE 2 | COMPANY B | HIGH RESOLUTION | FOR DEVELOPMENT PAPER | B FOR DEVELOPMENT PAPER (BLACK CHARACTER PROCESSING NOT EXECUTED) | FOR DEVELOPMENT PAPER | FOR DEVELOPMENT PAPER | DITHER FOR PICTURE MODE |
| SILVER-SALT PICTURE MODE 3 | COMPANY C | HIGH RESOLUTION | FOR DEVELOPMENT PAPER | C FOR DEVELOPMENT PAPER (BLACK CHARACTER PROCESSING NOT EXECUTED) | FOR DEVELOPMENT PAPER | FOR DEVELOPMENT PAPER | DITHER FOR PICTURE MODE |

FIG.45

| IMAGE QUALITY MODE | TYPE OF MAP | RESOLUTION OF DOCUMENT | RESULT OF IMAGE SEPARATION | TYPE OF COLOR CORRECTION COEFFICIENT | SPACE FILTER COEFFICIENT | YMCK GRADATION CORRECTION TABLE | GRADATION PROCESSING |
|---|---|---|---|---|---|---|---|
| MAP MODE 1 | FOR ORDINARY | LOW RESOLUTION | FOR HALF TONE AREA | MAP A (BLACK CHARACTER PROCESSING EXECUTED) | FOR HALF TONE AREA | FOR MAP | FOR CHARACTER |
| MAP MODE 2 | FOR ROAD MAP | LOW RESOLUTION | FOR HALF TONE AREA | MAP B (BLACK CHARACTER PROCESSING NOT EXECUTED) | FOR HALF TONE AREA | FOR MAP | FOR CHARACTER |
| MAP MODE 3 | FOR BLANK MAP OF NATIONAL GEOGRAPHIC INSTITUTE | HIGH RESOLUTION | FOR CHARACTER | MAP C (BLACK CHARACTER PROCESSING NOT EXECUTED) | FOR CHARACTER | FOR MAP | FOR CHARACTER |

FIG.46

| IMAGE QUALITY MODE | TYPE OF MAP | RESOLUTION OF DOCUMENT | RESULT OF IMAGE SEPARATION | TYPE OF COLOR CORRECTION COEFFICIENT | SPACE FILTER COEFFICIENT | YMCK GRADATION CORRECTION TABLE | GRADATION PROCESSING |
|---|---|---|---|---|---|---|---|
| THERMALLY-TRANSFERRED DOCUMENT MODE 1 | COMPANY A | HIGH RESOLUTION | FOR PICTURE | A FOR THERMAL TRANSFER (BLACK CHARACTER PROCESSING EXECUTED) | FOR PICTURE | FOR THERMAL TRANSFER | FOR PICTURE |
| THERMALLY-TRANSFERRED DOCUMENT MODE 2 | COMPANY B | HIGH RESOLUTION | FOR PICTURE | B FOR THERMAL TRANSFER (BLACK CHARACTER PROCESSING EXECUTED) | FOR PICTURE | FOR THERMAL TRANSFER | FOR PICTURE |
| THERMALLY-TRANSFERRED DOCUMENT MODE 3 | COMPANY C | HIGH RESOLUTION | FOR PICTURE | FOR PICTROGRAPHY | FOR PICTURE | FOR PICTROGRAPHY | FOR PICTURE |

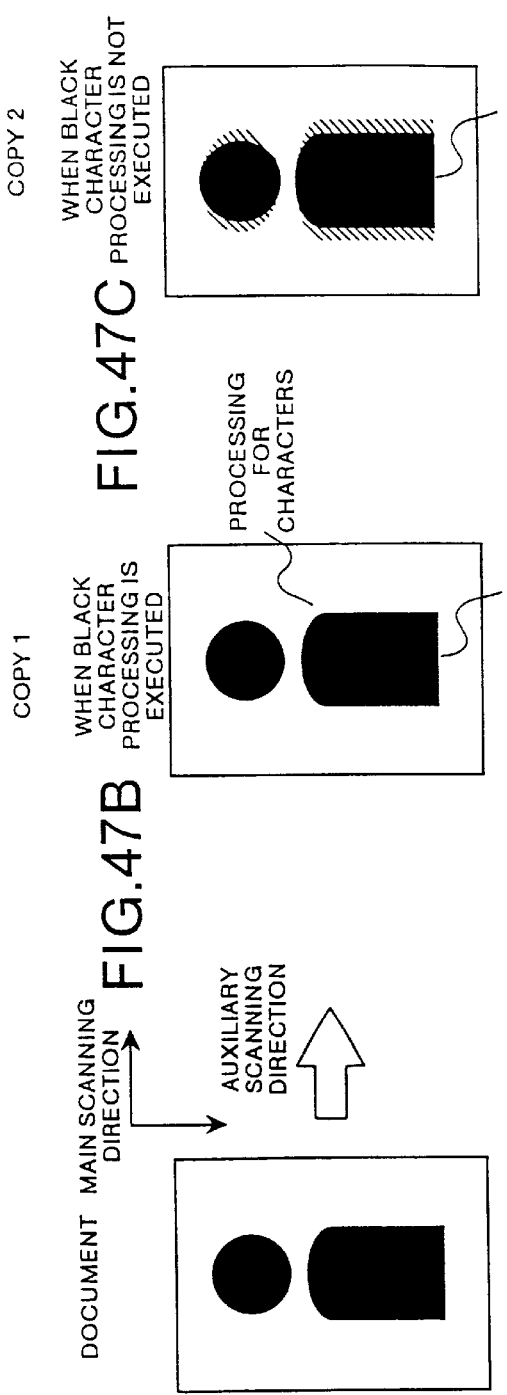
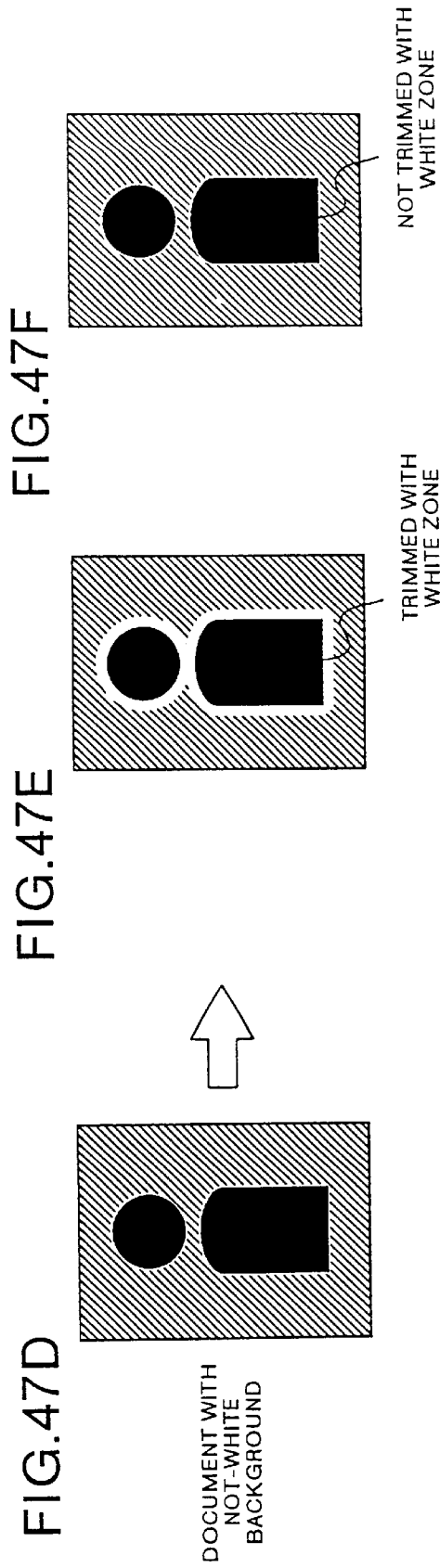

FIG.53

| IMAGE QUALITY MODE | TYPE OF DOCUMENT | RGB GRADATION CORRECTION TABLE | RESULT OF IMAGE SEPARATION | TYPE OF COLOR CORRECTION COEFFICIENT | SPACE FILTER COEFFICIENT | YMCK GRADATION CORRECTION TABLE | GRADATION PROCESSING |
|---|---|---|---|---|---|---|---|
| PRINTED PICTURE MODE | PRINT | FOR ORDINARY DOCUMENT | USED | FOR PRINT PROCESS INK | WEAKLY SMOOTHING | FOR PRINTED PICTURE | DITHER FOR PICTURE |
| CHARACTER | CHARACTER | FOR ORDINARY DOCUMENT | USED | FOR PRINT PROCESS INK | THROUGH | FOR CHARACTER | THROUGH |
| FLUORESCENT PEN | FLUORESCENT PEN | FOR FLUORESCENT PEN | NOT USED | FOR FLUORESCENT PEN | THROUGH | FOR FLUORESCENT PEN | THROUGH |
| SILVER-SALT PICTURE | DEVELOPMENT PAPER | FOR SILVER SALT PICTURE | USED | FOR DEVELOPMENT PAPER | SMOOTHING FOR DEVELOPMENT PAPER | FOR SILVER - SALT PICTURE | DITHER FOR PICTURE |
| COPIED DOCUMENT | DOCUMENT WITH TONER | FOR ORDINARY DOCUMENT | USED | FOR COPIED DOCUMENT | WEAKLY SMOOTHING | FOR COPIED DOCUMENT | DITHER FOR PICTURE |
| MAP | MAP | FOR ORDINARY DOCUMENT | USED | FOR MAP | WEAKLY SMOOTHING | FOR MAP | THROUGH |
| INK JET | INK JET | FOR ORDINARY DOCUMENT | NOT USED | FOR INK JET | SMOOTHING FOR INK JET | FOR INK JET | ERROR DIFFUSION |
| THERMALLY-TRANSFERRED DOCUMENT | THERMALLY-TRANSFERRED DOCUMENT | FOR THERMALLY-TRANSFERRED DOCUMENT | USED | FOR THERMALLY-TRANSFERRED DOCUMENT | SMOOTHING FOR THERMALLY-TRANSFERRED DOCUMENT | FOR THERMALLY-TRANSFERRED DOCUMENT 2 | DITHER FOR PICTURE |
| PICTROGRAPHY | PICTROGRAPHY | FOR PICTROGRAPHY | NOT USED | FOR PICTROGRAPHY | SMOOTHING FOR DEVELOPMENT PAPER | FOR SILVER - SALT PICTURE | DITHER FOR PICTURE |

IMAGE FORMING APPARATUS INCLUDING AN IMAGE SEPERATION UNIT

FIELD OF THE INVENTION

The present invention relates to an image forming apparatus for an electronic picture copying machine or the like based on a digital system in which adjustment of image quality can be made by switching a gradation conversion table γ or a color conversion coefficient or other parameters for each image quality mode, and more particularly to an image forming apparatus which can output images so that images for each mode can easily be checked.

BACKGROUND OF THE INVENTION

Image forming apparatuses based on the conventional technology include a so-called copying machine for forming a image based on a read image, and a so-called printer for forming an image according to image data inputted from the outside, and for instance, in a color copying machine based on a digital system, there is provided a monitor copy mode in which an image is copied by a plurality of sheets side by side on one sheet of paper by changing a color tone of a portion thereof. The technology is disclosed, for instance, in Japanese Patent Laid-Open Publication No. HEI 1-232878.

In this type of color copying machine, prior to start of a copying operation, an operator selects a monitor copy mode and specifies a portion of a document, generally a portion especially remarked for reproduction of the colors, when a plurality of monitor images intentionally having been subjected to color correction for slightly emphasizing, for instance, yellow (Y), magenta (M) and cyan (C) respectively are formed on one sheet of paper together with a monitor image with a standard color tone with the portion not having been color correction, so called a not-adjusted monitor image.

In cases of pictures, printed materials, documents written with a fluorescent pen, even if the colors look identical to human eyes, sometimes the colors become largely different when actually copied. This phenomenon occurs because the color materials such as a photo-sensitive material, printing ink, or toner are different. In a digital image forming apparatus such as an electronic picture copying machine, to reproduce excellent images each with an image quality higher than a specified value, various types of processing such as γ-correction, color conversion, filter processing, and gradation processing can be executed in each mode such as a character mode and a picture mode.

Also the invention disclosed in Japanese Patent Laid-Open Publication No. HEI 6-334854 is known as a color copying machine having the monitor copy function as described above. The color copying machine with the motor copy function as described above according to this invention comprises a manipulating unit for specifying a degree of color correction appropriate for color tone of a particular portion of an image and a color correcting unit for executing color correction at a degree specified by the manipulating unit.

An RGB gradation conversion table loaded, for instance, in a color copying machine is based on a set of three colors R, G, and B because of restrictions for cost. For this reason, to respond to various types of document, such image processing parameters as a color correction (color conversion) coefficient, a space filter, and a YMCK gradation correction table are prepared, and an image quality mode corresponding to a type of the document is selected.

As this type of invention, for instance, the invention disclosed in Japanese Patent Laid-Open No. HEI 6-86068 is known, and this invention comprises a coincidence detecting circuit for subjecting image data read by a reader to density correction by referring to the γ-correction table, outputting the corrected image data, and also outputting a coincidence signal when positional information indicating a position of the read image is coincident to positional information from a position specifying unit for specifying an arbitrary position or an area on a document and outputting the positional information; and a γ-correction circuit for subjecting the image data read by a reader to density correction according to γ-correction data, outputting the corrected image data, and switching, when the coincidence signal is inputted from the coincidence detecting circuit, γ-correction data to γ-correction data according to the density information specified by the density specifying unit for executing density correction, and the RGB gradation conversion table is switched for each current area.

On the other hand, as documents to be copied by a color copying machine or the like, in addition to characters and pictures, there are various types of documents such as a silver-salt picture such as a glossy photo (development paper), a printed document, a document printed with an ink jet, a document written with a fluorescent pin, a map, or a thermally-transferred document. In the conventional type of color copying machines, when documents to be copied (types of paper or color materials to be used) are different, an appropriate image quality mode is selected from a plurality types of image quality mode prepared in the copying machine, and optimal image processing parameters most suited to each document are used to obtained an image more faithful to the document. As described above, by preparing various image processing parameters such as a space filter, a gradation conversion table, a dither, and a color conversion coefficient as an image quality mode, a user can set conditions most suited to a document by executing a simple operation of selecting a mode.

In the actual situations, however, even the same type of documents are prepared by various types of printers. Because the printers are produced by different manufacturers or color tastes of used color materials are different, and further the dither processing or a resolution of each printer are different, some times a copied image may not be a desired one in terms of faithfulness for a document according to the same image processing parameters.

To solve the problems as described above, disclosed in Japanese Patent Laid-Open Publication No. HEI 8-58158 with the title of "Color Adjusting Apparatus" is the technology for obtaining a copied image desired by an user by executing color correction specified to each ink jet manufacturer.

With the conventional type of technology as described above, although there is provided an image quality mode for reproducing colors of different color materials such as those used in pictures, printed materials, or documents printed with an ink jet, in a case where a plurality of color conversion coefficients are available for one image quality mode, how image quality adjustment was executed can not be confirmed unless actually copying is executed each time an image quality mode is selected and the copied image is checked. For this reason, it is required to execute printing for trial many times for selecting appropriate image quality mode, which requires many sheets of paper or a large quantity of toner to be consumed, and also along time and much energy are required.

More specifically, although there are various types of documents in addition to characters and pictures such as silver-salt pictures such as a glossy photo (development paper), printed documents, those printed with an ink jet, those written with a fluorescent pen, maps, and thermally-transferred documents, when types of documents to be copied (types of paper or color materials to be used) are different, by using a gradation conversion table, dither, and a color conversion coefficient most suited to each document, an image more faithful to the document can be obtained. For this reason, by previously preparing a gradation conversion table, a dither, and a color conversion coefficient for each (image quality) mode, an user can set conditions most suited to a document by executing a simple operation of selecting a mode. However, sometimes the selected mode may not satisfy the user's intention. In this case, sometimes an excellent image is obtained in other mode, but if it is tried to output an image for each mode, the work load becomes high and a long time is required, which is disadvantageous.

Also in color copying machines based on the conventional technology, various types of image quality mode are available. The mode includes, for instance, those for each of which image processing parameters are set to respond to various types of documents such as a printed picture such as a glossy photo, a picture on development paper, a character, a copied document, a map, a document written with a fluorescent pen, a document printed with an ink jet, and thermally-transferred document. However, a user can not easily determine to which of the document types described above a document to be copied corresponds, or in which image quality mode copying should be executed, which is very inconvenient.

Even if an image quality mode is selected, unless image processing is changed according to a manufacturer of a printer or a copying machine used for copying the document, some times an image faithful to the document can not be obtained. For instance, in cases of a document with an ink jet, a silver-salt picture document, or a copied document, unless the document is corrected according to a manufacturer and a type of the machine, an image faithful to the document can not be obtained, which is disadvantageous.

In the case as described above, even if the guidance of "Please select a mode for the manufacturer of a printer or a copying machine used for preparing the document" or the like is displayed, generally the user can not easily determine the manufacturer of the printer or the copying machine used for preparing the document. This is also true in a case of a film projector.

The color copying machine disclosed in Japanese Patent Laid-Open Publication No. HEI 6-334854 has only a function to execute color correction by specifying a degree of color correction, and the problems as described above are not solved in this color copying machine.

Also it is conceivable to output an image enabling a user to understand in which mode the image is prepared so that the user can easily determine a mode for obtaining an excellent image, but when an arbitrary area of the document to be outputted is specified by area processing, sometimes the image in the selected mode may not be accommodated within a specified form. If the image can not be accommodated within a form, the entire image can not be processed according to the selected mode. This means that, in a case of a sheet of form with a plurality of images formed thereon, different types of processing must be executed according to an area of the formed image, and this problem has not been solved in the conventional technology.

Also with the invention disclosed in Japanese Patent Laid-Open Publication No. HEI 6-334854, it is possible to specify a degree of color correction, but a mode of color correction can not be specified according to a type of a document, a manufacturer of a document, nor to a type of the machine used for preparation of the document.

On the other hand, the conditions for an excellent image desired by a user include faithfulness to the document in color faithfulness, that there is no abnormality in a copied image due to a determination error as to a character or a picture area executed automatically, and that the image is not degraded nor faded as compared to the document. However, even in a case of the same document type, faithfulness of a copy obtained according to image processing parameters specified to a particular image quality mode does not always satisfy the user.

For instance, in a case of a document printed with an ink jet printer, as a color taste of a document or a dither processing varies according to each manufacturer of the printer, faithfulness of a copy prepared according to the same image processing parameters specific to the particular image quality mode does not always satisfy the user's needs. Also there is a printer in which a resolution or a dither processing can be changed according to setting of the printer and 4 to 6 colors are available for printing, and faithfulness of a copy according to the same image processing parameters specific to the particular image quality mode does not always satisfy the user's needs.

Further a CCD output vale for read balance for R (Red), G (Green), and B (Blue) with a CCD (Charge Coupled Device) in a conventional type of scanner is adjusted so that values for R, G, and B will be substantially identical when a document painted with achromatic-color ink is used and the achromatic-color document is read. When an achromatic-color document formed on common paper is read with a scanner set as described above, read values for R, G, and B are identical, the document is read as an achromatic-color document, and the faithfulness of color is excellent even when a chromatic-color document is read.

In contrast, when an achromatic-color document printed, for instance, on development paper used in the silver-salt picture system is read by a scanner with the CCD output balance adjusted as described above, output values for R, G, and B are not identical, and an output signal for Red may be detected as a lower value as compared to the actual value. This type of phenomenon is generated when a reflection factor in a long waveform region of a visual light area on development paper is low. As a result, a cyan color factor is rather emphasized in an obtained copy. The tendency varies according to characteristics of a spectral transmittance of a CCD, performance of a spectral transmitting filter provided on a light path from a document to the CCD, or the spectral reflection characteristics of the CCD.

An example of an achromatic-color copy was described above, but the same is true also in a case of chromatic-color copy, and it is often observed, for instance, during adjustment for printing, that a copied image with a color taste different from that visually observed is formed in a case of the document on development paper. In the case as described above, generally a color correction factor or a YMCK gradation factor correction table is changed according to a type of a document, but sometimes the faithfulness of color in an obtained copy is not satisfactory.

It is possible to prepare many gradation correction tables used for subjecting image data outputted from an image reader to gradation conversion for executing sufficient correction, but this kind of configuration causes increase in cost. The reason is as follows. Namely, in an image forming apparatus based on a system in which Y, M, C, K images are successively formed on a light-sensing body and the Y, M, C, K images are overlapped on a transfer body, only image data for one of Y, M, C, and K colors is required in a YMCK gradation conversion table, in other words it is required only to provide a gradation conversion table enabling input/ output of, for instance, an 8-bit signal thereto or therefrom. In contrast, in a case of a gradation conversion color for R, G, B colors, as 3 types of signals for R, G, and B colors are required in color correction processing in a subsequent step, so that gradation conversion tables for three colors of R, B, and G colors are required for both input and output. For this reason, there is no way but to use a circuit with a larger scale for preparing a memory space for a plurality of image areas on one sheet of a document, which causes cost to increase.

If the configuration is employed in which a plurality of gradation conversion tables used for gradation conversion of image data outputted from an image reader are provided and an appropriate gradation conversion table is selected for use according to an image area inside a document, the image quality is improved, but the necessity of providing a number of gradation conversion tables causes cost to increase.

Further, as gradation conversion characteristics varies according to a document type, unless an appropriate gradation conversion table is employed according to a document type, faithfulness of a reproduced image in colors to the document may be rather low.

SUMMARY OF THE INVENTION

It is a first object of the present invention to provide an image forming apparatus in which a monitor image for selection of image quality mode suited to each individual document can be formed, and a user can select a mode suited to a document after the user visually checks the monitor image.

It is a second object of the present invention to provide an image forming apparatus in which a user can easily select an image quality mode suited to each discrete document by visually checking monitor images.

It is a third object of the present invention to provide an image forming apparatus in which a user can execute color correction according to such a parameter as a document type, a manufacturer of a document, or a machine type.

It is a fourth object of the present invention to provide an image forming apparatus in which a desired copy can be obtained from various types of document.

It is a fifth object of the present invention to provide an image forming apparatus which can insure faithfulness of a copied image in terms of color to a document irrespective of a document type, nor to parameters set for printing.

It is a sixth object of the present invention to provide an image forming apparatus which can insure faithfulness of a copied image in colors to a document without causing cost increase.

The forming apparatus according to the present invention comprises an image reader for reading image data by optically scanning a document image placed at a reading position; an image processor for receiving image data from the image reader and subjecting the image data to image processing; an image forming unit for forming an image on a transfer material based on the image data having been subjected to image processing by the image processor; and a particular area setting unit for setting an arbitrary image area in the document image as a particular area; wherein the image processor receives, when the particular area is set by the particular area setting unit, image data corresponding to the particular area, generates a plurality of monitor image data having been subjected by setting a different image quality mode for each data respectively; and the image forming unit receives the plurality of monitor image data, allocates each monitor image data at a different position on the same transfer material respectively, and forms a plurality of monitor images on the same transfer material, and for this reason there is provided the effect that images for particular areas (monitor images) each processed in a respective different image quality mode can be formed at different positions on one sheet of form so that an image for each mode can easily and visually be checked and an appropriate mode can easily be selected.

Other objects and features of this invention will become understood from the following description with reference to the accompanying drawings.

BRIEF DESCRIPTION OF THE DRAWINGS

FIG. 11 is an explanatory view showing an example where the ink jet mode is set.

FIG. 16 is an explanatory view showing image processing parameters in a fluorescent pen mode and in a character mode;

FIG. 17 is an explanatory view showing image processing parameters in a copied document mode and a printed picture document mode;

FIG. 18 is a explanatory view showing image processing parameters in a silver-salt picture mode;

A FIG. 29 is an explanatory view showing an example of a screen for selecting a default value for each image quality mode in Embodiment 3;

FIG. 30 is an explanatory view showing the liquid crystal screen when a portion of the image quality mode displayed as ink jet in Embodiment 3 is selected;

FIGS. 34A to 34F are conceptual views showing a copied image when a resolution of a document is different;

FIG. 36 is an explanatory view showing an example of a space filter;

FIG. 37 is an explanatory view showing an example of a space filter;

FIG. 38 is an explanatory view showing an example of a space filter;

FIG. 39 is an explanatory view showing an example of a space filter;

FIG. 40 is an explanatory view showing an example of a space filter used according to a 2-bit image separation signal;

FIG. 41 is an explanatory view showing image processing parameters in the ink jet mode;

FIG. 42 is an explanatory view showing image processing parameters in the fluorescent pen mode and in the character mode;

FIG. 43 is an explanatory view showing image processing parameters in the copied document mode and in the printed picture document mode;

FIG. 44 is an explanatory view showing image processing parameters in the silver-salt picture mode;

FIG. 45 is an explanatory view showing image processing parameters in a map mode;

FIG. 46 is an explanatory view showing image processing parameters for the thermally-transferred mode and for a pictrography mode in a thermally-transferred document mode;

FIGS. 47A to 47F are conceptual views showing copied images of a black character document with a white background and a black character document without a white background when black character processing is executed, and when the black character processing is not executed;

FIG. 53 is an explanatory view showing image processing parameters for each image quality mode in Embodiment 4;

DESCRIPTION OF THE PREFERRED EMBODIMENTS

Next description is made for a case where the image forming apparatus according to the present invention is applied in an electronic picture copying machine (described simply as a copying machine) in the order of Embodiment 1, Embodiment 2, Embodiment 3, and Embodiment 4 with reference to the attached drawings.

Figure 1:
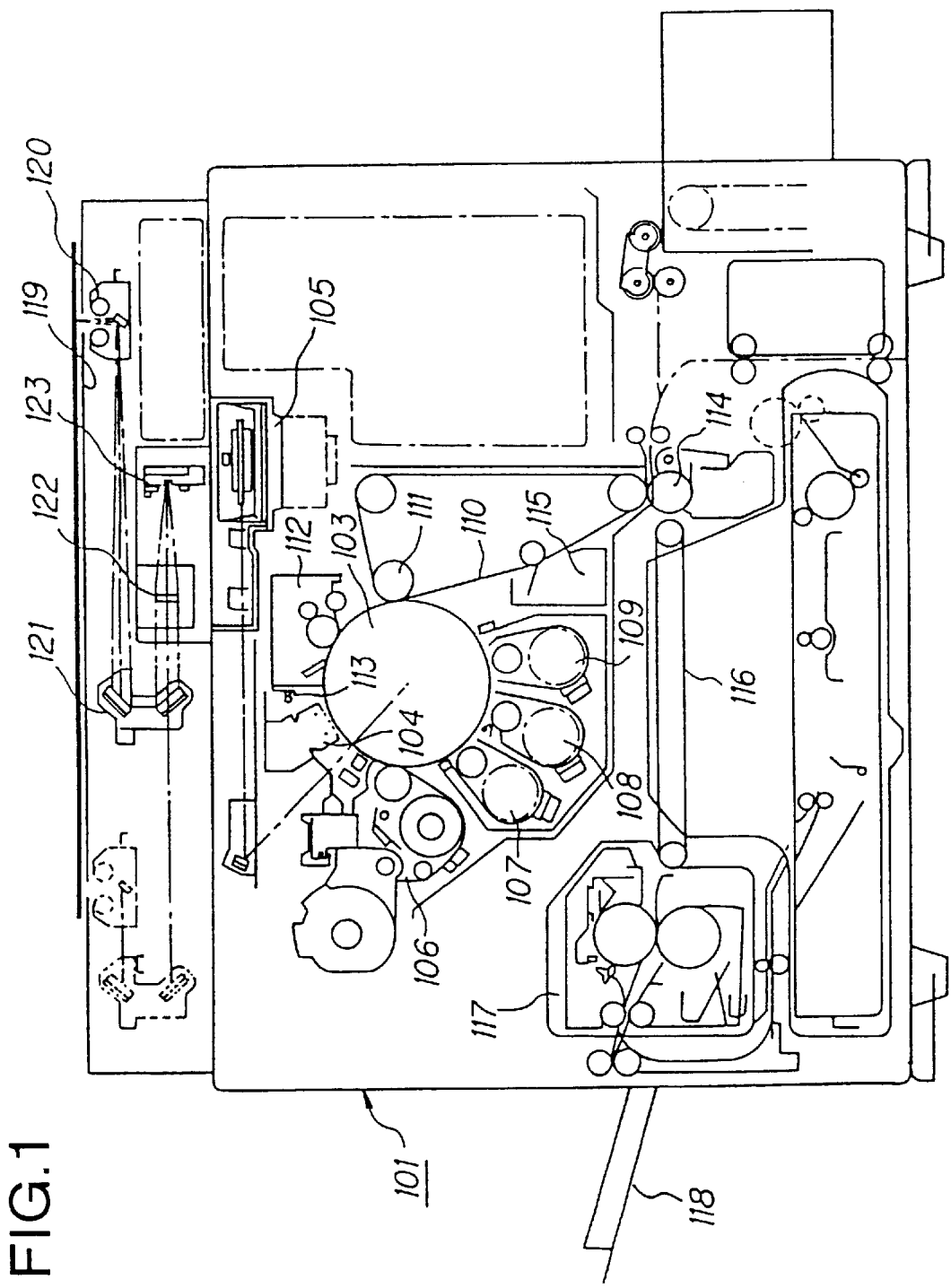
FIG. 1 is a general block diagram showing a copying machine according to Embodiment 1 of the present invention.

FIG. 1 is a general block diagram showing a copying machine according to Embodiment 1, and in this figure, arranged around an organic light-sensing (OPC) drum 103 with a diameter of 120 [mm] as an image carrier provided at a substantially central position of a main body of the machine 101 are a electrifying charger 104 for electrifying a surface of the light sensing drum 103; a laser optical system for irradiating a laser light generated from a semiconductor onto a surface of the homogeneously electrified light-sensing drum 103; a black color developing apparatus 106 as well as developing apparatuses 107, 108, 109 for three colors of yellow Y, magenta M, and cyan C for supplying toner for each color to electrostatic latent images for development and obtaining toner images for the colors; an intermediate transfer belt 110 for successively transferring toner images for the colors formed on the light-sensing drum 103 onto the intermediate transfer belt 110; a bias roller 111 for loading a voltage for image transfer onto the intermediate transfer belt 110; a cleaning device 112 for removing toner left on a surface of the light-sensing drum 103 after transfer, and a dielectrifying section 113 for removing electric charge remaining on a surface of the light-sensing drum 103 after transfer.

Provided on the intermediate transfer belt 110 are a transfer bias roller 114 for loading a voltage for transfer the transferred toner images onto a transfer material, and a belt cleaning device 115 for cleaning residual toner images after transfer onto the transfer material. Provided at an exist-side edge section of a carrier belt 116 for carrying the transfer material separated from this intermediate transfer belt 110 is a fixing device 117 for heating, loading pressure onto and fixing a toner image, and a paper discharge tray 118 is attached to an exist section of this fixing device 117.

Provided in an upper section of the laser optical system 105 are contact glass 119 as a base for placing thereon a document set on the basic body 101 of the machining machine 101, and an exposure lamp 120 for irradiating a scanning light to a document on this contact glass 119, and the laser optical system guides a reflected light from the document with a reflection mirror 121 to a focusing lens 122, and introduces the light into an image sensor array 123 of a CCD (Charged Coupled Device) which is a photoelectric converting element. An image signal converted by the image sensor array 123 in the CCD to an electric signal passes through an image processing section (Refer to FIG. 3), and controls laser oscillation of a semiconductor laser in the laser optical system 105.

Figure 2:
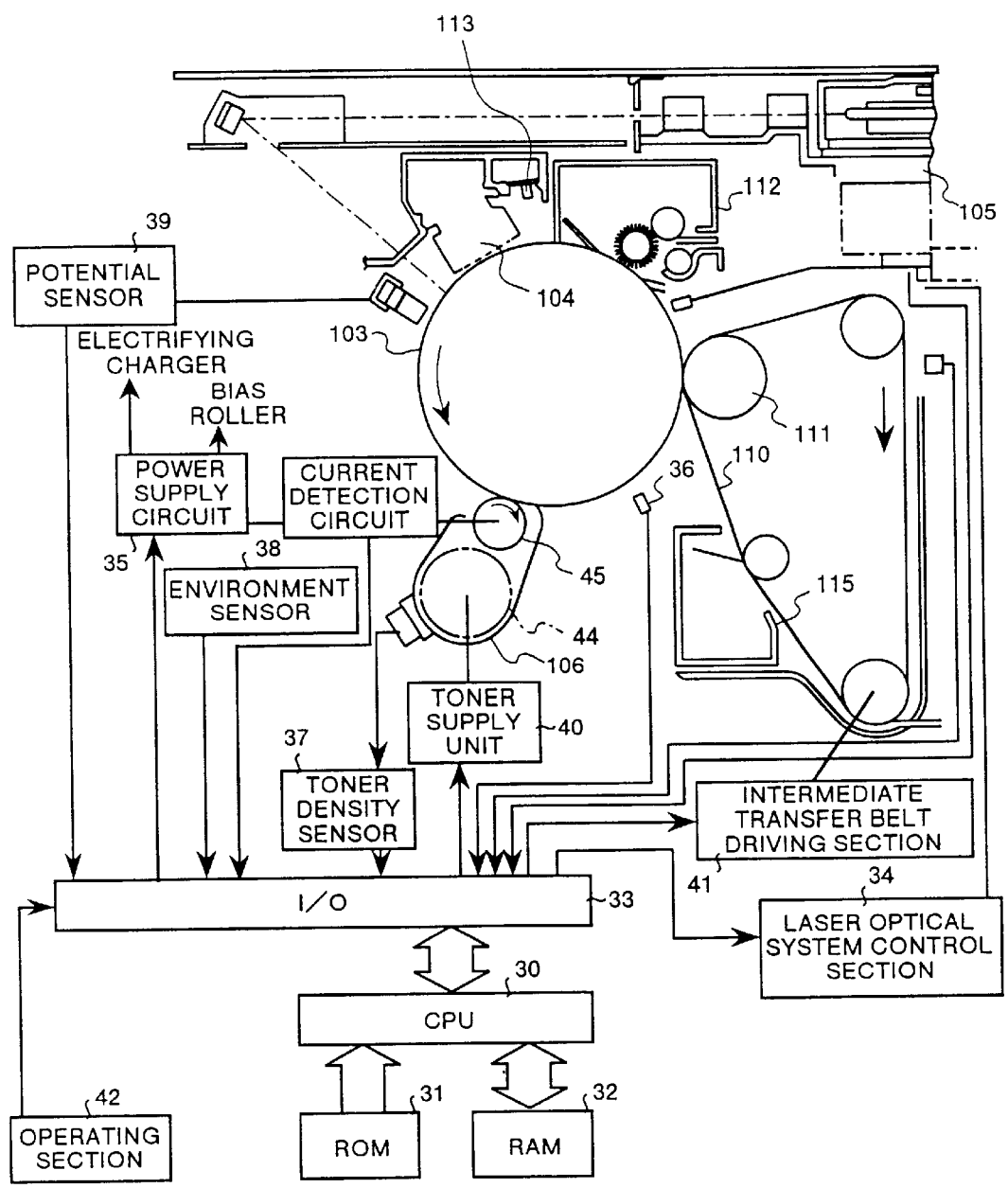
FIG. 2 is an explanatory view showing a control system in the copying machine according to Embodiment 1.

Next description is made for a control system incorporated in a copying machine with reference to FIG. 2.

As shown in FIG. 2, the control system has a main control section (CPU) 30 with a specified ROM 31 and a RAM 32 attached to this main control section 30, and the main control section 30 has a laser light system control section 34, a power supply circuit 35, an optical sensor 36, a toner density sensor 37, an environment sensor 38, a light-sensing body surface potential sensor 39, a toner supply circuit 40, an intermediate transfer belt driving section 41, an operating section 42 and other components each connected thereto via an interface (I/O) 33.

The laser optical system control section 34 adjusts an laser output from the laser optical system 105, while the power supply circuit 35 gives a specified discharge voltage for electrification to the electrifying charger 104 and also gives development bias with a specified voltage to the developing devices 106, 107, 108, and 109, and also gives a specified voltage for transfer to a bias roller 111 as well as to a transfer bias roller 114.

The optical sensor 36 comprises a light-emitting element such as a light-emitting diode provided at a position adjacent to an area after transfer to the light-sensing drum 103 and a light-receiving element such as a photosensor with a toner deposition rate on a toner image for a detected pattern latent image formed on the light-sensing drum 103 and a toner deposition rate on the background section detected for each color, and also a so-called residual voltage after the light-sensing body is dielectrified is detected.

A detection output signal from this optical sensor 36 is loaded to a photoelectric sensor control section now shown in the figure. The photoelectric sensor control section computes a ratio of a toner deposition rate on a detected pattern toner image and that on the background section, detects fluctuation in image density by comparing the ratio to the reference value, and corrects a control value for the toner density sensor 337.

Further, the toner density sensor 37 detects a toner density in the developing devices 106 to 109 according to a change in permeability of developer existing in the developing devices 106 to 109. The toner density sensor 37 compares the detected toner density value to the reference value, and when the detected toner density is below the reference value and toner is short, and loads a toner supply signal with an amplitude corresponding to the shortage to the toner supply circuit 40.

The potential sensor 39 detects a surface voltage of the light-sensing drum 103 which is an image carrier, while the intermediate transfer belt driving section 41 controls driving of the intermediate transfer belt.

Developer containing black toner and a carrier is accommodated in the black developing unit 106, and the developer is agitated and pumped up onto a sleeve by a developer agitating member 44. The supplied developer is magnetically carried on a development sleeve 45, and is rotated in the rotation direction of the development sleeve 45 as a magnetic brush.

Figure 3:
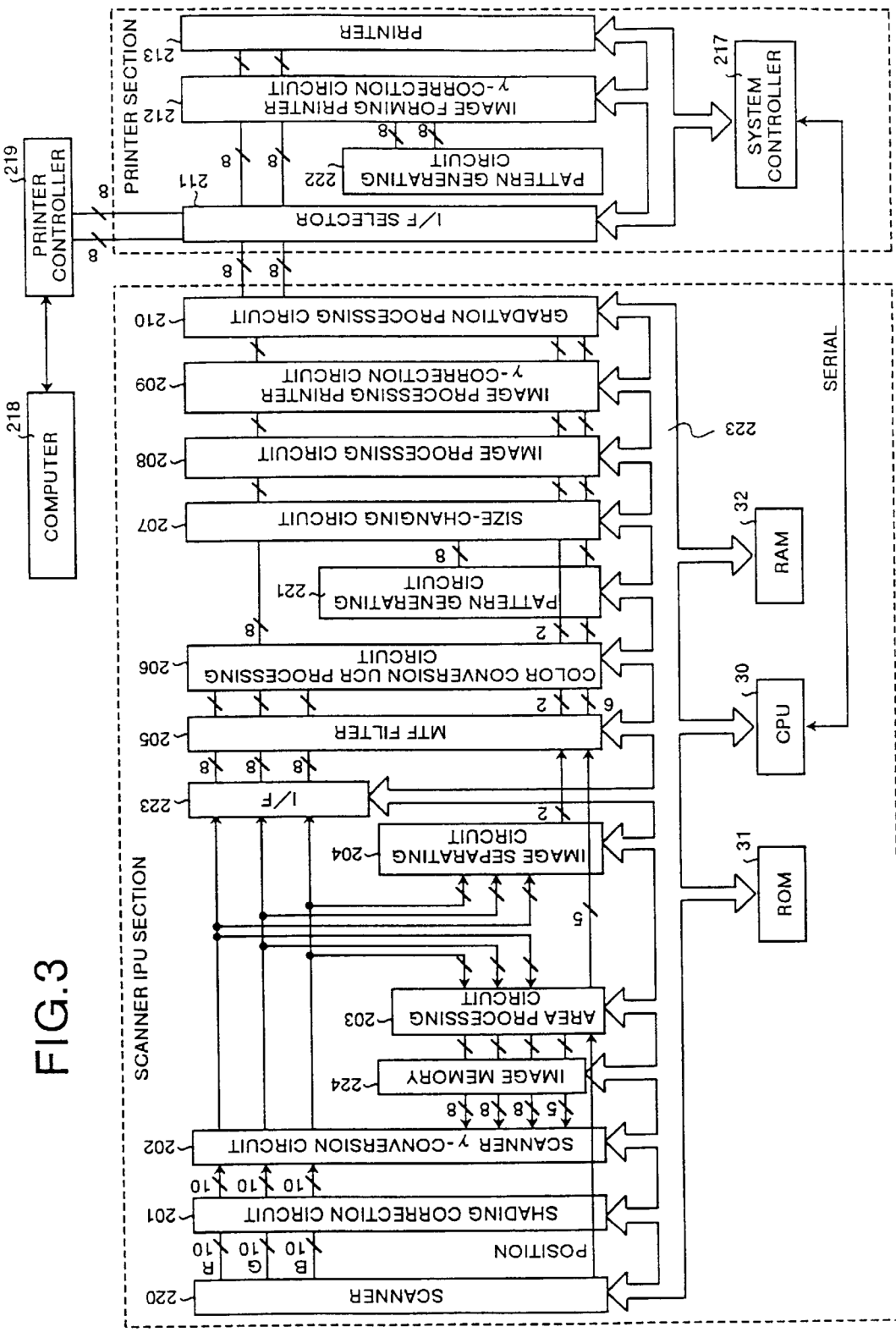
FIG. 3 is a block diagram showing an image processing section in the copying machine according to Embodiment 1.

Next description is made for an image processing section in a copying machine with reference to a block diagram shown in FIG. 3. In FIG. 3, designated at the reference numeral 220 is a scanner, at 201 a shading correction circuit, at 202 a scanner γ-conversion circuit, at 203 an area processing circuit, at 204 an image separating circuit, at 205 an MTF filter, at 206 a color conversion UCR processing circuit, at 207 a size-changing circuit, at 208 an image processing (create) circuit, at 209 a printer γ-correction circuit for image processing, at 210 a gradation processing circuit, at 211 and 223 an I/F selector respectively, at 212 an image forming printer γ-correction (described as procon γ) correction circuit, at 213 a printer, at 221 and 222 a pattern generating circuit respectively, and at 224 an image memory.

The scanner IPU section (image reading/image processing section) comprises the scanner 220, shading correction circuit 201, area processing circuit 203, an interface I/F 223, scanner γ-correction circuit 202, image separating circuit 204, MTF filter 205, color conversion UCR processing circuit 206, pattern generating circuit 221, size-changing circuit 207, image processing (create) circuit 208, image processing γ-correction circuit 209, gradation processing circuit 210, pattern generating circuit 221, image memory 224, CPU 30, ROM 31, and RAM 32, while the printer section (image forming section) comprises the image forming printer γ-correction (described as procon γ hereinafter) correction circuit 212, printer 213, I/F selector 211, system controller 217, and pattern generating circuit 222.

A document to be copied is subjected with the color scanner 220 to color separation to R, G, B and is read, for instance, as a 10-bit signal. The read image signal (image data) is subjected to correction of nonuniformity in the main scanning direction by the shading correction circuit 201, and is outputted as a 10-bit signal. In the scanner γ-correction circuit 202, an input signal (10-bit signal) obtained by converting a read signal from the scanner from reflection factor data to brightness data is converted to an 8-bit signal.

In the area processing circuit 203, an area signal indicating to which area of a document the image data being currently processed belongs is generated. Parameters used in the subsequent image processing section are switched according to the area signal generated in this circuit. Image processing parameters such as a color correction coefficient, a space filter, and a gradation conversion table most adapted to each type of document such as a character, a silver-salt picture (development paper), a printed document, a document printed by an ink jet printer, a document written with a fluorescent pen, a map, or a thermally transferred document can be set for each image area.

The image memory 224 is a memory for storing therein image data read with the scanner 220 with a resolution of 400 DPI, and the memory consists of three 16-Mbyte memory areas for the three colors of R, G, and B respectively so that image data for A-4 size can be stored with a resolution of 400 DPI.

The image separating circuit 204 differentiates a character section from a picture section, and also differentiates chromatic colors from achromatic colors.

The interface (I/F) 223 uses for outputting an image read with a scanner to the outside. When used as a printer section (image processing section) and a scanner IPU section (image reading/image processing section), image data can be taken out from the I/F selector section 211 in the printer section to an external device.

The MTF filter 205 executes processing for changing a frequency characteristic of an image signal such as emphasizing an edge of an image or smoothing according to a user's request for a sharp image or a soft image.

In the color conversion UCR processing circuit 206, correction is made for a difference between a color separation characteristic in an input system and a spectral characteristic of a color material in an output system, and the color conversion UCR processing circuit 206 comprises a color correcting section for computing quantity of color materials of Y, M, and C required for reproducing faithful colors, and a UCR processing section for replacing a section where three colors of Y, M, and C are superimposed on each other with a Bk (black) color section. Namely, the color correction processing can be realized by executing the matrix operation as shown by the following equation.

$$\begin{bmatrix} Y \\ M \\ C \end{bmatrix} = \begin{bmatrix} a11 & a12 & a13 \\ a21 & a22 & a23 \\ a31 & a32 & a33 \end{bmatrix} \begin{bmatrix} \overline{B} \\ \overline{G} \\ \overline{R} \end{bmatrix}$$

Herein $\overline{R}$, $\overline{G}$, and $\overline{B}$ indicate complements for R, G, and B. The matrix coefficient aij is decided according to the spectral characteristic in the input system as well as that in the output system (color materials). Herein a linear masking equation was described as an example above, but color correction can be executed with higher precision by using quadratic terms such as $\overline{B}^2$ and $\overline{BG}$, or by using higher-dimensional terms. Also an operational expression may be changed according to a color phase, or a Neugebauwer equation may be used. In any method, quantity of color materials Y, M, and C can be obtained from the values of $\overline{R}$, $\overline{G}$, and $\overline{B}$ (or for B, G, and R).

On the other hand, the UCR processing can be executed by computing through the following equations:

$Y'=Y-\alpha \cdot \min (Y, M, C)$ $M'=M-\alpha \cdot \min (Y, M, C)$ $C'=C-\alpha \cdot \min (Y, M, C)$ $Bk=\alpha \cdot \min (Y, M, C)$ In the above expressions, $\alpha$ indicates a coefficient for deciding a rate of UCR, and when $\alpha$ is equal to 1, 100% UCR processing is executed. The $\alpha$ may be a constant value. For instance, an image can be smoothed by setting a to a value close to 1 in a high density section and to a value close to 0 (zero) in a hi-light section (low image density section).

In the size-changing circuit 207, size-change in the vertical direction or in the horizontal direction is executed, and in the image processing (create) circuit 208, such processing as repeat processing is executed.

In the image processing printer $\gamma$-correction circuit 209, correction of an image signal is executed according to an image quality mode such as a character, or a picture. Herein the image quality mode is selected by setting image processing parameters according to types of sheet documents such as a character document, a silver-salt (development) document, a printed document, a document printed with an ink jet printer, a document written with a fluorescent pen, a map, or a thermally transferred document. In addition, the image parameters may be set according to types of solid documents such as metal or textile. Further the image parameters may be set according to a UCR rate, a degree of smoothing with a space filter coefficient, a degree of emphasis of an edge, as well as to dither setting such as a dot concentrating type or an error diffusing type.

Also such an operation as first skip can be executed simultaneously. This image processing printer $\gamma$-correction circuit 209 has a plurality (for instance, 10) gradation conversion table switchable according to an area signal generated by the area processing circuit 203 described above. Because of this feature, image processing parameters most suited to a document type such as a character document, a silver-salt picture (on development paper), a printed document, a document printed with an ink jet printer, a document written with a fluorescent pen, and a thermally-transferred document can be selected from the plurality of gradation tables.

Then the dither processing is executed in the gradation processing circuit 210. In output from the gradation processing circuit 210, a pixel frequency is decreased to ½ of the original one, and for this reason the image data bus has a 16-bit width (for two sets of 8-bit image data) so that data for two pixels can be transferred to the printer section simultaneously.

The I/F selector 211 has a switching function to output image data read with the scanner 220 to an external image processor for processing the image data therein or to output image data from an external host computer or image processor to the printer 213 for outputting the image data therefrom.

The image forming printer $\gamma$ (procon $\gamma$) correction circuit 212 converts an image signal from the I/F selector 211 by referring to the gradation conversion table, and outputs the image signal to a laser modulating circuit described later.

As described above, in Embodiment 1, the printer section comprises the I/F selector 211, image forming printer $\gamma$-correction circuit 212, printer 213, and system controller 217, and can be used independently from the scanner IPU section. An image signal from a host computer 218 is inputted via a printer controller 219 into the I/F selector 211, and is subjected to gradation conversion by the image forming printer γ-correction circuit 212 to form an image with the printer 213, so that the image forming printer γ-correction circuit 212 can also be used as a printer section.

The image processing section described above is controlled by the CPU 30. The CPU 30 is connected via a BUS 223 to each of the ROM 31, RAM 32, and scanner IPU section. Also the CPU 30 is connected via a serial I/F to the system controller 217, and commands from the operating section 42 (Refer to FIG. 2) or other sections are transmitted via the system controller 217. Image parameters are set in each image processing circuit according to the transmitted image quality mode, density information, area information or the like. The pattern generating circuits 221, 222 generate gradation patterns used in the image processing section and in the image forming section respectively.

Figure 4:
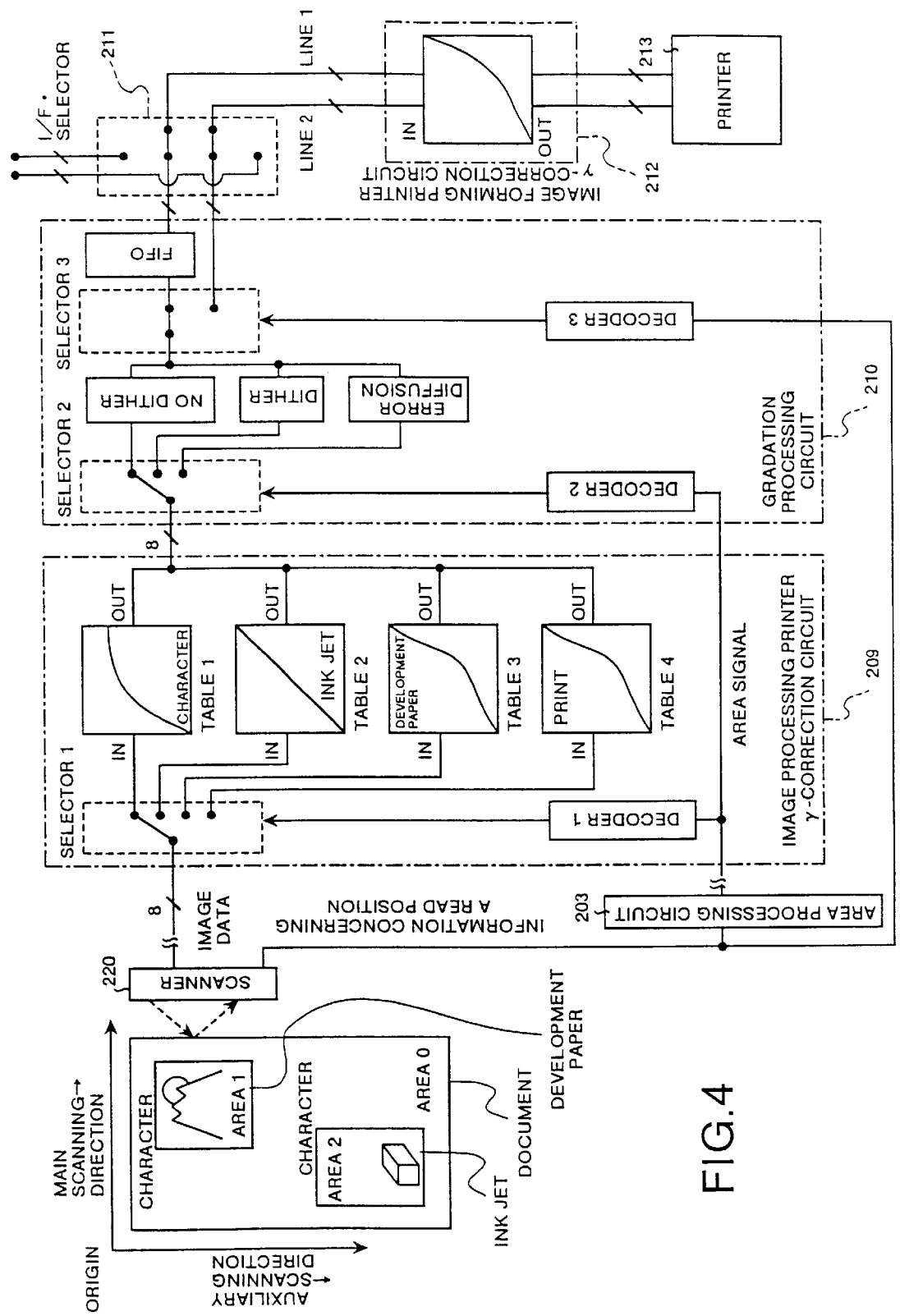
FIG. 4 is an explanatory view for explanation of operations for switching gradation conversion tables in the copying machine according to Embodiment 1.

Namely, as shown in FIG. 4, area information concerning a specified area on a document is compared to read position information for reading an image, and an area signal is generated from the area processing circuit 203. Parameters used in the scanner γ-conversion circuit 202, MTF filter 205, color conversion UCR circuit 206, image processing circuit 208, image processing printer γ-correction circuit 209, and gradation processing circuit 210 are changed according to the area signal. Herein especially the image processing printer γ-correction circuit 209, and gradation processing circuit 210 are illustrated in detail.

In the image processing printer γ-correction circuit 209, an area signal from the area processing circuit 203 is decoded by a decoder 1, and a specified gradation table is selected from a plurality of gradation conversion tables such as those for a character document, or a document printed with an ink jet printer. It should be noted that, in the example of document shown in FIG. 5, there is illustrated a case where an area 0 consisting of characters, an area 1 of development paper and an area 2 printed with an ink jet exist. The gradation conversion table 1 for a character document is selected for an area 0 consisting of characters, gradation conversion table 3 for development paper for an area 1 on development 1, and gradation conversion table 2 for a document printed with an ink jet for an area 2 of a document printed with an ink jet respectively.

The image signal (image data) corrected by the image processsing priinter γ-correction circuit 209 is sent to the gradation processing circuit 210, a gradation processing to be executed is selected by the selector 2 according to a signal again decoded by the decoder 2 in response to an area signal in the gradation processing circuit 210. The available processing in this step includes processing not using a dither, processing using a dither, error diffusion processing or the like. The error difussion processing is executed to a document printed with an ink jet.

Figure 5:
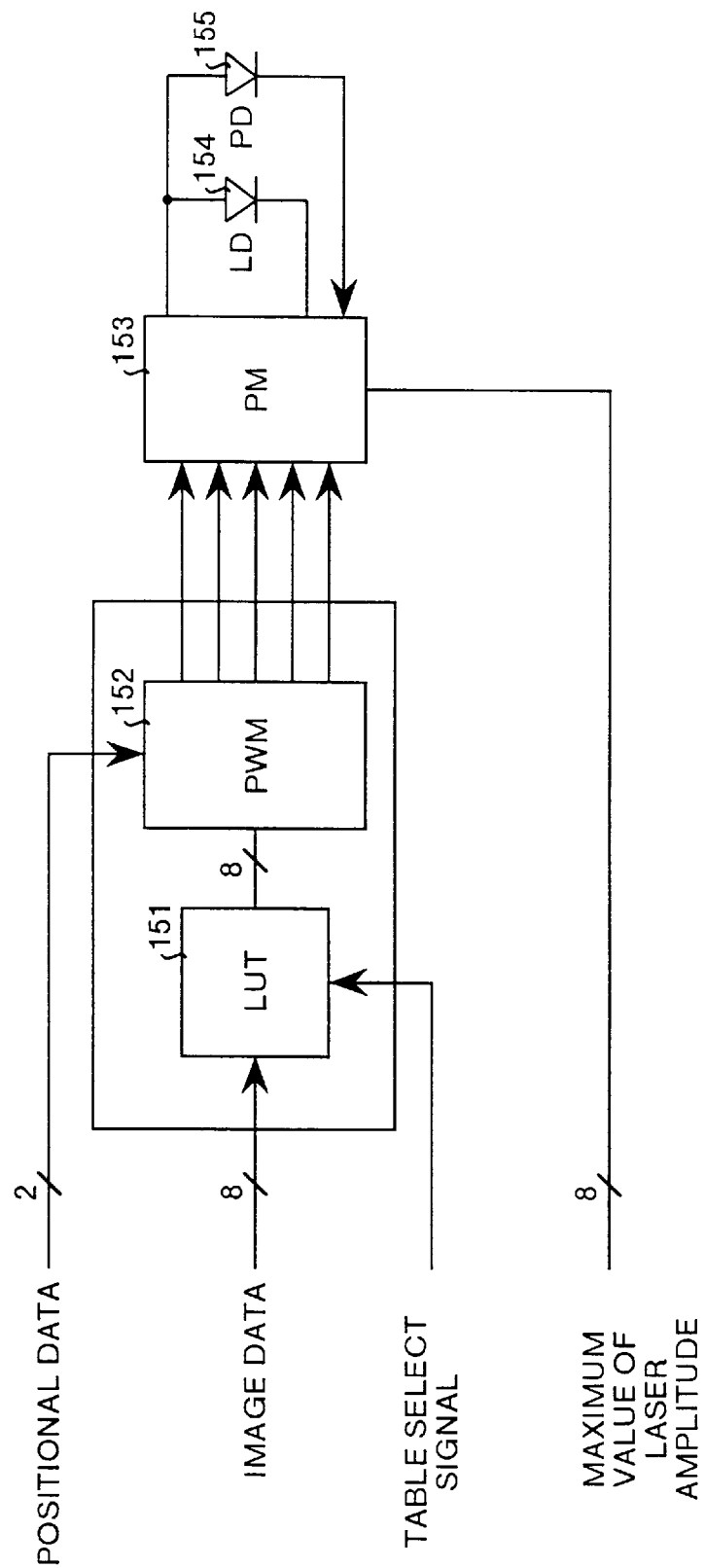
FIG. 5 is a block diagram showing a laser modulation circuit in the copying machine according to Embodiment 1.

For which a line 1 and line 2 the image signal having been subjected to gradation processing is selected by a decoder 3 according to information concerning read positon. Switching between line 1 and line 2 are executed by one pixel in the auxiliary scanning direction. Data for line 1 is temporarily stored in FIFO (First In First Out) memory located in the downstream side from the selector 3, and data for line 1 and line 2 is outputted. With this operation, the pixel frequency can be inputted into the I/F selector 211 after reduced to a ½ of the original one.

next description is made for laser modulating circuits prepared in response to image data for line 1 and line 2 respectively with reference top FIG. 5. Herein a write frequency is 18.6 [MHz], and a scanning time for one pixel is assumed to be 53.8 [nsec]. Also 8-bit image data can be subjected to γ-conversion by referring to a look-up table [LUT] 151.

The 8-bit image signal is converted to any of pulse widths for 8 values according to upper 3 bits of the image signal in a pulse width modulation circuit (PWM) 152, power modulation for 32 values is executed according to lower 5 bits of the signal in the power modulation (PM) circuit 153, and a laser diode (LD) 154 emits light according to the modulated signal. A photo-detector (PD) 155 monitors amplitude of the light emission, and executes correction for each 1 bit. The maximum value of amplitude of the laser beam can be changed by 8 bits (256 steps) independently from the image signal.

A beam diameter in the main scanning direction (defined herein as a width when the beam amplitude in the static state is attenuated to $1/e^2$ against the maximum value) is less than 90%, and preferably 80% of a size of one pixel. With a resolution of 600 DPI and a pixel size of 42.3 [$\mu$m], the beam diameter 50 [$\mu$m] is used in the main scanning direction, and 60 [$\mu$m] in the auxiliary scanning direction.

The laser modulation circuits shown in FIG. 5 are prepared in response to image data for line 1 and those for line 2 in FIG. 4 respectively. Herein the image data for line 1 and those for image data are synchronized to each other, and are scanned on a light sensing body in parallel to each other in the main scanning direction.

Next description is made for operations of and processing by the monitor copy function. The monitor copy function is a function for selecting and setting an image quality mode most suited to a document to be copied. Description is made for operations of the monitor copy function with reference to the flow chart shown in FIG. 6.

Figure 6:
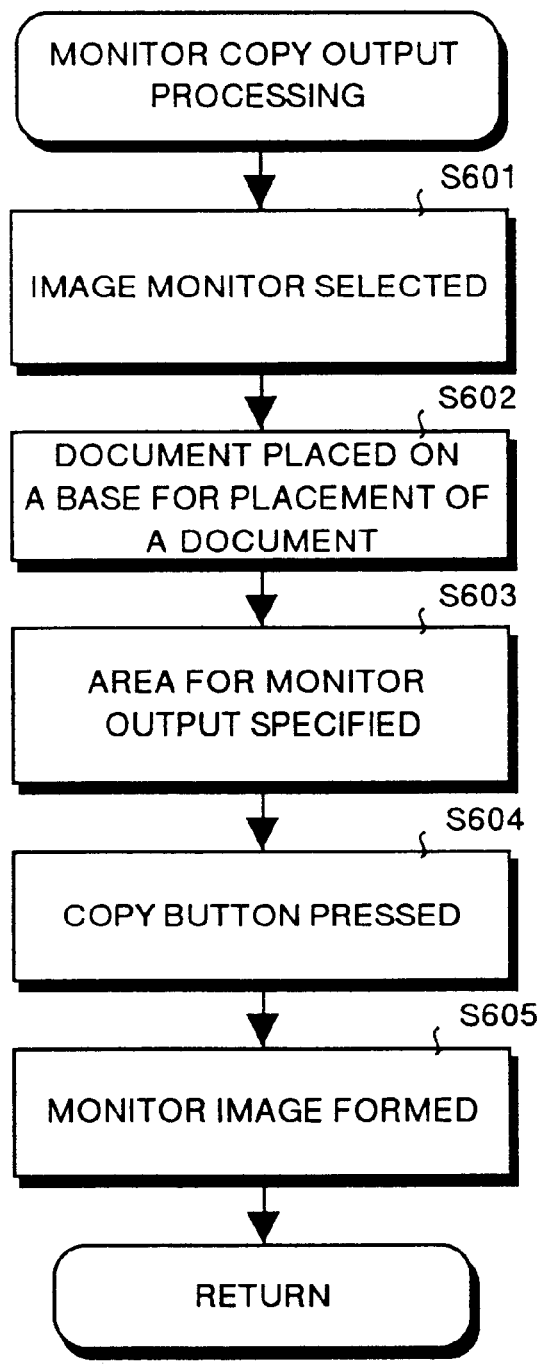
FIG. 6 is an operational flow chart for a monitor copying function which is a key feature in Embodiment 1.

In the flow chart for monitor copy output processing shown in FIG. 6, at first, an image monitor mode key is selected from a group of mode specifying keys (not shown herein) displayed on a liquid crystal screen 301 (Refer to FIG. 7) of an operating section 42 of the basic body of the copying machine 101 (S601).

Figure 7:
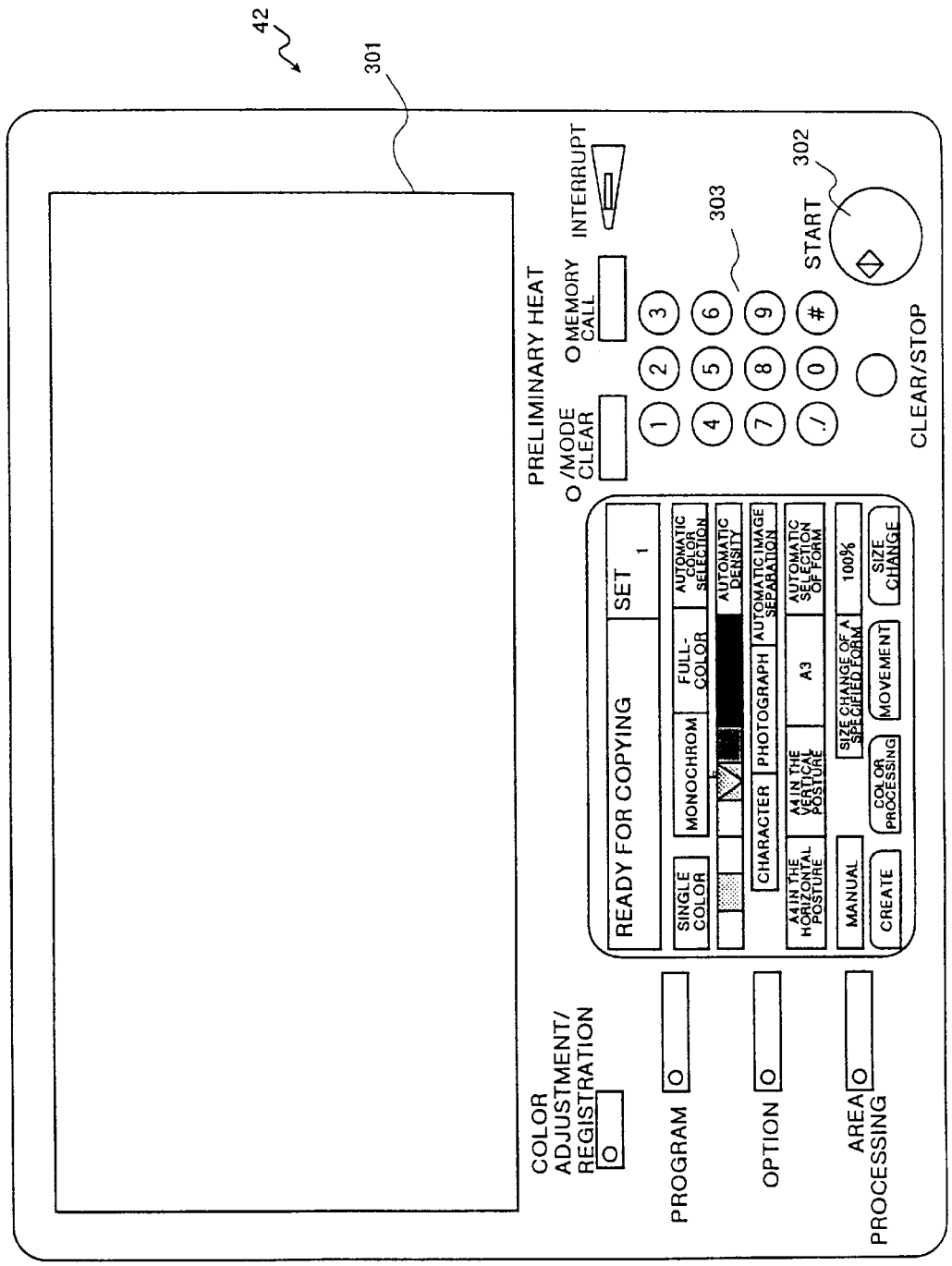
FIG. 7 is a view showing an operating section in the copying machine shown in FIG. 2.
Figure 8:
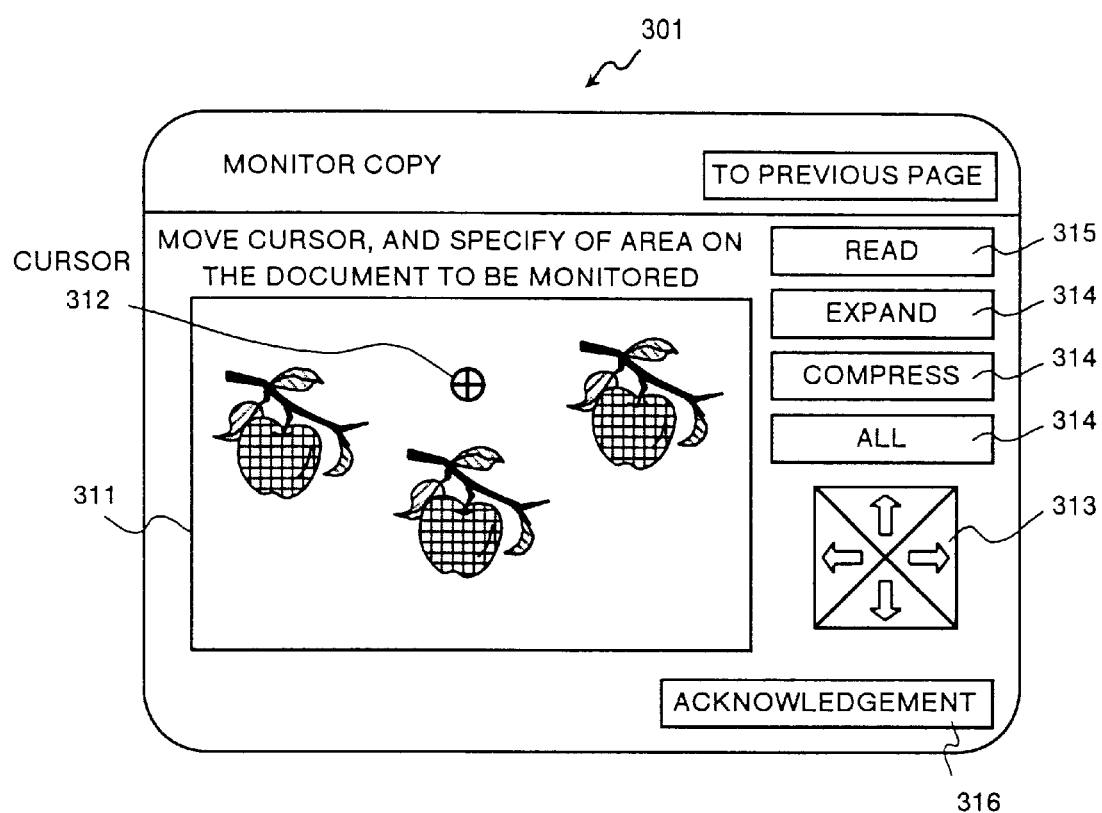
FIG. 8 is a view showing an example of display for an operation pattern on the liquid crystal screen shown in FIG. 7.

Then a user sets a document to be copied on a base for placement of a document (S602), when the document is shown, as shown in FIG. 8, on the liquid crystal screen 301 of the operating section (Refer to FIG. 7).

Then in step S603, the user specifies a particular area to be monitored. Herein the liquid crystal screen 301 works as a touch panel key, and when an arbitrary point on the screen is lightly touched with a finger tip or the like, a position on the screen is specified. Displayed in FIG. 8 showing display on the liquid crystal screen 301 are a screen 311 showing a document to be copied, a cursor 312 used to specify a position of a document to be monitored and copied, arrow-mark keys 313 for moving the cursor up, down, leftwards, or rightwards, a key 314 for indicating expansion of a display screen or display with the same size, and a read key 315 for changing a document and read the document again.

For instance, a user specifies an area around a center of a remarked portion of a document displayed on the screen 311 showing the document. With this operation, an area with a specified size around the inputted position is set as a specified area. When it is not necessary to specify an area, a specified area is automatically set in step S604 by pressing an acknowledgement key 316. Although not described specifically herein, a form of a specified area in this step can previously be set.

Then, when a start key 302 (Refer to FIG. 7) in the operating section 42 is pressed, a monitor image is formed (S605).

Figure 9:
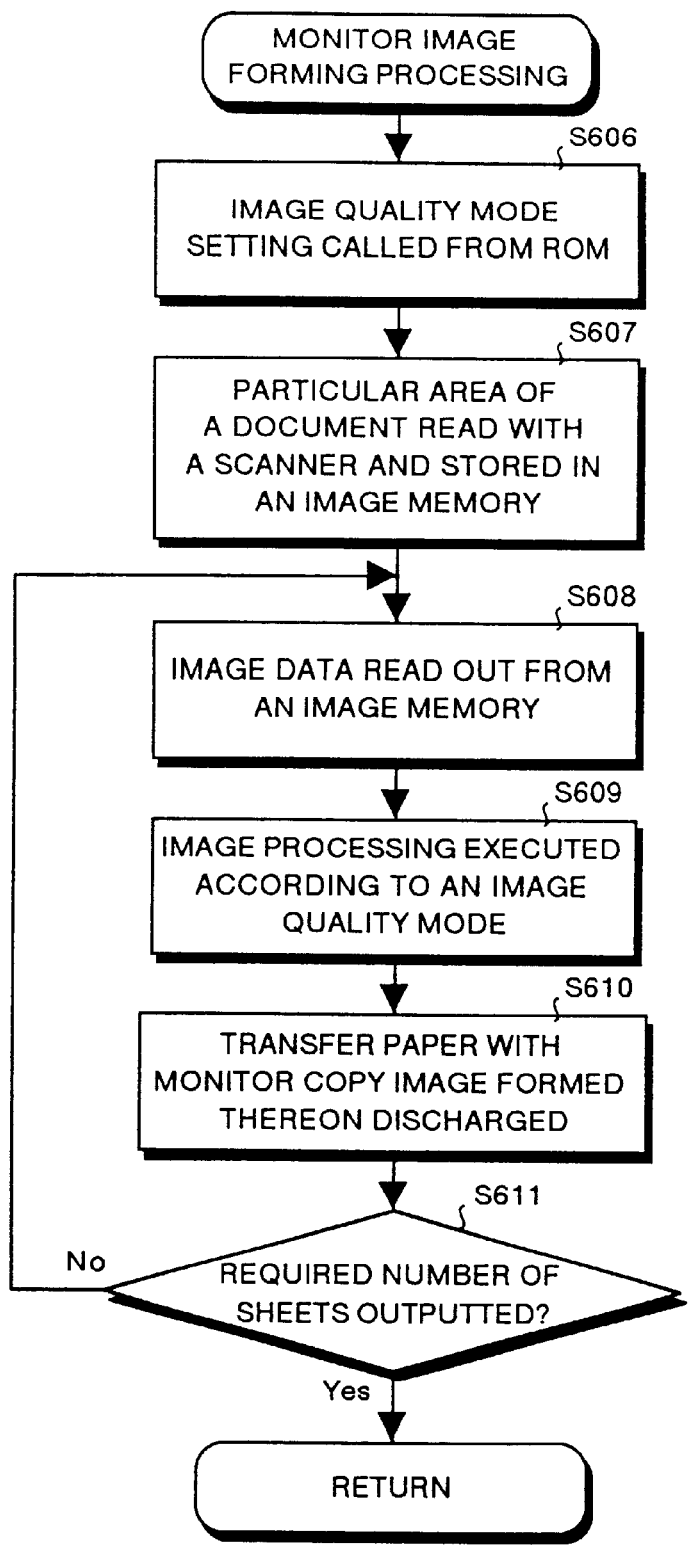
FIG. 9 is an operational flow chart for the monitor image forming processing in S605 in FIG. 6.

Next, further detailed description is made for the monitor image forming processing with reference to the flow chart shown in FIG. 9. In step S605 in FIG. 6, when the start key 302 is pressed, the CPU 30 starts the monitor image forming processing, and at first calls out necessary information such as image processing parameters for an image quality mode to be provided as monitor output from the ROM 31 (S606). Then a particular area in the document is read with the scanner 220, and the data is stored in the image memory 224 (S607).

Then image data to be provided as monitor output is read out from the image memory 224 (S608), and image processing is executed by using image processing parameters corresponding to the image quality mode (S609). Then, images of the particular area having been subjected to image processing in a plurality types of image quality mode are formed at different positions on the same form, and transfer paper with monitor copy images (monitor image) formed thereon is discharged (S610). Namely, in the printer section shown in FIG. 3, a latent image is formed with a write unit, the latent image is converted to a visual image with Y, M, C, and K toners, and the monitor image is formed on transfer paper.

Then determination is made as to whether a required number of sheets of the image have been outputted or not (S611), and if it is determined that a required number of sheets of the image have been outputted, the processing is terminated. For instance, if the number of sheets of the image is 2 sheets, after one sheet is discharged, the separating sequence in step S608 and the operation is executed again, and then the processing is terminated.

Figure 10:
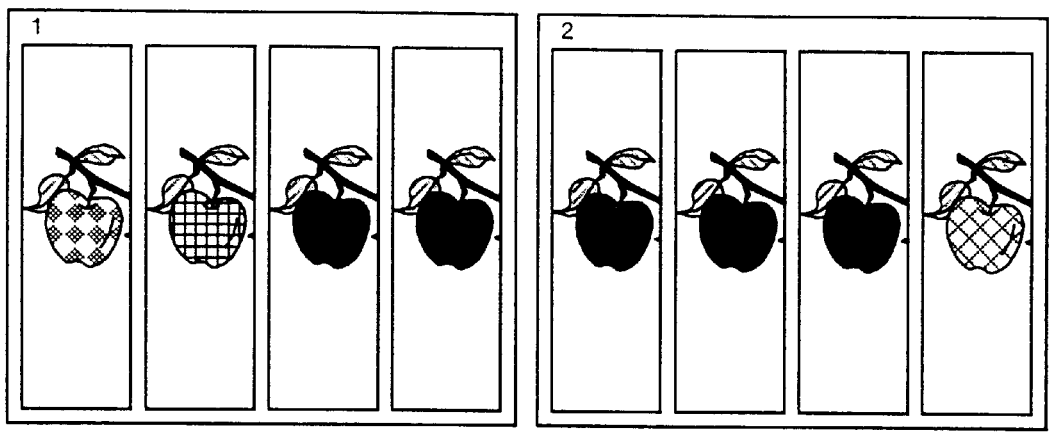
FIG. 10 is an explanatory view showing an example of an output of a monitor image in Embodiment 1.

FIG. 10 shows an example of monitor image. For instance, if there are 8 types of selectable image quality mode, images (monitor images) are formed at different positions on one sheet of form in 4 types of image quality mode for the same monitor document (an image of the particular area: monitor image data according to the present invention), and images (monitor images) in totally 8 types of image quality mode are formed on two sheets of form.

It should be noted that a portion or all of the following setting may be included as image quality modes for forming the monitor image.

1. Image parameters each corresponding to a type of sheet document include a character document, a silver-salt (development) document, a printed document, a document printed with an ink jet, a document written with a fluorescent pen, a map, a thermally transferred document or the like.

2. Image processing parameters corresponding to types of solid document include previous metal, metal, and textile.

3. Further image processing parameters may be set according to whether the UCR rate is large or small, according to a degree of smoothing with a space filter coefficient or a degree of emphasis of an edge, and according to a dither system such as a dot concentrating type or an error diffusion type as well as to a dither size.

Also it is possible to change image processing parameters for a particular image quality mode according to a manufacturer and to output the image as a monitor copy image.

To describe a case of a document printed with an ink jet as an example, in a case of a document printed with an ink jet, a color taste and a resolution vary according to a manufacturer of the ink jet printer or a type of the ink jet printer. For this reason, with the same image processing parameters, faithfulness of a copied image in terms of colors may be excellent or may be insufficient according to a manufacturer of the ink jet printer used for preparation of the document.

To prevent the troubles as described above, in the ink jet mode, to obtain a copied image as faithful as possible to the document printed with an ink jet printer, various types of image processing parameters are prepared according to manufacturers and types of ink jet printers. In Embodiment 1 of the present invention, the image processing parameters are set as ink jet modes 1 to 8 as described below.

For instance, if the ink jet mode is selected when a monitor image is outputted, a particular area of a document is processed according to the image processing parameters for the ink jet modes 1 to 8, and the monitor images are outputted according to the image parameters. The user selects a monitor image most faithful to the document from the monitor images outputted according to the image processing parameters for the ink jet modes 1 to 8. For instance, if the selected monitor image is that outputted according to image processing parameters for ink jet mode 3, an optimal image can be obtained by copying the document in the ink jet mode 3.

With this configuration, a user can easily select a mode for image processing enabling most preferable reproduction of a document without paying attention to a manufacturer or a type of an ink jet printer nor to a resolution thereof.

Examples of image processing parameters for the ink jet modes 1 to 8 are shown in FIG. 11. Herein, the ink jet modes 1 to 3 correspond to an ink jet printer manufacturer A, ink jet modes 4 to 6 correspond to an ink jet printer manufacturer B, and ink jet modes 7 to 8 correspond to an ink jet printer manufacturer C. As a color taste of ink to be used varies according to a manufacturer of an ink jet printer, so that there are prepared color correction coefficient A to C for the ink jet modes.

Of the ink jet modes 1 to 3, the ink jet modes 1, 2 are for the same ink jet printer manufacturer, but different image processing parameters are to be used according to each machine type. Four colors are used in an ink jet printer corresponding to the ink jet mode 1, and 6 colors are used in an ink jet printer corresponding to the ink jet mode 2. For this reason, a color reproducible area and a color taste vary according to each of these two types of ink jet printer, so that it is necessary to select an appropriate color correction coefficient to be used in the ink jet mode. In the ink jet modes 1 and 3, a degree of smoothing of a space filter coefficient for image processing is changed according to a difference of the resolution (for instance, 720 DPI and 180 DPI. Herein DPI is Dot Per Inch) so that moire can be reduced.

Next description is made for items used and not used according to a result of image separation in FIG. 11.

In the image processing, to improve faithfulness of copied characters and copied pictures to the documents, image processing parameters are changed according to a type of a document to be copied. In a case of an ordinary document, character images and picture images coexist on a sheet of a document, so that determination is made by scanning images with a scanner and checking the scanned image data and peripheral image data as to whether processing for a character image is to be executed or processing for a picture image is to be executed.

This operation is automatically executed for separating characters from pictures, and a result of determination such as a character on white background, a character on a half tone area, a half tone area, or a picture (described as a result of image separation hereinafter) is delivered to the subsequent image processing blocks 205 to 210 by setting appropriate parameters in the image separating circuit 204. Image processing parameters are switched according to this result of image separation in the image processing blocks 205 to 210. However, the parameters depend on a resolution of a document, and if a resolution of a document assumed when the image processing parameters set in the image separating circuit 204 are decided is different from a resolution of an actual document, sometimes a so-called separation error occurs in which a character is mistaken for a picture or a picture is mistaken for a character, and a not-preferable image may be obtained.

In a case of a document printed with an ink jet printer, a resolution ranges from a low resolution of around 10 lines to a high resolution of 360 lines, so that it is necessary to change image separation parameters according to a resolution of a document to be copied. It should be noted that a space filter is provided so that a result of image separation will not be applied to a document with low resolution.

In the gradation processing, in addition to the dither processing described above, error diffusion processing used for a document printed with an ink jet printer can be selected according to a type of document to be copied.

Figure 12:
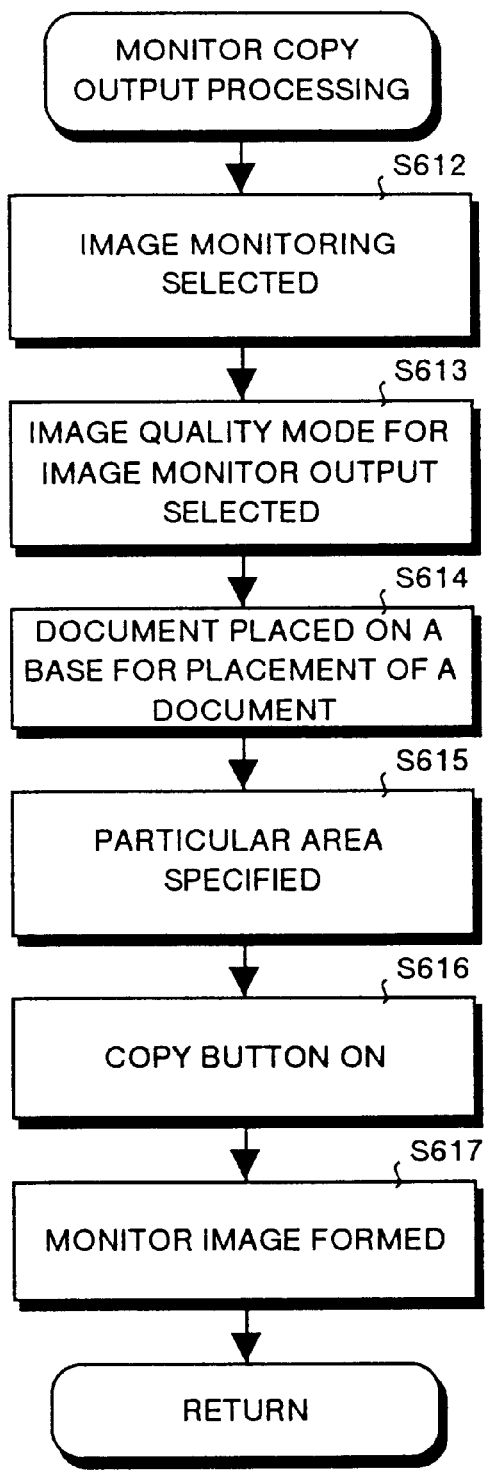
FIG. 12 is a flow chart showing monitor copy output processing in a case where only an image quality mode, for which a monitor copy is required, is selected.

Next description is made for a case where an image quality mode is selected and a monitor copy is outputted in the monitor copy output processing with reference to a flow chart for the monitor copy output processing in FIG. 12. When many image quality modes are available, the number of output sheets of image is suppressed by selecting only an image quality mode in which a monitor copy is to be outputted, and also transfer paper and toner are saved.

Also a user selects an image monitor mode key (not shown in the figure) on the liquid crystal screen 301 in the operating section 42 provided on a top surface of the basic body of the copying machine 101 (S612), and then selects an image quality mode in which a monitor image is to be outputted (S613).

Figure 13:
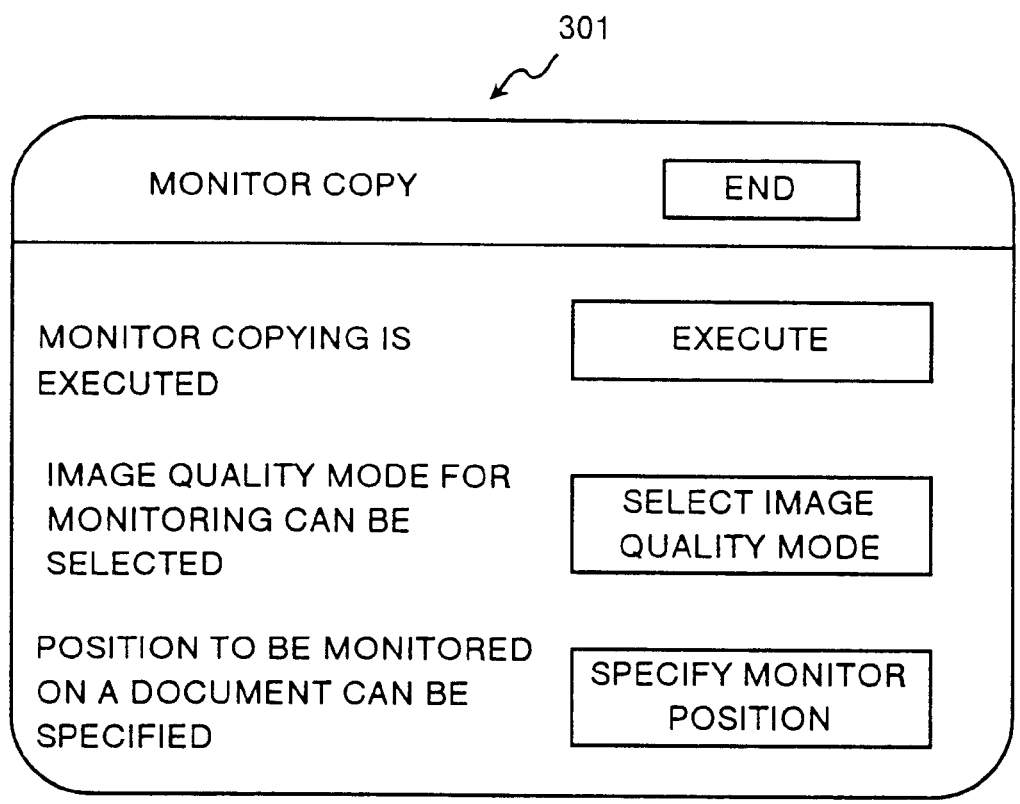
FIG. 13 is an explanatory view showing an example of an image quality mode selection screen in Embodiment 1.
Figure 14:
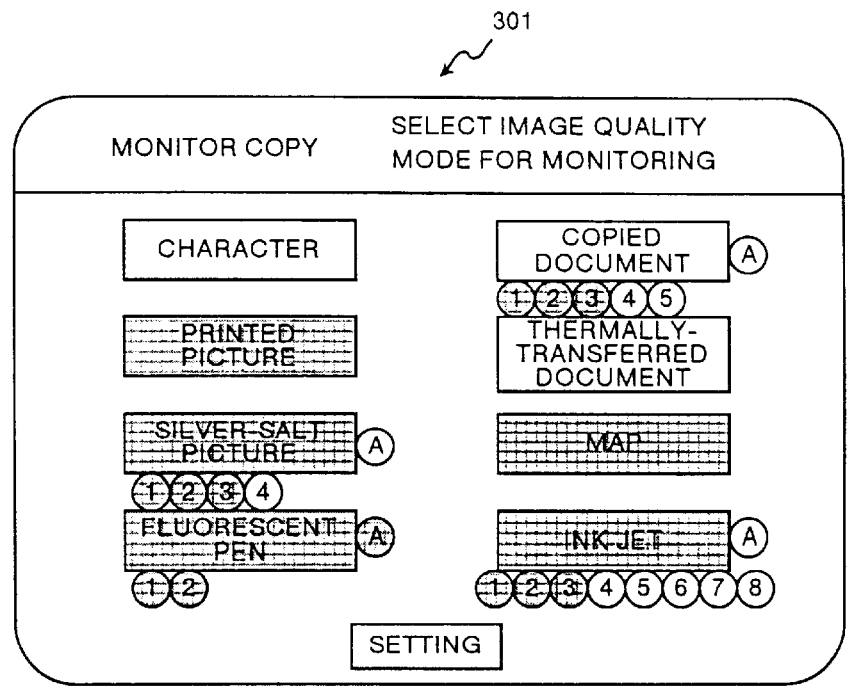
FIG. 14 is an explanatory view showing an example of an image quality selection screen in Embodiment 1.

It should be noted that the selection of an image quality mode in which a monitor image is to be outputted is executed as follows. In the screen 301 shown in FIG. 13, when "Select Image Quality Mode" is selected, the screen in FIG. 14 is displayed. The user selects an image quality mode in which a monitor image is to be outputted from the image quality modes shown in FIG. 14. A color taste or a resolution varies in each image quality mode according to a manufacturer and a machine type of an ink jet printer to be used. For this reason, to reproduce an image as faithful as possible to each document printed with an in ink jet printer, various image processing parameters are prepared according to manufacturers and machine types of ink jet printers. In this case, a user can select all of the ink jet modes 1 to 8 by specifying the ink jet mode A (Herein A means "all"). Also any numbers from 1 to 8 can be specified based on the user's experiment.

Next, a user sets a document to be copied on a base for placement of a document (S614), when a screen 311 showing the document is displayed on the liquid crystal screen 301 in the operating section 42 as shown in FIG. 8. Then a user specifies a particular area to be monitored on this screen 311 (S615). For instance, a user specifies a point near a center of a particular area to be monitored on the document displayed on the screen 311. With this operation, an area with a specified size around the inputted position is set as a specified area. When there is no specific area to be specified and control shifts to the next step S616, a specified area is automatically set. Then when the start key 302 is pressed in step S616, formation of a monitor image is executed (S617).

Herein, when setting an image quality mode, even if a user selects a preferable image from a plurality of monitor images, unless the user understand in which mode the monitor image is outputted on the transfer paper, the user can not acknowledge the monitor image to set a desired image quality mode. So to clearly show correspondence between a monitor image and an image quality mode, a mode name or a sign is outputted inside or adjacent to each monitor image. More specifically this screen display can easily be realized by reading an image quality mode name (character data) from the ROM 31 in the image processing unit and generating the image mode name with the pattern generating circuit 221 as image data.

Figure 15:
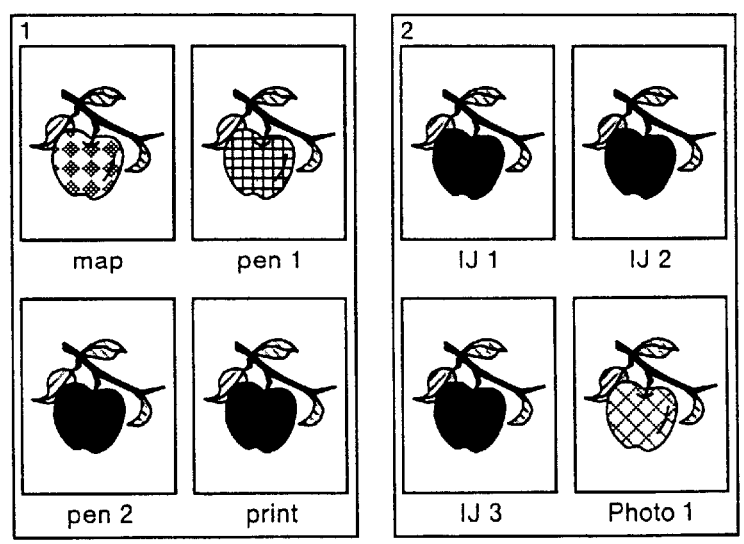
FIG. 15 is an explanatory view showing an example in which a corresponding mode name is outputted on transfer paper together with the monitor image in Embodiment 1.

FIG. 15 shows an example in which a monitor image is outputted onto transfer paper together with a corresponding image quality mode name, and in this figure, map indicates a map mode, while pen1 and pen2 indicate a fluorescent pen mode, and a color conversion coefficient in pen1 is different from that in pen2. As a difference between pen1 and pen2, a different color conversion coefficient for improving faithfulness of a copied image to the document may be set in each of pen1 and pen2 according to a manufacturer of a fluorescent pen, or emphasis is put on a color taste of a document in pen1, while density of colors other than black may be made larger in pen2 to emphasize a difference from black characters. For instance, as shown in FIG. 16, image processing parameters for the fluorescent pen mode and character mode may be set simultaneously.

The display of print indicates a printed document mode, and IJ1 to IJ3 correspond to the ink jet modes 1 to 3. FIG. 17 shows image processing parameters for a copied document mode and a printed picture document mode.

Photo1 indicates a silver-salt picture mode 1. FIG. 18 shows setting of image processing for the silver-salt picture mode.

It should be noted that description of Embodiment 1 assumed a case where character data (image quality mode name) is outputted for each image quality mode as shown in FIG. 15, but the configuration is not limited to this one, and for instance, a specific number may be assigned to each image quality mode and the specific number may be outputted.

Figure 19:
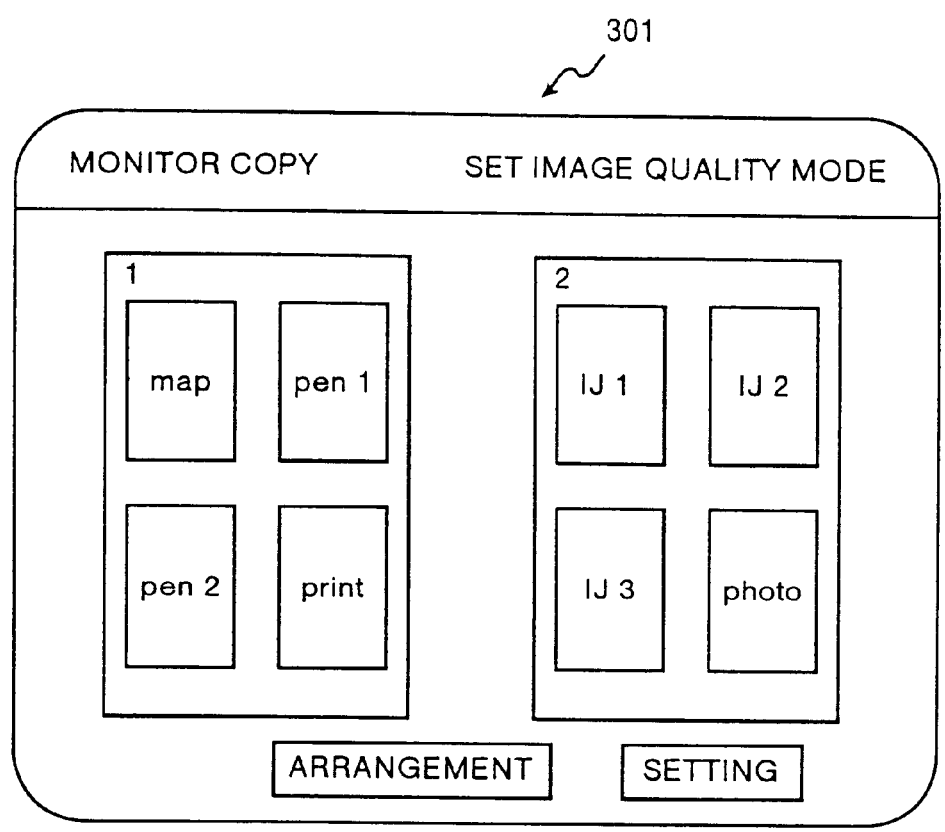
FIG. 19 is an explanatory view showing an example in which an image quality mode is set by using the operating section.

Next description is made for a method in which a particular image quality mode is selected from a plurality of monitor images formed in different areas on transfer paper as shown in FIG. 15 and the selected image quality mode is inputted (set) from the operating section 42. The screen as shown in FIG. 19 is displayed on the liquid crystal screen 301 of the operating section 42. In this figure, the numbers 1 and 2 indicate a first sheet of monitor copy and a second sheet of monitor copy. The user selects an image with presumably preferable finishing from the monitor images (those shown in FIG. 15) outputted on the transfer paper, and specifies the image on the liquid crystal screen 301 in FIG. 19. Such names as map and pen1 are used, but this type of name may not be used, because arrangement of images on the liquid crystal screen is the same as that of images on transfer paper so that specification can easily be executed. Also only signs corresponding the monitor images may be displayed without paying attention to arrangement thereof. With this feature, a user can select an image in a preferable image quality mode only by visually checking monitor images without being aware of any image quality mode in detail.

In the image forming apparatus according to Embodiment 2 of the present invention, when setting a particular area to be processed as a monitor image, it is possible only to specify setting so that a plurality of monitor images are accommodated on a specified transfer material. It should be noted that basic configuration of and operations in Embodiment 2 are the same as those in Embodiment 1 and description is made only for different sections herein.

Figure 20:
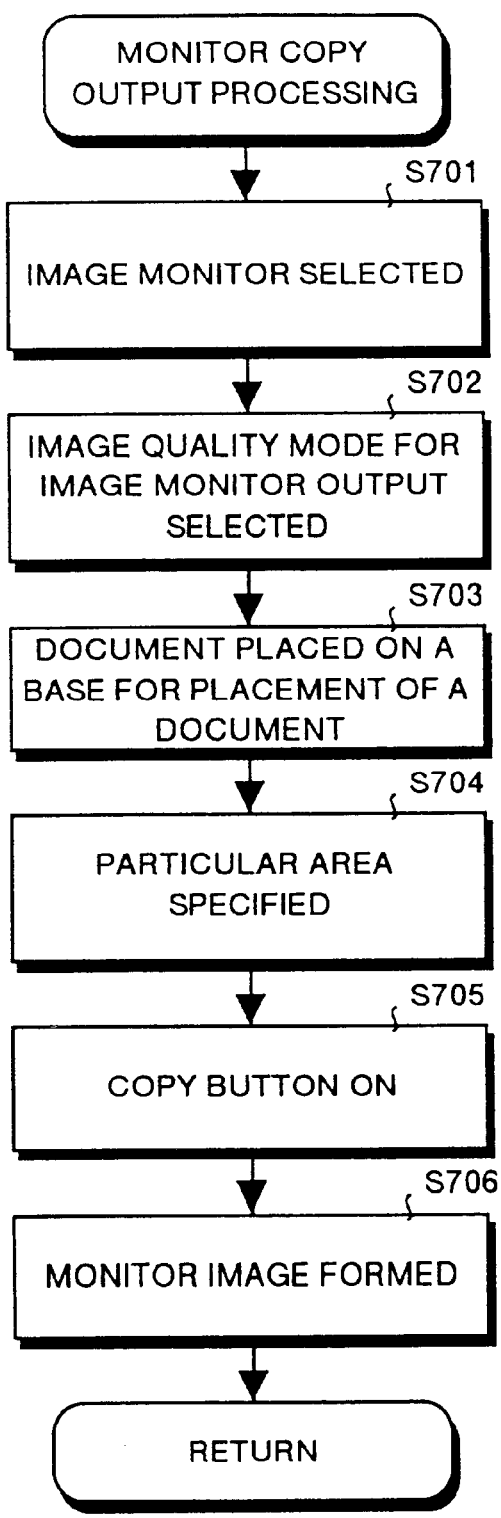
FIG. 20 is a flow chart for monitor copy output processing in Embodiment 2 of the present invention.

FIG. 20 shows a flow chart for monitor copy output processing in Embodiment 2. At first, on the liquid crystal screen 301 of the operating section 42 provided on a top surface of the basic body of the copying machine 101, a user selects an image monitor mode key (not shown) (S701), and then selects an image quality mode in which the monitor image is to be outputted (S702). It should be noted that selection of an image quality mode in which the monitor image is to be outputted is selected by using the screen 301 shown in FIG. 13 as well as in FIG. 14 like in Embodiment 1.

Then a user sets a document to be copied on a base for placement of a document (S703), when the screen 311 showing the document is displayed on the liquid crystal screen 301 of the operating section 42 as shown in FIG. 8. Then, the user specifies a particular area to be monitored on the screen 311 (S704). When any area is not required to be especially specified, the user does not carry out this specification, and when system control shifts to step S705, a specific area is automatically specified.

Then, when the user presses the start key 302 in step S705, formation of monitor images is executed (S706).

The specific processing for setting a particular area to be monitored in step S704 is as follows.

The liquid crystal screen 301 functions as a touch panel keyboard, and an arbitrary area on the screen can be specified by lightly touching a position corresponding to the area on the screen with a finger tip or the like.

On the liquid crystal screen 301 in FIG. 8, if a user specifies a position close to a center of a portion to be remarked of the document shown on the screen 311 showing the document, an area with a specified size around the specified position as a center is set as a specified area.

It should be noted that a size of the specified area is decided according to the number of image quality modes selected in step S702 in the flow chart shown in FIG. 20. For instance, when a area close to a center of a portion to be remarked of the document is specified, all the selected image quality modes are entered on a specified form, and setting is executed so that a length of an outer frame of the specified area becomes shortest. However, also a shape of a specified area can be set previously.

Also as another method of specifying a particular area, for instance when specifying two points diagonally opposite to each other, a frame having a shape closest to the specified area is set. Next description is made for an example of specifying two points diagonally opposite to each other with reference to FIG. 21. On the screen 301 shown in FIG. 21, a user specifies a starting point 312A of the two points diagonally opposite to each other of an area the user wants to specify by moving the cursor 312, and then sets the cursor 312 on the end point 312B. When an image area enclosed by the two points diagonally opposite to each other is larger than an area possible to be specified, a maximum area having a shape closest to the specified area is displayed with a solid line and is set as a specified area.

Figure 21:
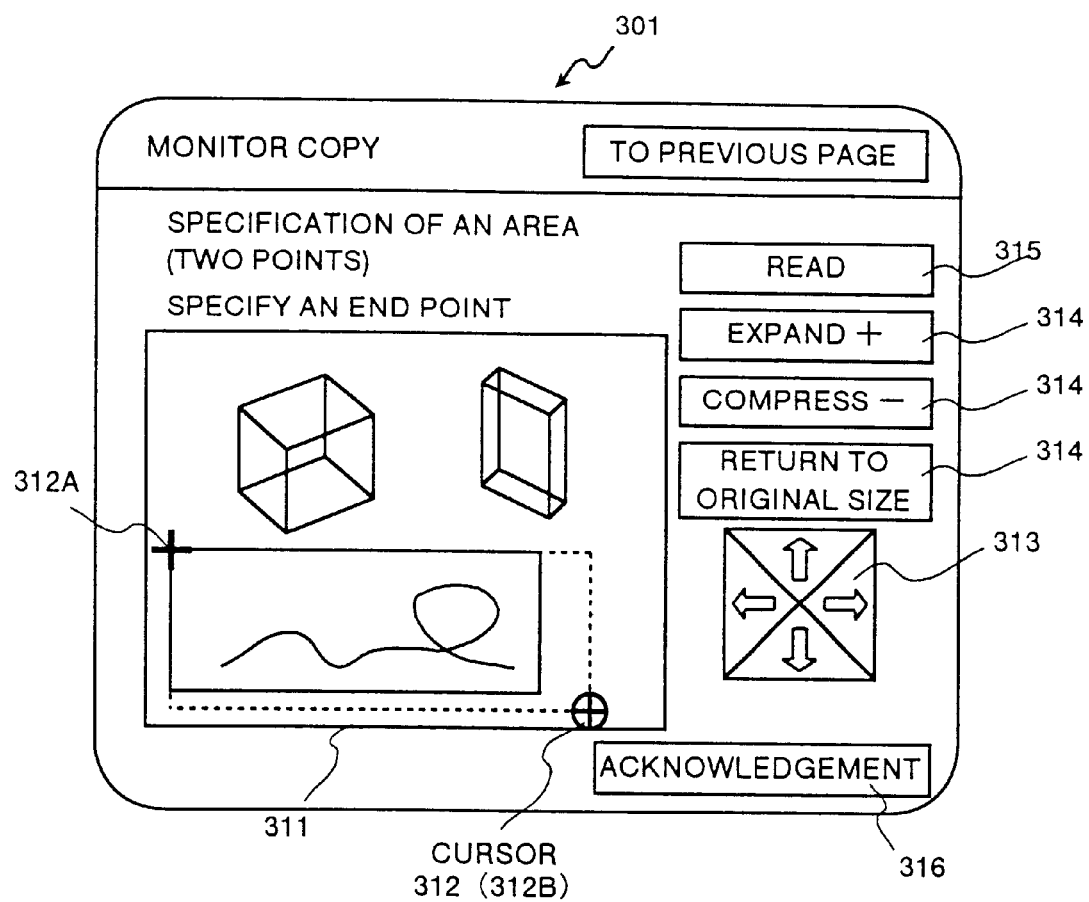
FIG. 21 is an explanatory view showing an example of specifying a particular area in Embodiment 2.

It should be noted that the screen 311 showing a document, the cursor 312 used for specifying a position of the document to be copied, arrow mark keys 313 of up, down, leftward, and rightward each for indicating a direction of movement of the cursor, a key 314 for specifying display of the screen with an enlarged size or an equal size, a read key 315 for changing the document and reading it again, and a acknowledgement key 316 or acknowledging specification of the particular area are displayed on the screen 301 in FIG. 21.

Figure 22:
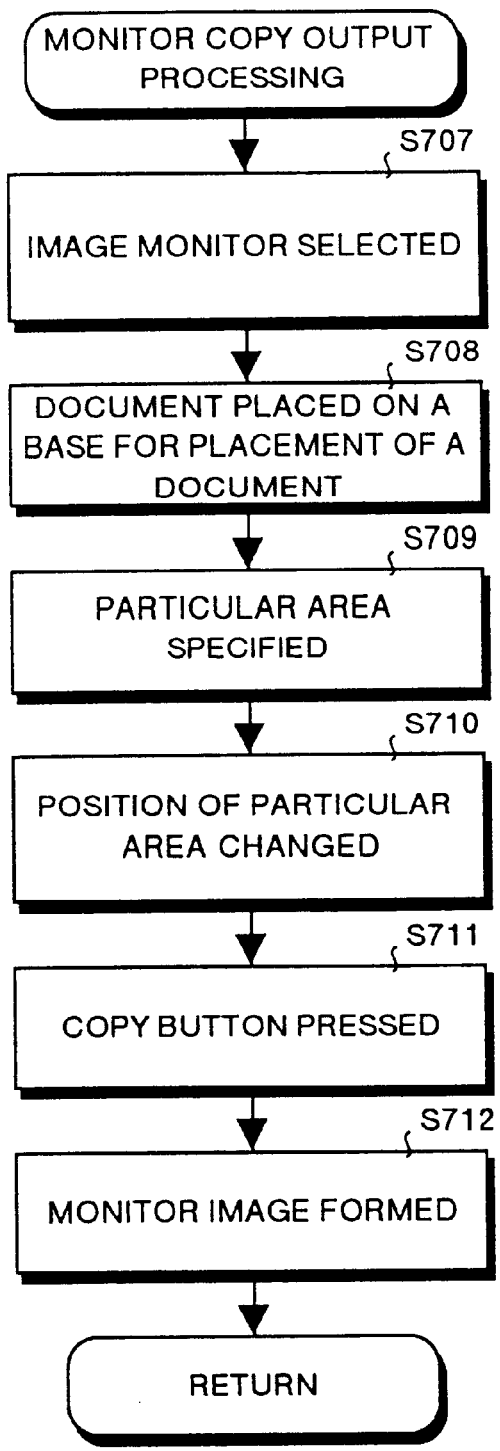
FIG. 22 is a flow chart showing a case where monitor images formed on transfer paper are rearranged and then outputted in Embodiment 2.

As shown in the flow chart in FIG. 22, monitor images formed on transfer paper based on a particular area can be rearranged in output. Namely, in this processing, at first, on the liquid crystal screen 301 of the operating section 42, an image monitor mode key not shown in the figure is selected (S707). Then, a document to be copied is set on a base for placement of a document (S708), when the screen 311 showing the document is displayed on the liquid crystal screen 301 of the operating section 42 as shown in FIG. 8. Then, a particular area to be monitored is specified on this screen 311 (S709). It should be noted that, when no particular area is to be specified, a specified area is automatically set by selecting the acknowledgement key 316.

Figure 23:
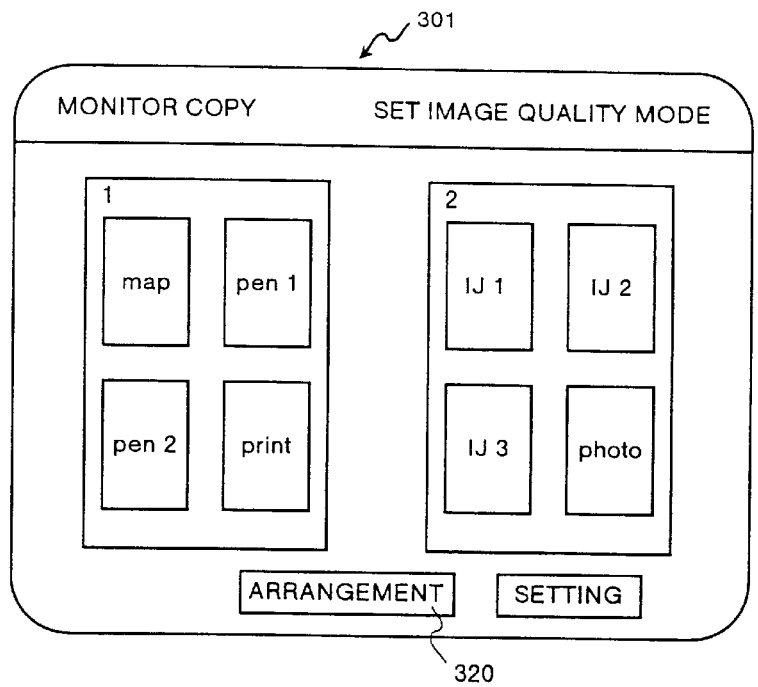
FIG. 23 is an explanatory view showing an example of a method of rearranging monitor images in Embodiment 2.
Figure 24:
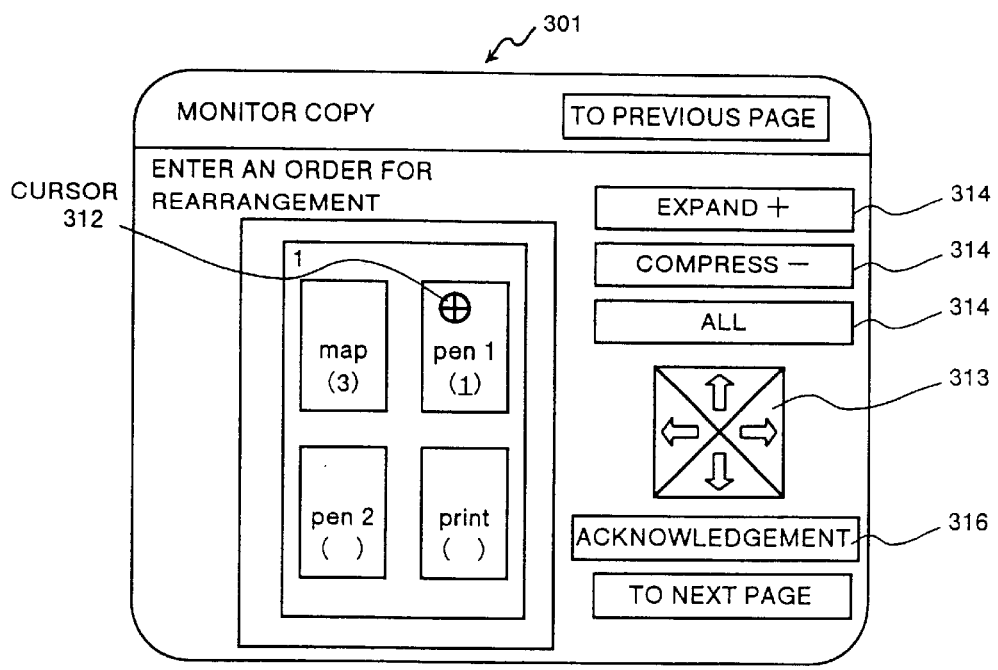
FIG. 24 is an explanatory view showing an example of a method of rearranging monitor images in Embodiment 2.

Then the screen as shown in FIG. 23 is displayed. In this figure, the signs 1 and 2 indicate first and second sheets of monitor copy (on transfer paper with monitor images formed thereon) respectively. It should be noted that the screen in FIG. 23 corresponds to an example of output of the monitor images in FIG. 15. Then in step S710, when the allocate key 320 in FIG. 23 is selected, the display screen in FIG. 24 is displayed on the liquid crystal screen 301. In this step S710, a user can rearrange the monitor images so that those for a monitor mode can easily be compared to those in other image quality modes.

To described more detailedly, for instance, the liquid crystal screen 301 shown in FIG. 24 functions as a touch panel, and when a user moves the cursor 312 by touching an image area for each mode (herein each of the image areas indicated by map, pen1, pen2, and print) sets figures with the tenkey 303 in the operating section 42, the specified areas are rearranged according to a specified order of the figures. It should be noted that the cursor 312 can be moved also with a cursor move key 313. Then in step S711, when the start key 302 (Refer to FIG. 7), monitor images are formed in step S712.

As a user can easily compare monitor images to each other according to the user's preference by rearranging the monitor images in output, comparison of monitor images can easily be executed, which further improves the convenience. More specifically, if it is desired to compare a monitor image indicated by pen1 to that indicated by pen2, the two monitor images can easily be compared to each other by arranging the two monitor images in the horizontal direction.

Figure 25:
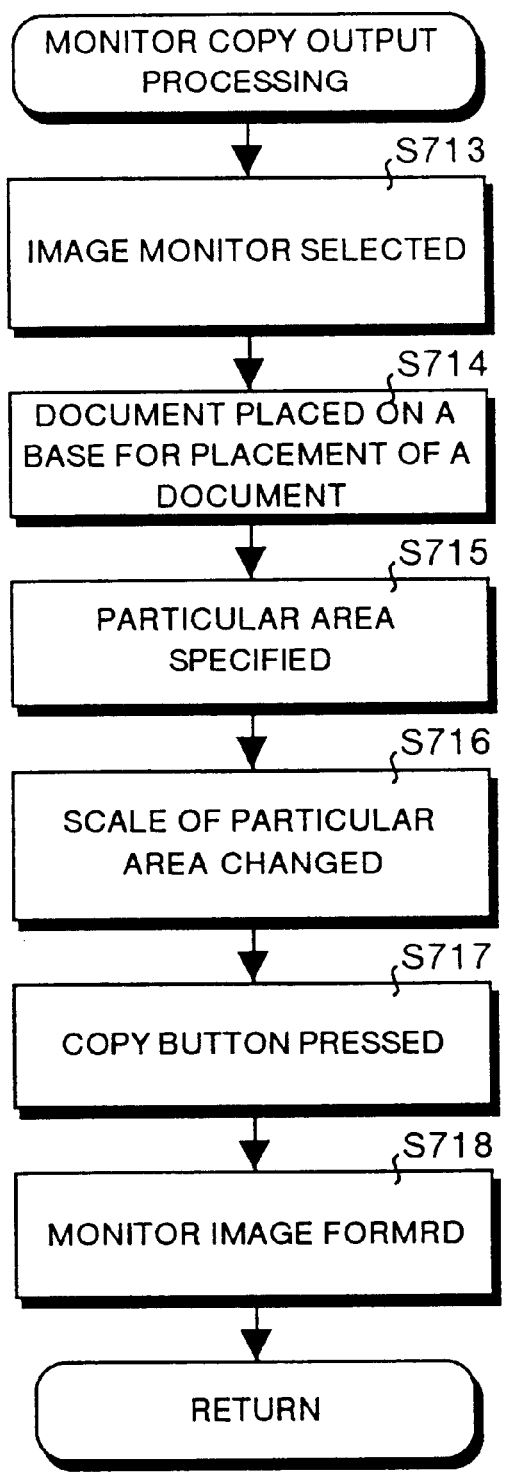
FIG. 25 is a flow chart showing an example of outputting a monitor image by changing a size of a particular area in Embodiment 2.

By the way, there may occur a case where a range of an image to be specified as a particular area is too large to be formed on a sheet of transfer paper. In this case, it is not possible to arrange a plurality of monitor images on a sheet of paper for comparison. In that case, a plurality of monitor images are arranged on a sheet of transfer paper and are compared to each other after a size of each monitor image is changed. Description is made for this case with reference to the flow chart shown in FIG. 25.

In this processing, the processing sequence from step S713 to step S715 is the same as that from step S707 to step S709 in the flow chart in FIG. 22. Then a scale of the a particular area is changed in step S716. More specifically, in the display screen 301 shown in FIG. 8, when a user sets the cursor 312 on a center of an area to be specified, the specified area with a size corresponding to a number indicating an image quality mode is displayed on the screen 301 (not shown herein). Then a preferred scale is selected with the key 314 to display the screen with an expanded, compressed, or equal size. Then, when the start key 302 (Refer to FIG. 7) is pressed in step S717, the particular area specified in step S718 is formed as a monitor image with the selected image.

An image forming apparatus according to Embodiment 3 has an image quality mode selecting unit for selecting a desired image quality mode from a plurality of image quality modes in each of which image processing parameters are set according to each of types of documents to be read, and the image quality mode selecting unit can select, when selecting a desired image quality mode from a plurality of image quality modes, a desired set of image processing parameters from a plurality sets of image processing parameters in an image quality mode for the same document type. More specifically, when selecting an image quality mode according to a document type, for instance, it is possible to select an appropriate set (or a desired set) of image processing parameters including a space filter, a gradation conversion table, a dither, and a color conversion coefficient from a plurality of sets previously prepared according to various types of printers which may be used for preparation of documents. It should be noted that the basic configuration of and operations in Embodiment 3 are the same as those in Embodiment 1 and description is made herein only for different portions.

Figure 26:
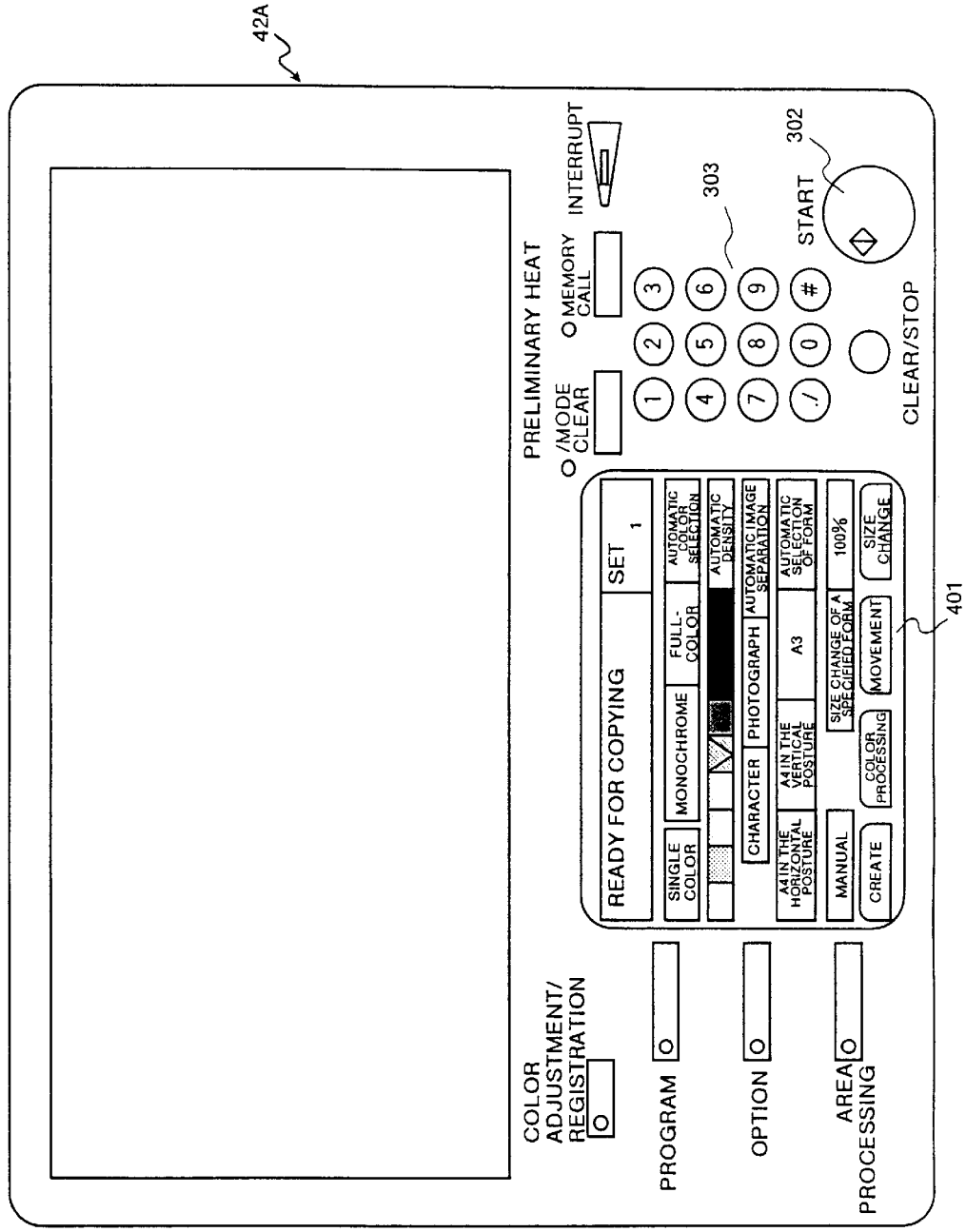
FIG. 26 is a block diagram showing the entire operating section in Embodiment 3 of the present invention.
Figure 27:
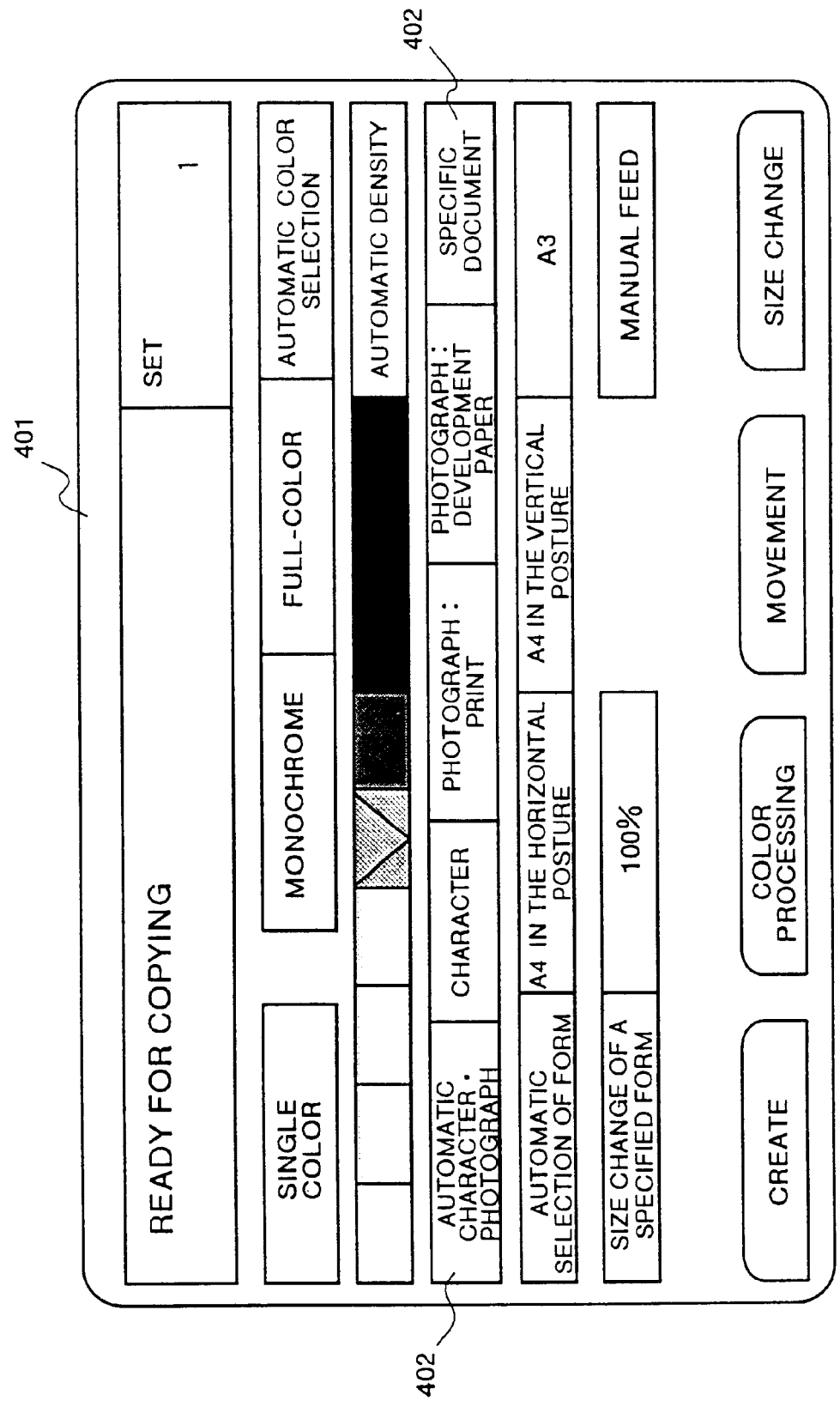
FIG. 27 is an explanatory view showing a liquid crystal screen of the operating section in Embodiment 3.

FIG. 26 shows the entire configuration of an operating section 42A in Embodiment 3, while FIG. 27 shows a liquid crystal screen 401 of the operating section 42A. Selection of an image quality mode is executed on the liquid crystal screen 401 in FIG. 27. In this figure, any of the 5 image quality modes; "automatic character/picture", "character", "picture: print" "picture: development paper", and "specific document" can be selected as an image mode select key 402.

Figure 28:
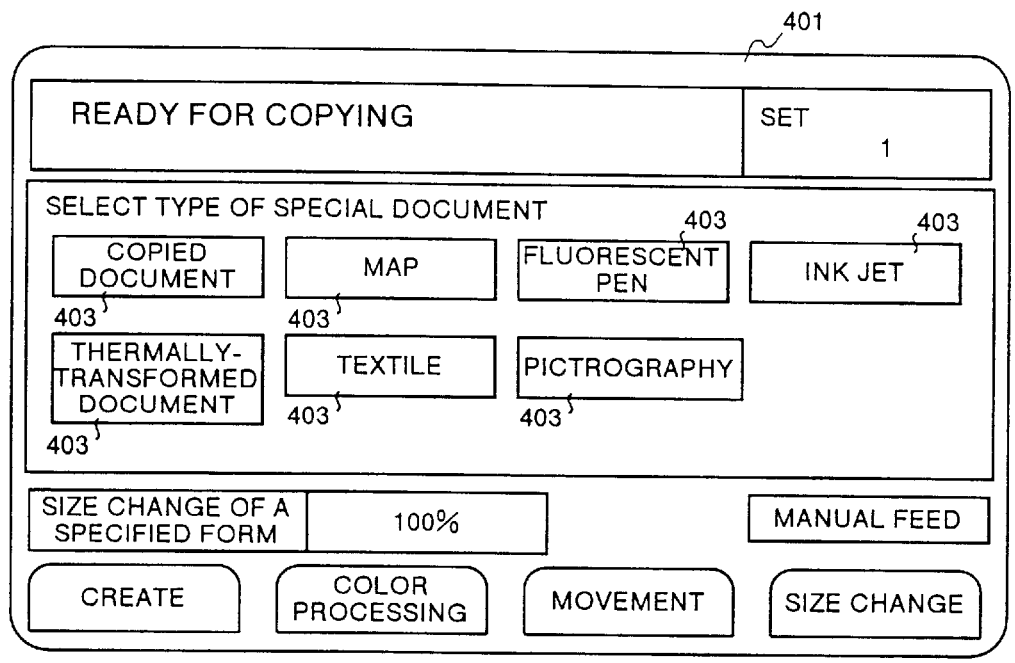
FIG. 28 is an explanatory view showing a liquid crystal screen of the operating section when "specific document" is selected in Embodiment 3.

Herein, when the image quality mode select key 402 corresponding to "specific document" is selected, the screen display is switched to the one shown in FIG. 28. This screen is for selection of a specific document, and any of 7 document types including "copied document", "map", "document written with a fluorescent pen", "document printed with an ink jet printer", "Thermally-transferred document", "textile document", and "pictography" can be selected as the document type select key 403.

Each image quality mode selectable with this document type select key 403 has one or more sets of image processing parameters, and one of the sets can be selected as a default value for each image quality mode.

FIG. 29 shows an example of a screen on which a default value for each image quality mode is selected. Herein description is made for the item of "document printed with an ink jet printer" as an example. In this figure, the item of "ink jet 5/8" inside a frame 404 indicates that, when an image quality mode is a document printed with an ink jet printer, the 5th one of 8 selectable default values has been selected.

When the default value for "ink jet 5/8" inside the frame 404 is to be changed, at first, a section displaying "ink jet" on the liquid crystal screen having a touch panel is selected. Then the screen in FIG. 30 is displayed. In FIG. 30, any of No. 1 to No. 8 can be selected as a default value for the image quality mode of "ink jet mode", and the figure shows that No. 2 has been selected with description for the set No. 2 displayed in detail.

Further detailed description is made for a document printed with an ink jet printer (described as ink jet document hereinafter) as an object for copying in the ink jet mode. A color taste or a resolution of an ink jet document varies according to a manufacturer and a type of the ink jet printer used for preparation of the document. For this reason, even in the same image processing, faithfulness of a copied image may be excellent or not excellent according to a manufacturer and a type of the ink jet printer used for preparation of the document.

To prevent troubles as described above, several sets of image processing parameters are prepared in the ink jet mode and are available according to a manufacturer and a type of the ink jet printer used for preparation of the document to reproduce an image as faithful as possible to the original ink jet document. These sets of image processing parameters are designated as ink jet modes 1 to 8 in Embodiment 3.

The ink jet modes 1 to 3 correspond to an ink jet printer manufacturer A, ink jet modes 4 to 6 correspond to an ink jet printer manufacturer B, and ink jet modes 7 to 8 correspond to an ink jet printer manufacturer C. A color taste of ink used for printing varies according to each manufacturer of ink jet printer, so that also there are prepared three types of color correction coefficient A to C for a color used in each ink jet mode.

Figure 31:
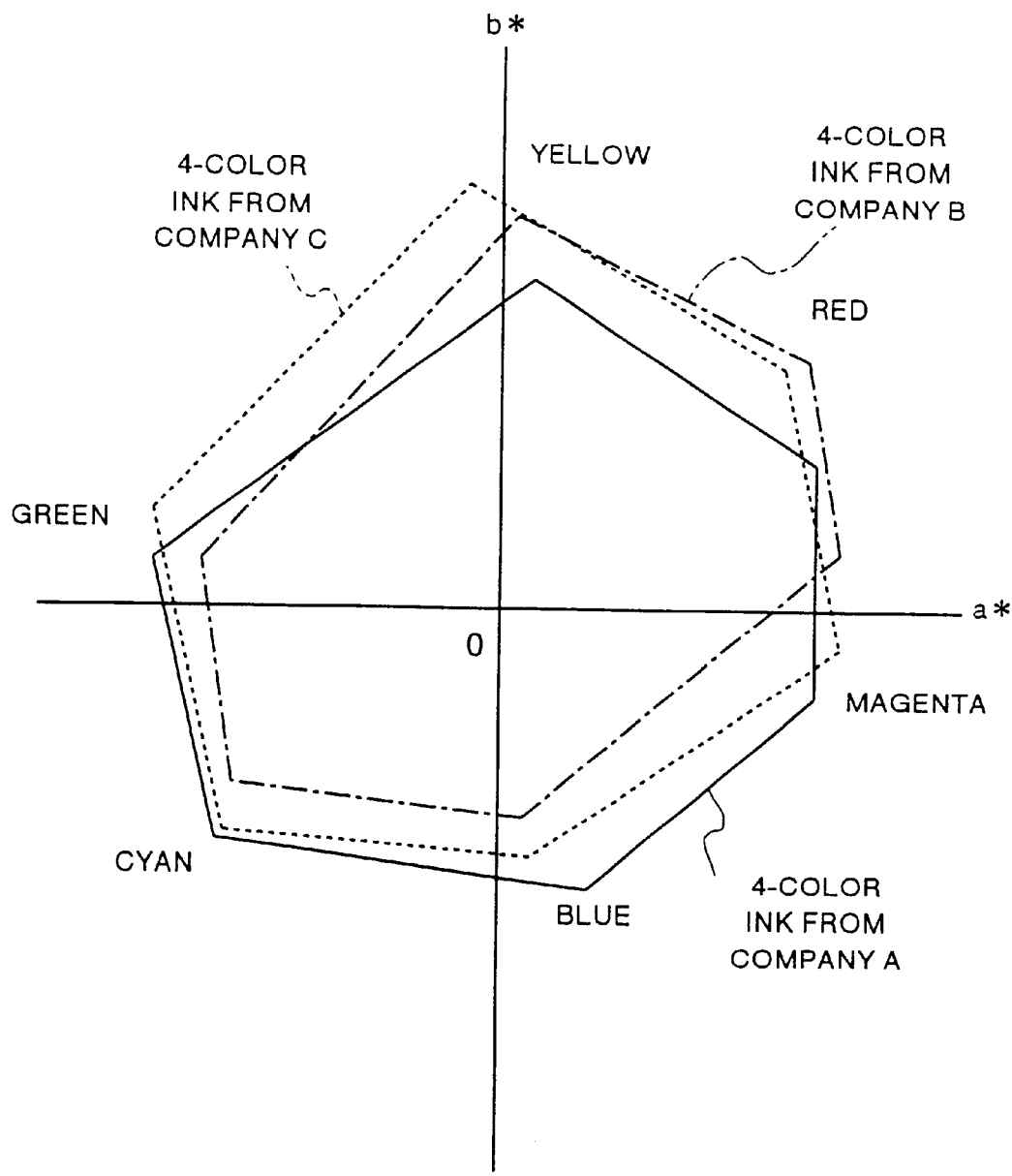
FIG. 31 is an explanatory view showing a color reproduced area with ink for an ink jet printer.

FIG. 31 is a projection view showing a case where color reproduction area for ink used by the printer manufacturers A to C are projected onto an a*b* plain expressed with an L*a*b* color system. L* indicates brightness, a* indicates reddishness in the plus direction and greeliness in the minus direction, and b* indicates yellowishness in the plus direction and blueishness in the minus direction. As a color reproduction range of ink varies according to each manufacturer, so that a color correction coefficient and parameters in the YMCK gradation correction table are changed according to a color taste of ink used by each manufacturer.

Of the ink jet modes 1 to 3, the ink jet modes 1, 2 are for printers provided by the same manufacturer A, but setting of image processing parameters varies according to a type of the printer. 4 colors are used in the ink jet printer which the ink jet mode 1 corresponds to and 6 colors are used in the ink jet printer which the ink jet mode 2 corresponds to, so that the color reproduction area and a taste of a reproduced color vary according to each machine type.

Figure 32:
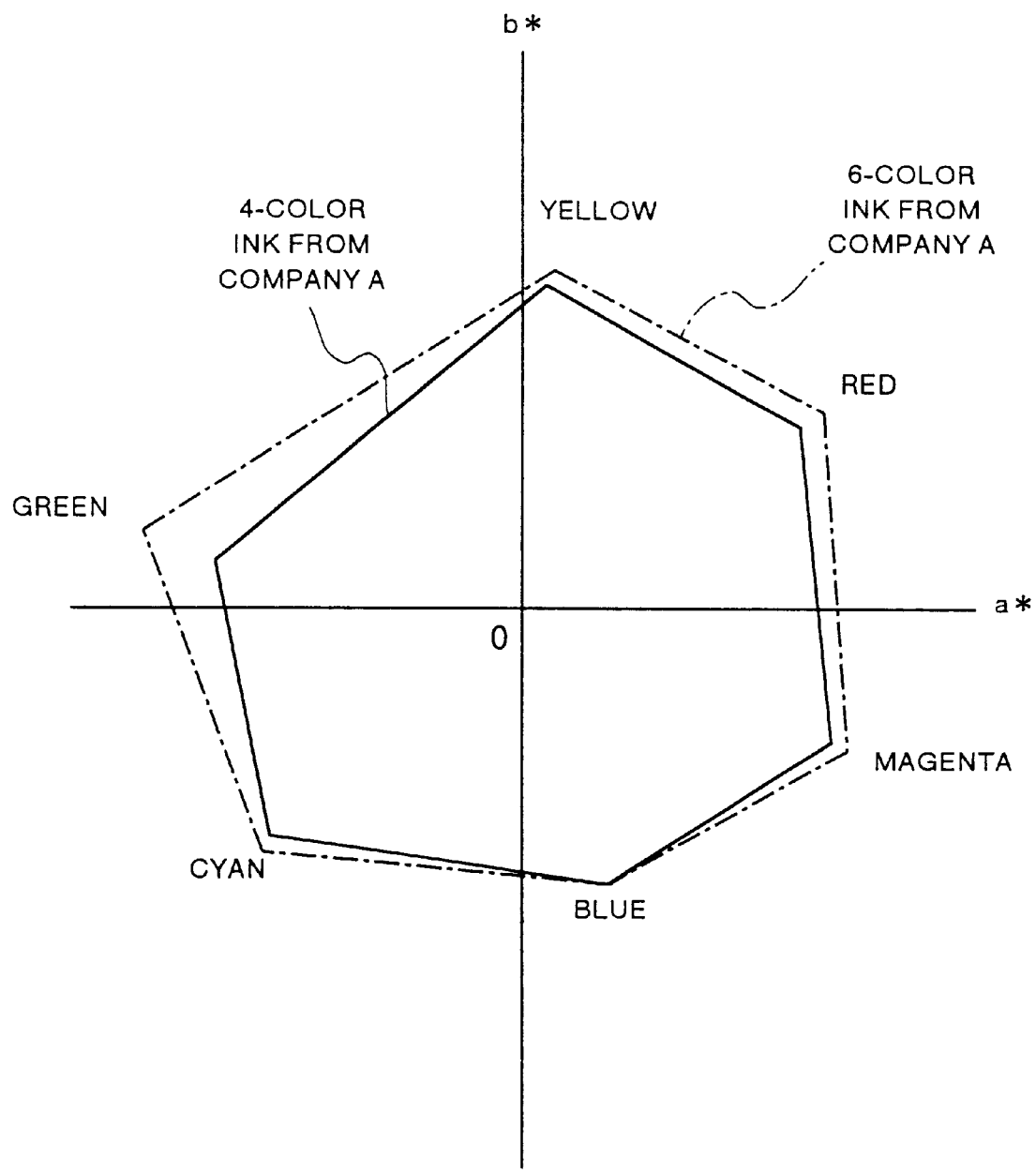
FIG. 32 is an explanatory view showing a color reproduced area with 6 color-types of ink (a* b* plain)
Figure 33:
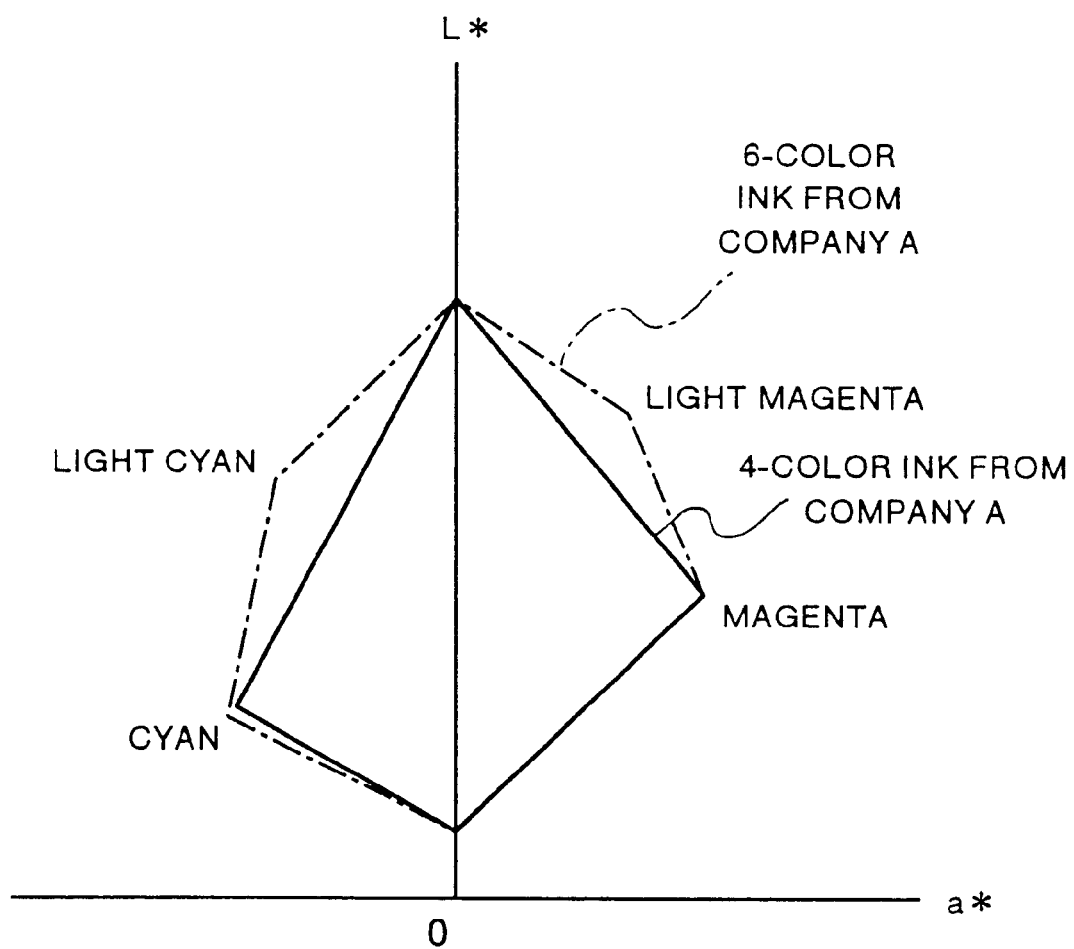
FIG. 33 is an explanatory view showing a color reproduced area with 6 color-types of ink (L* a* plain)

FIG. 32 shows a case of manufacturer A, and is a projection view showing a case where color reproduction areas, for 4 colors of yellow, magenta, cyan, and black and for 6 colors of light magenta and light cyan in addition to the 4 colors are projected in L*a*b* color system on the a*b* plain. FIG. 33 shows a case of manufacturer A, and is a projection view showing a case where color reproduction areas in the magenta and cyan directions of those for 4-color ink and 6-color ink are projected onto the L*a* plain.

When 6-color ink is used, as shown in FIG. 32, the color reproduction area expands in the green and red directions as compared to a case where 4-color ink is used. Also as shown in FIG. 33, the area indicating chroma expands in the brighter direction.

As described above, even with printed produced by the same manufacturer, different ink is used for each machine type (in this case, 4-color ink and 6-color ink), so that it is necessary to employ a different color correction coefficient in each ink jet mode.

Also in the ink jet modes 1 and 3, in response to a difference of a document's resolution (such as a difference between 720 DPI and 180 DPI), a degree of smoothing of a space filter coefficient for image processing is changed to reduce moire.

Then, description is made for items used and not used according to a result of image separation prepared as one of image processing parameters. In the image processing, to faithfulness of a copied character or a copied picture to the original document, image processing parameters for each are changed. In a case of an ordinary document, character images and picture images coexist, so that determination is made by reading the images with a scanner as to whether processing for a character image is to be made or processing for picture is to be made successively from the scanned image data and the peripheral image data.

This operation is an automatic one for separating characters from pictures, and a result of determination as to a character of a white background, a character of a half tone area, a half tone area, a picture or the like (described as a result of image separation hereinafter) to the image processing blocks 205 to 210 by setting appropriate parameters in the image separation circuit 204.

The image processing blocks 205 to 210 switch image processing parameters according to the result of image separation. If a resolution of parameters assumed when the parameters set in the image separating circuit 204 are decided according to the resolution of the document is different from that of an actual document, sometimes a so-called separation error may be generated in which a character may be mistaken for a picture or a picture for a character, which makes it impossible to obtain a desired image.

FIG. 34A to FIG. 34F are conceptual views each showing a copied image when an assumed resolution of a document is different from that of an actual document. A hatched section of FIG. 34A shows a document with low resolution (a document with 100 lines or below when converted to the number of lines in the half tone area or a sand-like document), and a hatched section in FIG. 34D shows a document with high resolution (that with 100 lines or more when converted to the number of lines in the half tone area, or a high precision document). It should be noted that the hatched sections in these documents have a homogeneous color taste, so that also copied images thereof should preferably have a homogeneous color taste.

FIGS. 34B, 34C, 34E, and 34F each show the documents described above respectively, and FIGS. 34B and 34E shows a case where a result of separation is used, while FIGS. 34C and 34F show a case where a result of separation is not used.

As shown in the figures, in the image B obtained by copying a document with a low resolution by means of using a result of separation, areas having been subjected to processing for picture and that for characters coexist, and the difference is remarkable when visually checked. This phenomenon is caused because different image processing parameters are used for a picture and for a character respectively, and a color taste of a copied character image is different from that of a copied picture, and for this reason the image is not a preferable one.

Change in a color taste according to a result of image separation occurs not only in a color correction parameter or in a YMCK gradation correction table as described above, but also when space filters with different coefficients are used for a character and for a picture respectively.

In the case as described above, as shown in FIG. 34C, it is possible to prevent generation of the troubles as described above by setting image processing parameters not depending on a result of image separation. Setting of image processing parameters not depending on a result of image separation includes, in addition to a case where output determined as a picture section is always generated from the image separating circuit 204 irrespective of a type of image data, a case where the same parameters as those when the image data is for a picture section are used even when the image separating circuit 204 outputs a character signal or a picture signal.

Especially, in a case of a document printed with an ink jet printer, as there are documents with various resolutions from a low resolution of around 10 lines up to a high resolution of 360 lines, it is necessary to change parameters for image separation according to a resolution of each document. It should be noted that herein a space filter is set so that a result of image separation is not applied to a document with low resolution.

Figure 35:
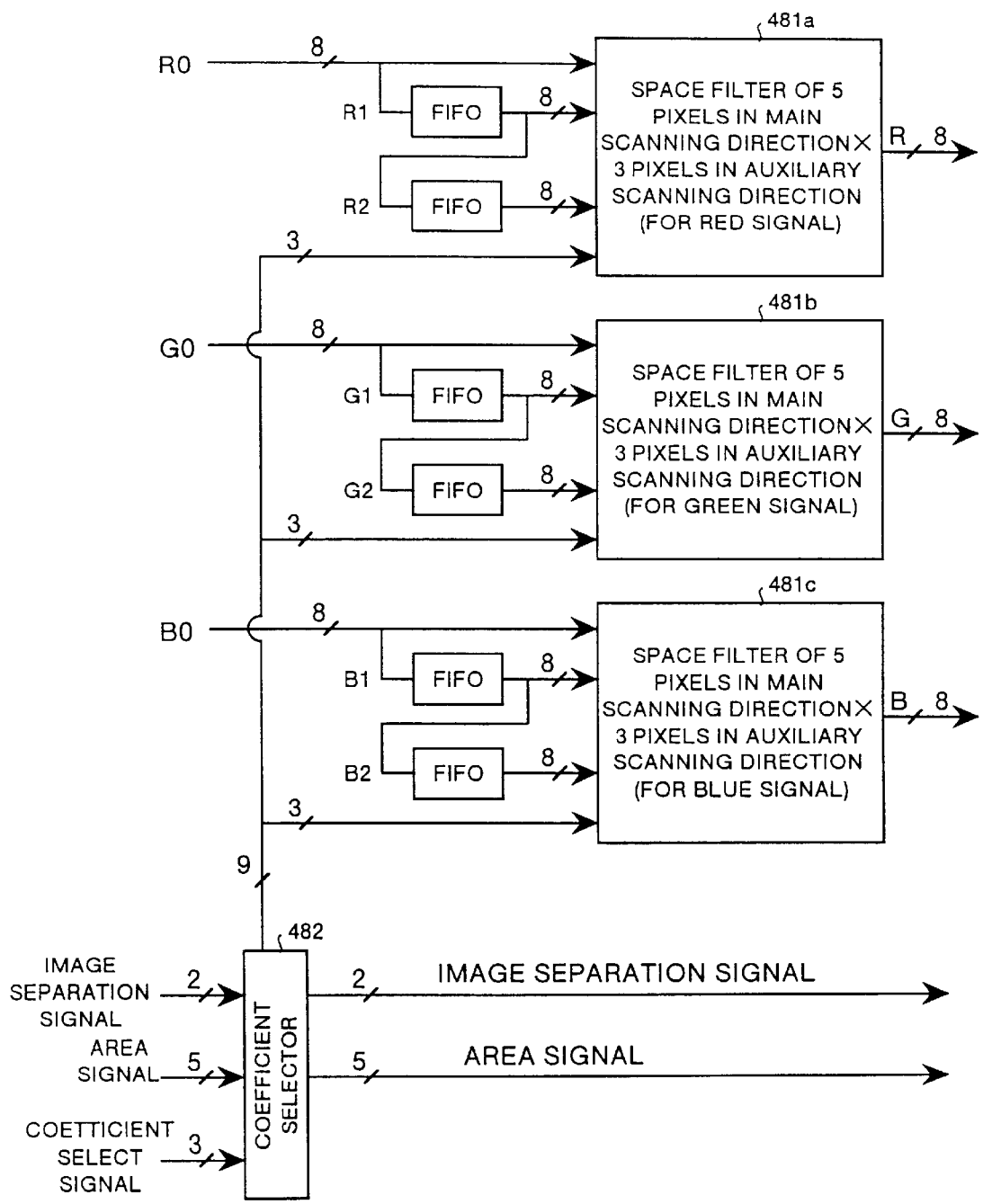
FIG. 35 is a block diagram showing an MTF (space) filter processing circuit.

FIG. 35 is a block diagram showing the MTF (space) filter 205 shown in FIG. 2. In the space filter processing circuits 481a o 481c in the MTF filter 205, data for one central pixel is subjected to matrix computing based on image signals for 5 pixels in the main scanning direction×3 pixels (3 lines) in the auxiliary scanning direction, and the result is outputted. R0, G0, and B0 in the figure indicate image signals for the first lines of red, green, and blue data respectively and are inputted into the space filter processing circuits 481a to 481c and also temporally stored in an FIFO memory. Image signals R1, G1, B1 for the second lines in each data respectively are similarly inputted into the space filter processing circuits 481a to 481c and are temporally stored in the FIFO memory. Also image signals R2, G2, B2 for the third lines are inputted into the space filter processing circuits 481a to 481c.

To describe an example of a space filter coefficient used in this step, the space filter shown in FIG. 36 is used for image data such as a character or a diagram, and the space filters shown in FIG. 37, FIG. 38, and FIG. 39 are used for a picture image or a half tone image.

Also the space filters in FIG. 37 to FIG. 39 are used according to such a parameter as a compression ratio, an expansion ratio, or a size reduction ratio in the vertical or horizontal direction. Selection of a coefficient for each of the space filters above is executed by a coefficient selector 482 as shown in FIG. 35. This coefficient selector 482 is switched according to, for instance, a 2-bit image separation signal, a 5-bit (32-area) area image signal, or a 3-bit (8 types) space filter coefficient selection signal.

The 2-bit image separation signal is a half tone image signal or a signal for a character or a picture. The space filter coefficient (image processing parameter) is switched according to the signal as shown in, for instance, FIG. 40. In the gradation processing, in addition to processing with a dither, the error diffusion processing applicable for a document printed with an ink jet printer can be selected according to a type of a document.

Next, description is made for an example of image processing parameters prepared for each image quality mode selectable in Embodiment 3. In Embodiment 3, as selectable image quality modes, there are prepared "character mode", "printed picture document mode", "silver-salt picture mode", "fluorescent pen mode", "textile mode", "copied document mode", "thermally-transferred document mode", "map mode", "ink jet mode", "pictrography mode".

Of the image quality modes described above, in the ink jet mode, 8 types of image processing parameters in ink jet modes 1 to 8 are prepared as default values as described above. FIG. 41 shows details of the image processing parameters of ink jet modes 1 to 8.

Similarly, FIG. 42 shows image processing parameters in the character mode as well as in the fluorescent pen mode 1, 2, FIG. 43 shows image processing parameters in the printed picture document mode as well as in the copied document modes 1 to 5, FIG. 44 shows image processing parameters in the silver-salt picture modes 1 to 3, FIG. 45 shows image processing parameters in the map modes 1 to 3, and FIG. 46 shows image processing parameters in the thermally-transferred document modes, 2 as well as in the pictrography mode.

Further, a color correction coefficient is changed according to a type of a color material used in a document.

The black character processing included in the image processing parameters shown in FIG. 41 to FIG. 46 is processing to change values of image signals for color components around an image signal determined as a black character in the image separating circuit 204 to substantially 0 (zero). Description is described below for this processing with reference to FIGS. 47A to 47F.

FIG. 47A shows a black character document (black character i) on a white background, and FIG. 47D shows a black character (black character i) with a non-white background. FIG. 47B and FIG. 47E show a case where the black character processing is executed, while FIG. 47C and FIG. 47F show a case where the black character processing is not executed.

In a case where the background is white and the black character processing is not executed (FIG. 47C), color components remain around the character. This phenomenon occurs because R, G, B receiving elements of a CCD of a scanner is a little displaced in the main scanning direction and an R or a B component remains at both sides of the character even if the black component is read (a case where a CCD of a scanner are displaced in the order of R,G,B in the main scanning direction). In this case, the color components can be eliminated as shown in FIG. 47B by executing the black character processing.

On the other hand, when the background (a background of a document) is not white, if the black character processing is executed, a write zone is generated around the character as shown in FIG. 47E. In contrast, when the black character processing is not executed, the write zone is not generated around the character in FIG. 47F.

As described above, it is necessary to change setting for the black character processing according to a document type, and in Embodiment 3, a type of color correction coefficient as one of image processing parameters can be changed. This phenomenon becomes remarkable in a low density section of a document, and this processing is especially required in a document with low density.

The color correction coefficients in the fluorescent modes 1, 2 may be set as described above.

A color conversion coefficient in the fluorescent pen mode 1 is set with density of YMC images made higher as compared to those in a printed document so that a color of a fluorescent pen on the document is emphasized. With this operation, a color of a portion written with a fluorescent pen of a document is emphasized and can easily be recognized. Further, by setting the color correction coefficient so that a density of black color is emphasized, the black color can easily be differentiated from other colors.

The color correction coefficients in the fluorescent pen mode 2 are corrected so that only image densities for Y, M, and C color components are raised to emphasize a color of the document.

In the image forming apparatus according to Embodiment 4 of the present invention, a gradation correction table can be selected according to a particular area of a document, so that a copied image faithful to the original in terms of color can be formed, irrespective of a document type or setting for printing, without cause cost increase. It should be noted that the same configuration of and operations in Embodiment 4 are the same as those in Embodiment 1 and description is made herein only for different portions.

Figure 48:
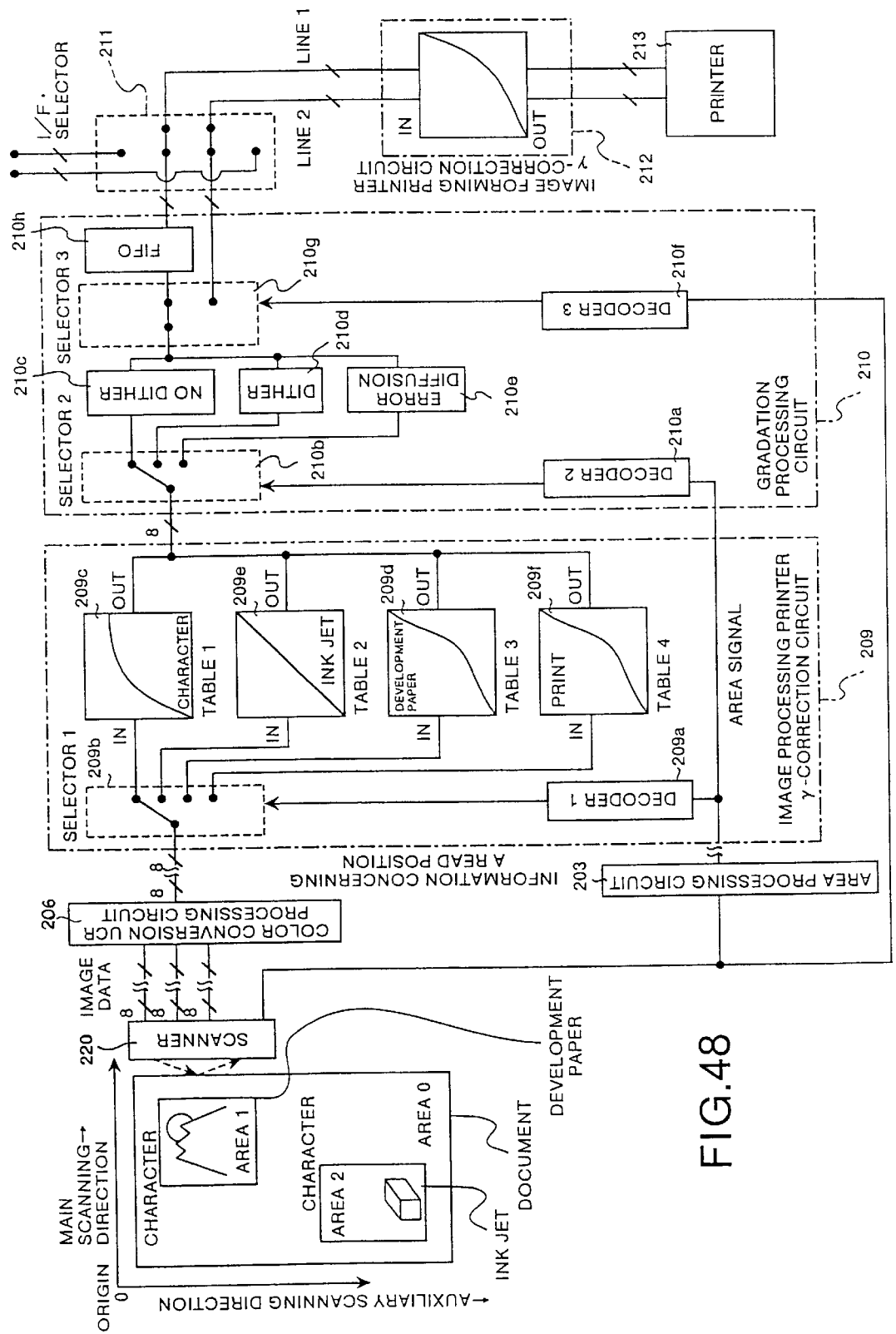
FIG. 48 is an explanatory view showing an operation of switching a gradation correction table according to an area of a document in Embodiment 4.

FIG. 48 is a view showing operations for switching a gradation correction table according to a particular area of a document.

In this figure, information for an area specified on a document is compared to information concerning a read position when reading an image, and an area signal is generated from the area processing circuit 203. Parameters used in the scanner γ-conversion circuit 203, MTF filter circuit 205, color conversion UCR circuit 206, image processing circuit 208, image processing printer γ-correction circuit 209, and gradation processing circuit 210 are changed according to the area signal outputted from the area processing circuit 203. It should be noted that the image processing circuit 208 is omitted and only the image processing printer γ-correction circuit 209 and gradation processing circuit 210 are shown in FIG. 48.

In the image processing printer γ-correction circuit 209, the area signal from the area processing circuit 203 is decoded with a first decoder (1) 209a, and a gradation conversion table is selected from a plurality of gradation conversion tables for the character, ink jet or other modes with a first selected (1) 209b.

An example of a document shown in FIG. 48 is a case where a character area, a development paper area, and an ink jet area coexist. A first gradation conversion table (1) 209c for characters is selected for a character area, a third gradation conversion table (3) 209d for development paper for a development paper area 1, and a second conversion table (2) 209e for an ink jet for an ink jet area 2. It should be noted that the reference numeral 209f indicates a gradation conversion table for a printed document.

An image signal subjected to gradation conversion in the image processing printer γ-correction circuit 209 is again decoded by the second selector (2) 210b according to the area signal and switches gradation processing used by a second selector (2) 210b. The gradation processing which can be used includes processing 210c not using a dither, processing 210d using a dither, and error diffusion processing 210e. The error diffusion processing is executed to a document printed with an ink jet printer.

The image signal after having been subjected to gradation processing selects line (1) or line (2) with a third decoder (3) 210f according to information concerning a read position. The line (1) and line (2) are switched by one pixel in the auxiliary scanning direction. Data for line (1) is temporally stored in an FIFO memory located in the downstream from the third selector 210g, and data for the line (1) and line (2) are outputted. With this operation, the image signal is inputted into the I/F selector 211 with the pixel frequency reduced to ½ of the original value.

Figure 49:
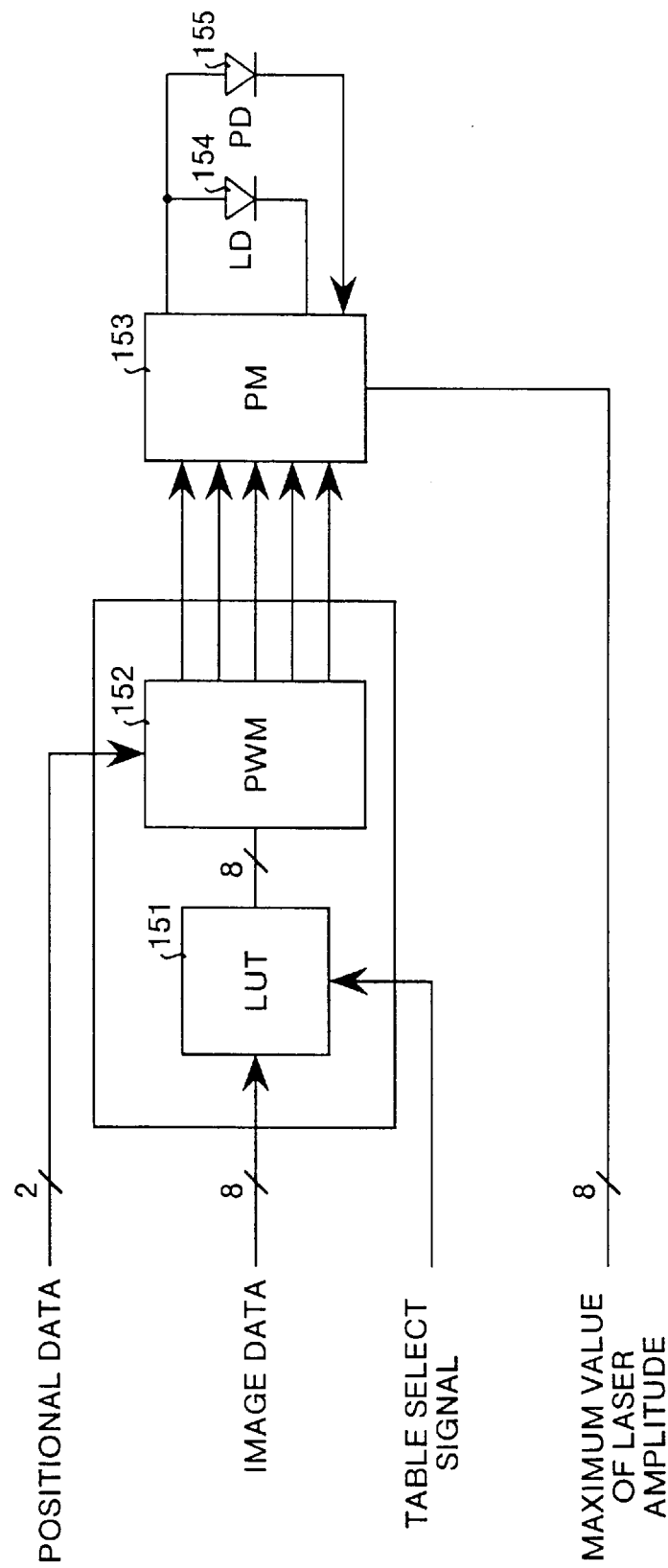
FIG. 49 is a block diagram showing general configuration of a laser write system in Embodiment 4.

Next description is made for the laser modulation circuit with reference to the block diagram shown in FIG. 49. It is assumed in the following description that the write frequency is 18.6 MHz and a scanning time for 1 pixel is 53.8 nsec. 8-bit image data can be subjected to γ-conversion by referring to the look-up table (LUT) 151. The pulse width is converted to those with 8 values in a pulse width modulation circuit (PWM) 152 according to upper 3 bits of the 8-bit image signal with power modulation with 32 values executed to lower 5 bits of the image signal in a power modulation circuit (PM) 153, and a laser diode (LD) 154 emits light according to the modulated signal. Amplitude of light emission is monitored by a photodetector (PD) 155 with correction made for 1 dot.

A maximum value of amplitude of a laser beam can be changed to an 8-bit value (256 stages) independently from an image signal. A beam diameter in the main scanning direction (defined herein as a width when the beam amplitude in the static state is attenuated to $1/e^2$ against the maximum value) is less than 90%, and preferably 80% of a size of one pixel. With a resolution of 600 DPI and a pixel size of 42.3 $\mu$m, the beam diameter 50 [$\mu$m] is used in the main scanning direction, and 60 [$\mu$m] in the auxiliary scanning direction. The laser modulation circuits shown in FIG. 49 are prepared in response to each of image data for the line (1) and line (2) shown in FIG. 48. Image data for the line (1) is synchronized to those for the line (2), and a photo-sensitive drum 103 is scanned in a direction parallel to the main scanning direction.

In the character mode, dither processing such as pattern processing is not executed, and a pattern is formed with 256 gradations for one dot, while in the picture mode a sum of write values for two pixels adjoining to each other in the main scanning direction are distributed for forming a laser write value.

Namely the distribution of a sum of write values for two pixels adjoining in the main scanning direction in pattern processing is executed in a case were a write value for a first pixel is n1 and a write value for a second pixel is n2 as follows:

In a case of $n1+n2 \leq 255$
A write value for the first pixel: n1+n2
A write value for the second pixel: 0
In a case of $n1+n2 > 255$
A write value for the first pixel: 255
A write value for the second pixel: n1+n2−255
Or,
in a case of $n1+n2 \leq 128$
A write value for the first pixel: n1+n2
A write value for the second pixel: 0
In a case of $128 < n1+n2 \leq 256$
A write value for the first pixel: 128
A write value for the second pixel: n1+n2−128
In a case of $256 < n1+n2 \leq 383$
A write value for the first pixel: n1+n2−128
A write value for the second pixel: 128
In a case of $383 < n1+n2$
A write value for the first pixel: 255
A write value for the second pixel: n1+n2−255

In addition, pattern processing executed when actually an image is formed may be employed.

Figure 50:
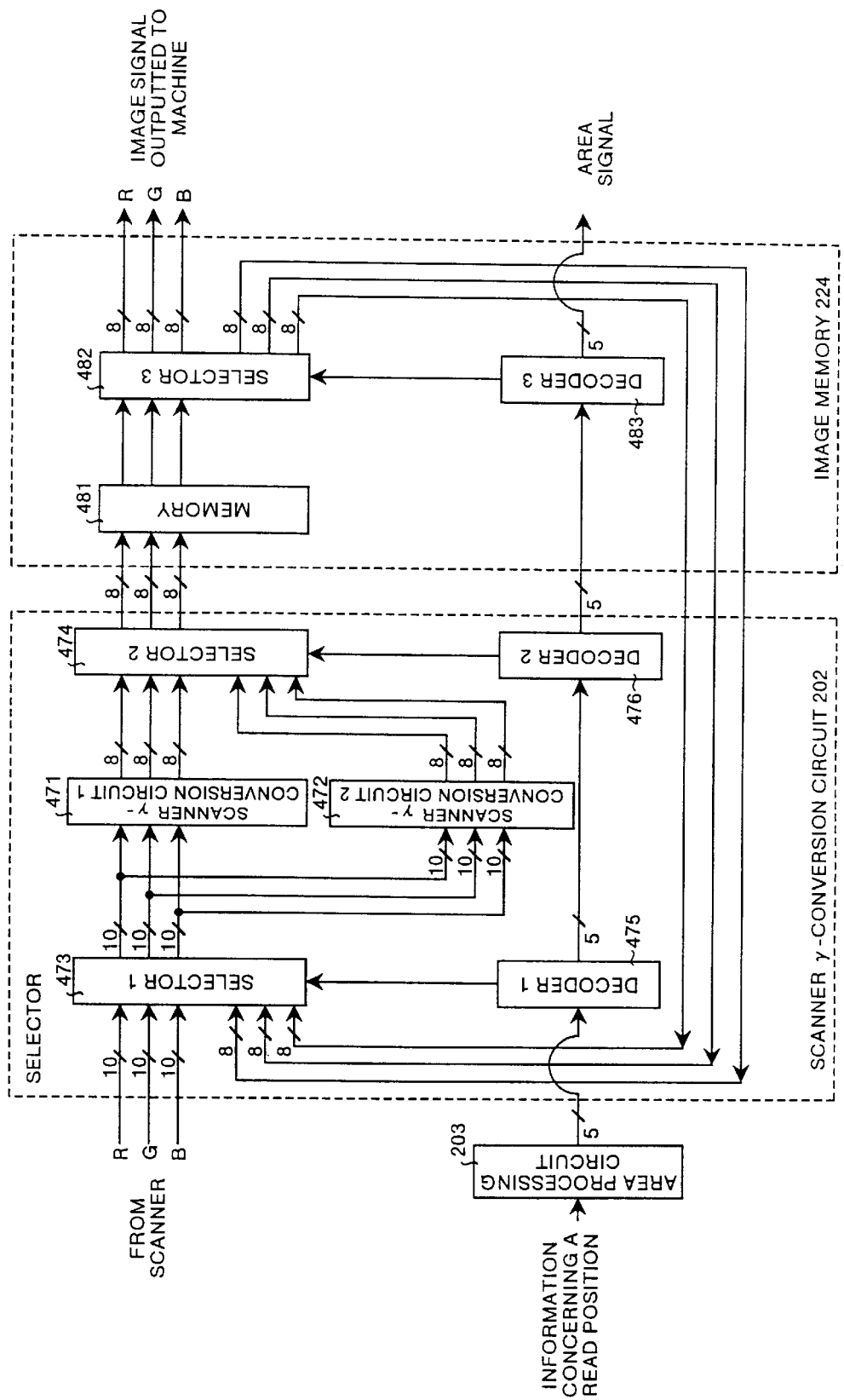
FIG. 50 is a block diagram showing configuration of a scanner γ circuit in Embodiment 4.

FIG. 50 is a block diagram showing configuration of the scanner γ-conversion circuit 202. The scanner γ-conversion circuit comprises a first scanner γ-conversion section (1) 471, a second scanner γ-conversion section (2) 472, a first selector (1) 473, a second selector (2) 472, a first decoder 475 (1) and a second decoder (2) 476.

The first selector 473 switches an image signal read by the scanner 220 and subjected to shading correction to and from an image signal from the image memory 224. The image signal from the first selector 473 is inputted into the first scanner γ-conversion section 471 as well as to the second scanner γ-conversion section 472, and γ-conversion is executed in each of the γ-conversion circuits. The first decoder 475 switches an image signal outputted from the first selector 473 according to an area signal from the area processing circuit 203.

The second selector 474 selects any of image signals from the first scanner γ-conversion section 471 and second scanner γ-conversion section 472, and outputs the selected image signal to the image memory 224 in the downstream therefrom. The second decoder 476 switches an image signal outputted from the selector 474 according to an area signal from the area processing circuit 203.

The image memory 224 comprises a memory 481, a third selector (3) 482, and a third decoder (3) 483. Determination is made by the third decoder 483 as to whether an image signal stored in the memory 481 is to be outputted to the subsequent stage or to be inputted into the scanner γ-conversion circuit 202, and the third selector 482 switches the destination according to a result of determination.

The memory 481 has a memory space for 8-bit image signals for each of R, G, and B for one sheet of document as described above, and can read out an image signal for an arbitrary area from the read image data for one sheet of document, and can output the image signal to a circuit in the downstream therefrom or the scanner γ-conversion circuit 202.

The scanner γ-conversion circuit 202 converts a 10-bit input signal to an 8-bit signal and outputs the converted signal, and a 10-bit image signal is inputted from the scanner 220 and an 8-bit image signal from the image memory 224, so that it is necessary to change a scanner γ-conversion table for each of R, G, and B set in the first and second scanner γ-conversion sections 472 and 473 according to a target for input. Namely, in a case of input from the scanner 220, a scanner γ-conversion table for a 10-bit image signal is set and in a case of input from the image memory 224, a scanner γ-conversion table for an 8-bit image signal is set.

When a plurality of image areas are set on a sheet of document and image processing parameters for each image area are to be changed, the following operations are executed.

Figure 51:
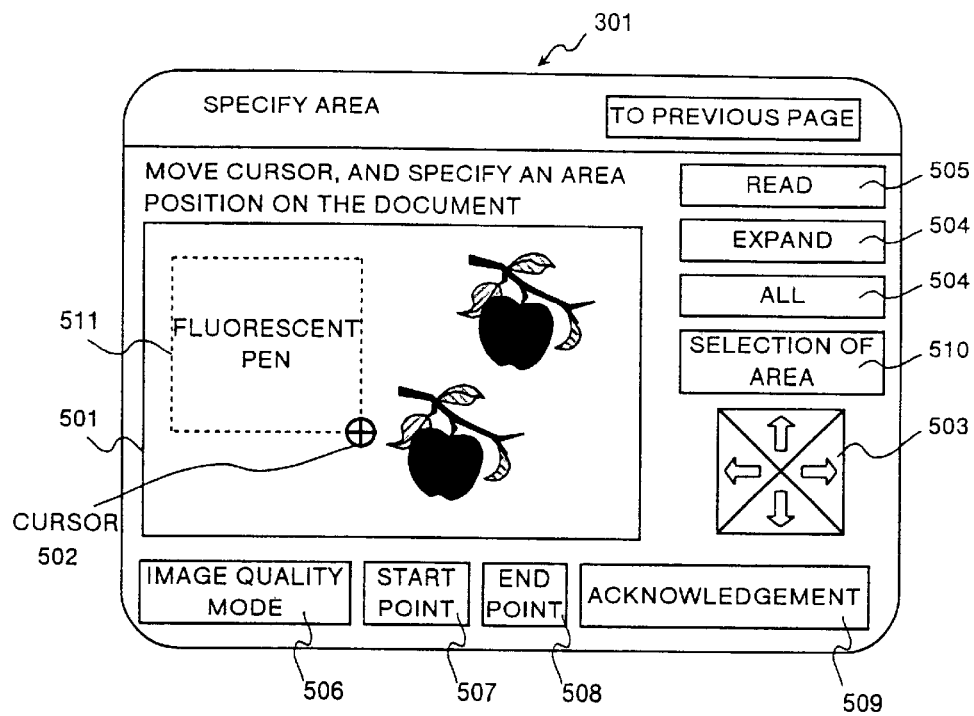
FIG. 51 is an explanatory view showing an example of display for a operating section screen for specifying an area in Embodiment 4.

FIG. 51 is a view showing an example of display on the screen 301 of the operating section for specifying an area. Available on the screen 301 of the operating section are a display screen 501 for reading a document placed on a base for placement of a document and displaying the read document thereon, a cursor 502 used when specifying an area on the display screen 501, a cursor movement button 503 for moving the cursor, an expansion button for expanding a read image and general display button 504, a read button 505 for reading the document again, an image quality mode set button 506 for selecting an image quality mode for a specified area, a start point button 507 for specifying a start position of an area, an end point button 508 for specifying an end button of an area, an acknowledgement button for acknowledging specified contents, and an area select button 510 for selecting an area already set.

Figure 52:
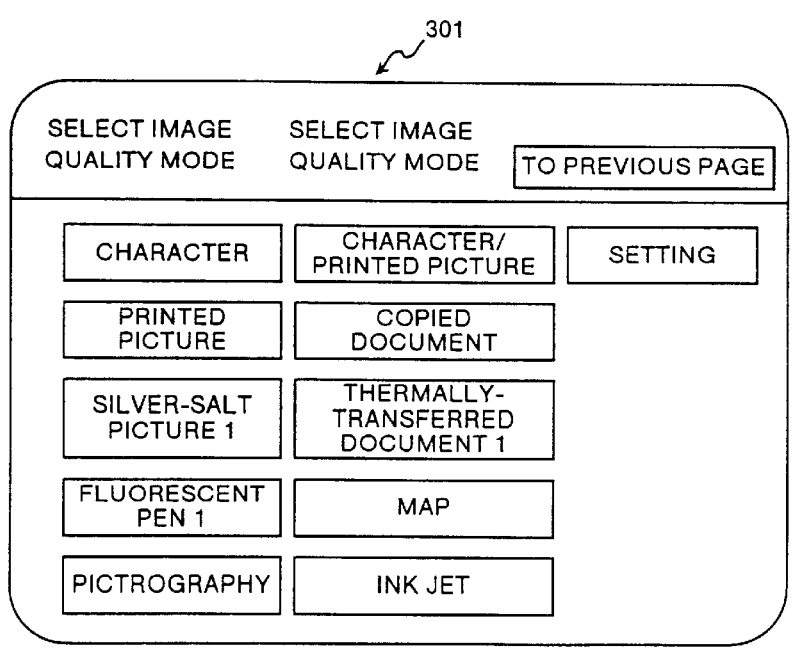
FIG. 52 is an explanatory view showing an image quality mode selection screen in Embodiment 4.

An area 511 enclosed by a dotted line forming a rectangular form indicates a specified area. An area is specified by specifying a top left corner of the rectangular form 511 with the cursor 502 as a start point and also specifying a bottom right corner of the rectangular form with the cursor 502 as an end point. For instance, when the image mode button 506 is selected to specify the area 511 in the "fluorescent pen" mode, the image quality mode select screen as shown in FIG. 52 is displayed. As image quality modes, various modes as shown on the display screen in FIG. 52 are selected. Contents of setting (image processing parameters) in the image quality mode is shown in FIG. 53.

"Character/printed picture" in FIG. 52 indicates an image quality mode to automatically differentiate a character area from a printed picture area. Herein the image quality mode is set by selecting "fluorescent pen 1" and then selecting the "set" button.

When the acknowledge button 509 shown in FIG. 51 is selected and the copy start key is pressed, a copying operation of the copying machine is started. To specify an image quality mode for an area outside the specified area 511, the start point button 507 is selected outside the area 511 and further the image quality mode 506 is selected. In Embodiment 4, the character/printed picture mode is provided in default. When the copying operation is started, image formation is executed according to image processing parameters for the "fluorescent pen" mode for the area 511 and with image processing parameters for the "character/printed picture" mode for an area outside the area 511.

Figure 54:
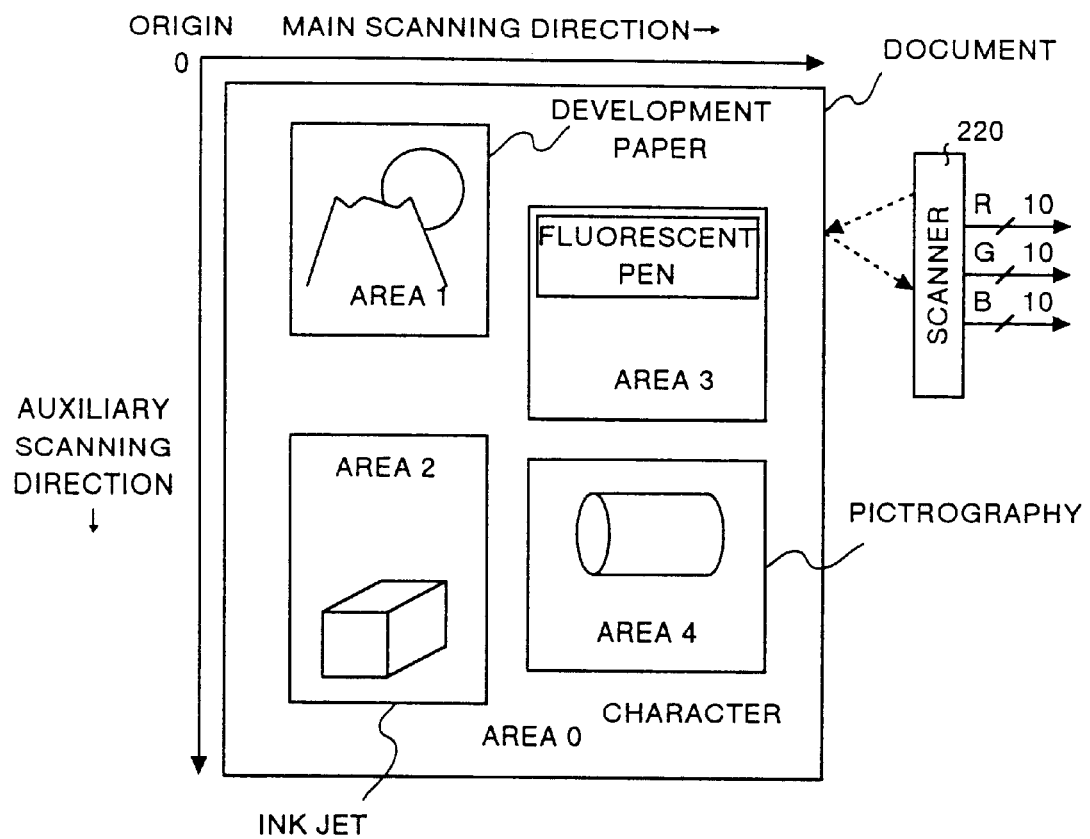
FIG. 54 is an explanatory view showing a processing step in area processing for a document in Embodiment 4.

FIG. 54 shows a case where, like in FIG. 48, an area 0 was processed with image processing parameters for the "character mode", an area 1 with those for the "picture on development mode", an area 2 with those for the "ink jet document" mode, an area 3 with those for the "fluorescent pen" mode, and an area 4 with those for the "pictrography mode".

A relation between a selectable image quality mode and setting of image processing parameters is as shown in FIG. 53. As shown in FIG. 53, an RGB γ-conversion table for the normal mode is used for the areas in the character mode and ink jet document mode (area 0, area 2), an RGB γ-conversion table for a fluorescent pen for the area in the fluorescent mode (area 3), an RGB γ-conversion table for pictures on development paper for the area in the development paper picture mode (area 1), and an RGB γ-conversion table for pictrography for the area in the pictrography mode (area 4).

Figure 55:
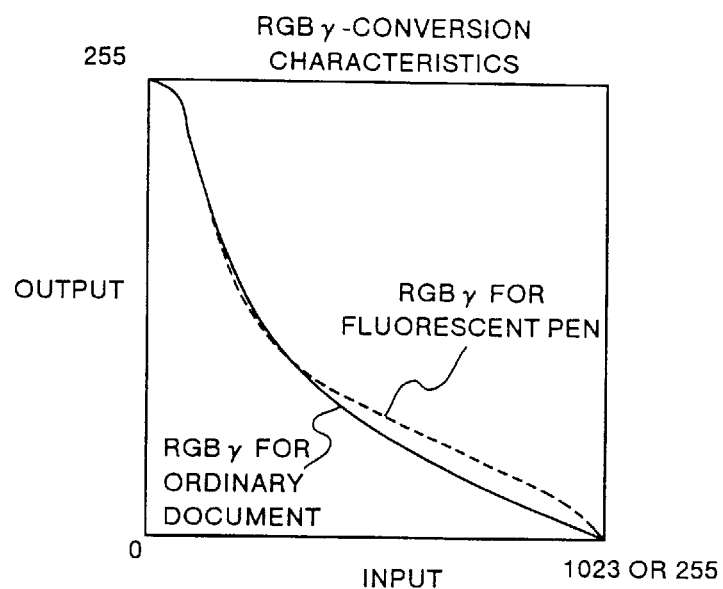
FIG. 55 is a view showing a scanner γ-conversion characteristics in the normal mode and in the fluorescent pen mode in Embodiment 4.

An example of the RGB γ-conversion table for the ordinary mode and an example of he RGB γ-conversion table for a fluorescent pen are shown in FIG. 55. In the figure, the horizontal axis indicates an input to an RGB γ-conversion table, and a vertical axis indicates an output from an RGB γ-conversion table. Although a range on the horizontal axis is dually displayed as 0 to 1023 and 0 to 255 in FIG. 55, this is due to characteristics of the scanner γ-conversion circuit 202 for converting a 10-bit signal to an 8-bit signal. Namely, a scale for the horizontal axis is changed to respond to an input signal in a range from 0 to 1023 when a signal inputted from the scanner 220 is subjected to RGB γ-conversion, and to respond to an input signal in a range from 0 to 0 to 255 when an input signal from the image memory 224 is subjected to RGB γ-conversion. The circuit always responds to an input signal, which is a 10-bit signal, in a range from 0 to 1023, and for this reason an RGB γ-conversion table is set so that, when an 8-bit signal is inputted, the circuit can respond to an input in a range from 0 to 255 and output 0 (zero) to an input in a range from 256 to 1023. When an 8-bit image signal is inputted into the scanner γ-conversion circuit 202, lower 8 bits in the 10-bit signal lines are used, and 0 is set for upper 2 bits in the 10-bit signal lines.

In place of the processing as described above, an 8-bit input signal from the image memory 224 may be used as upper 8 bits in a 10-bit signal lines to be inputted into the scanner γ-conversion circuit 202 with lower 2 bits in the 10-bit signal lines set to 0. In this case, the RGB γ-conversion table may be set to respond to an input signal from 0 to 1023 whether the input signal comes from the scanner 220 or from the image memory 224.

As shown in FIG. 55, the RGB γ-conversion table for an ordinary document and that for a document written with a fluorescent pen have the substantially common characteristics to image signals for each of R, G, and B. This is because a gray balance is insured in read values for R, G, and B with the scanner 220 for achromatic colors of a document on common paper, namely for a white color, a gray color, and a black color. It should be noted that herein the RGB γ-conversion table for a document written with a fluorescent pen is set so that image density close to that of a background of the paper will become higher as compared to that when conversion is executed with an RGB γ-conversion table for ordinary paper.

Figure 56:
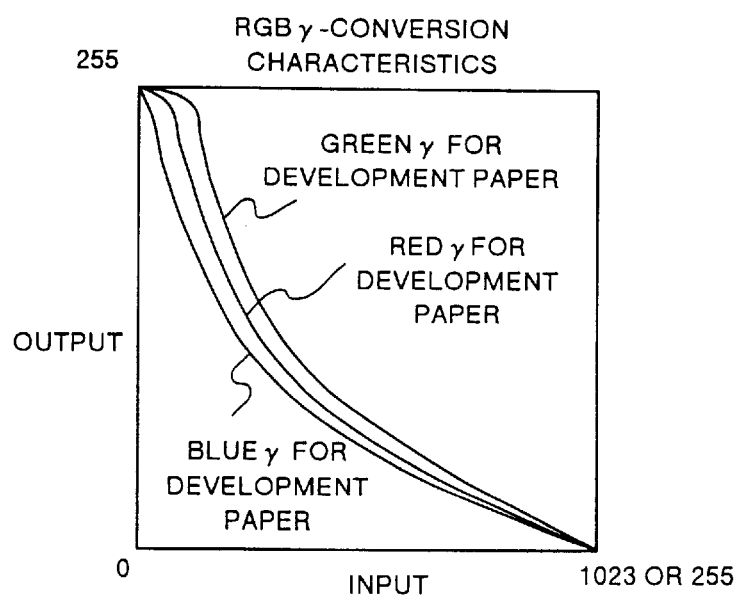
FIG. 56 is a view showing a scanner γ-conversion characteristics for a picture document on development paper of RGB in Embodiment 4.
Figure 57:
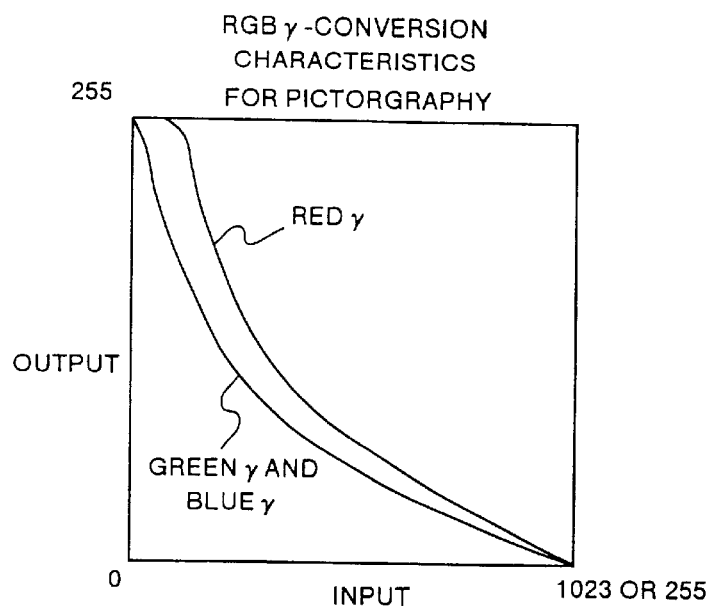
FIG. 57 is a view showing a scanner γ-conversion characteristics for pictrography in Embodiment 4.

FIG. 56 shows conversion characteristics of the RGB γ-conversion table for a picture document on development paper, and FIG. 57 shows conversion characteristics of the RGB γ-conversion table for a pictrography document. Both of the figures show an example of a result of preparation of an RGB γ-conversion table so that a gray balance as a result of RGB γ-conversion of RGB image signals when achromatic colors formed on a document are read with the scanner 220 (output values after RGB γ-conversion) will be substantially identical.

When the documents are subjected to RGB γ-conversion by using the RGB γ-conversion table for ordinary paper, even if a document with achromatic colors is copied, the copied image does not include the achromatic colors and a gray balance can not be obtained, so that it is necessary to change the RGB γ-conversion table for image signals for R, G, and B. This phenomenon occurs because a surface processing for ordinary paper usually used and that for development paper used only for silver-salt pictures are different and also a spectral reflection factor of the former is different from that of the latter. For instance, even if it seems that ordinary paper and development paper have the substantially same colors when visually checked, as a spectral reflection factor of ordinary paper is different from that of development paper, so that, when read with a scanner of a copying machine, values of RGB signals become different, and sometimes the signals are regarded as those for different colors.

Figure 58:
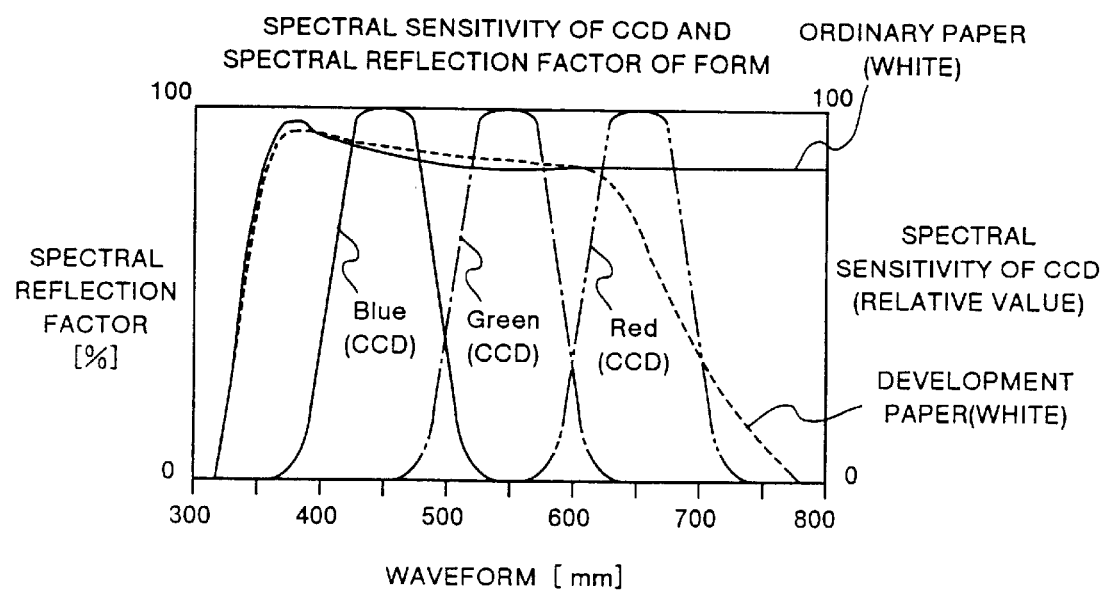
FIG. 58 is a view showing a relation between spectral sensitivity of a CCD and a spectral reflection factor of a form in Embodiment 4.

Description is made for this phenomenon with reference to FIG. 58. FIG. 58 is a conceptual view plotted with a wavelength of a laser beam on the horizontal axis and spectral reflection factors on surfaces of ordinary paper and development paper on the vertical axis. The vertical axis further shows spectral sensitivity for RGB in a CCD of a scanner. As shown in the figure, a spectral reflection factor on a surface of development paper is lower at a wavelength of 700 nm as compared to that on a surface of ordinary paper. To describe further detailedly, the spectral reflection factor sharply drops when the wavelength becomes longer than 620 to 630 nm. Read values with a CCD of a scanner are proportional to spectral sensitivities of the CCD for R, G, and B and a spectral reflection factor of an object to be read, a spectral reflection factor of an optical system, and an integrated value for a spectral product of spectral energy of a light source in the scanner. As a spectral reflection faction of an optical system and spectral energy of a light source are common for development paper and ordinary paper when read with the same machine, herein spectral reflection factors of development paper and ordinary paper and sensitivities for R, G, and B of a CCD in a scanner are shown in the figure.

When considering read values for R, G, and B read from development paper and ordinary paper taking into account a product of a spectral sensitivity of a CCD by a spectral reflection factor of a form, a read value for red on development paper is lower than a read value for red on ordinary paper. Even when development paper and ordinary paper each with nothing printed thereon are read, read values for R, G, and B for ordinary paper are lower than those for development paper. For this reason, when a scanner is set so that output signals for R, G, and B will become substantially identical, an output value for red becomes lower when development paper is used, and even though a document with nothing printed thereon is read, the RGB signals include values close to cyan. To prevent this phenomenon, the RGB γ-conversion table is changed according to a document type. Also to insure faithfulness of a copied image in terms of colors to the original document, image processing parameters for R, G, and B only for development paper are prepared as shown in FIG. 13 showing the RGB γ-gradation conversion characteristics, and the parameters are used when copying an image. The RGB γ-gradation conversion tables are prepared not only for development paper, but also a thermally-transferred document or a pictrography document.

Figure 59:
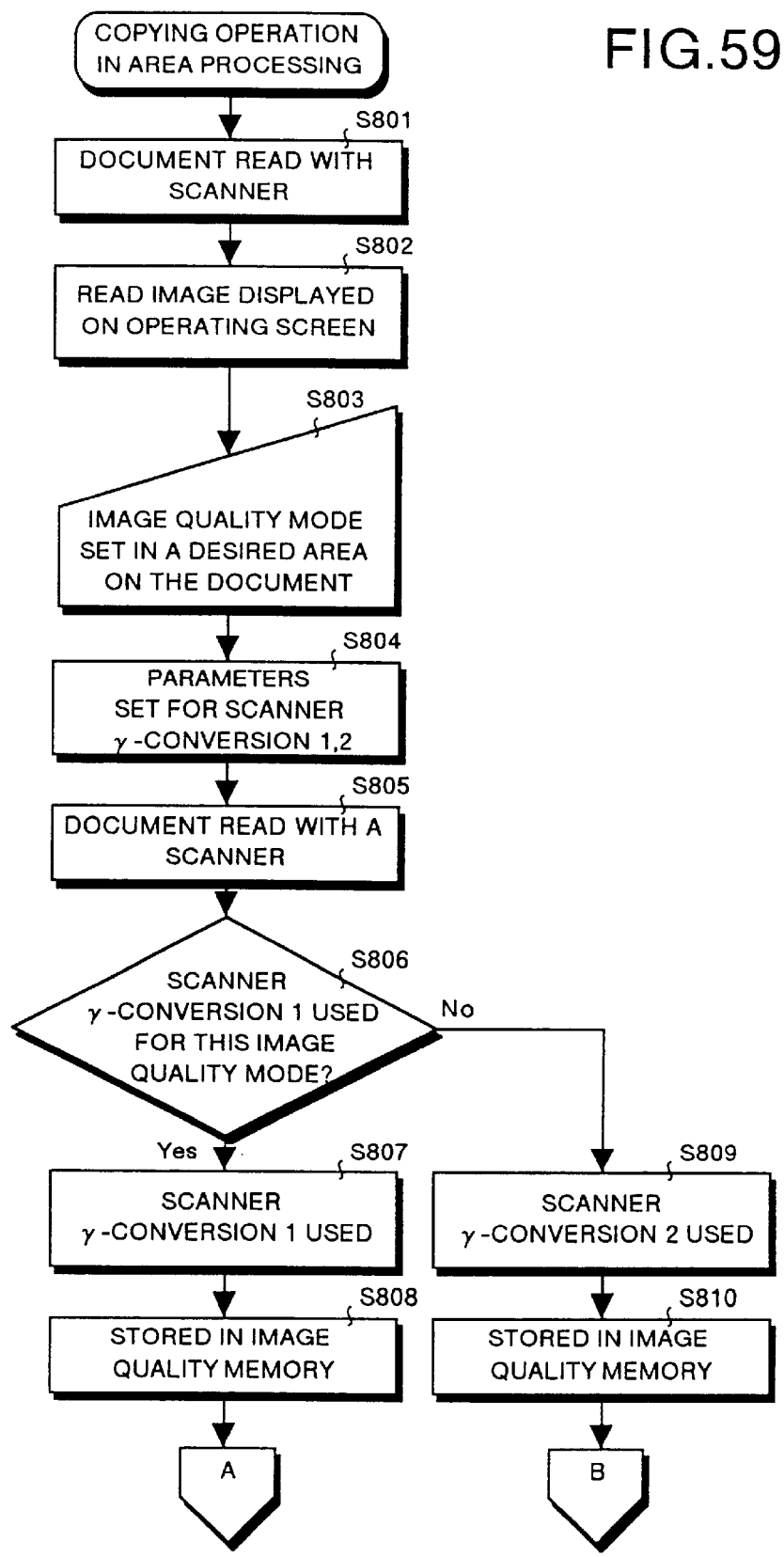
FIG. 59 is a flow chart showing an operational sequence of copying operation in the area processing in Embodiment 4.
Figure 60:
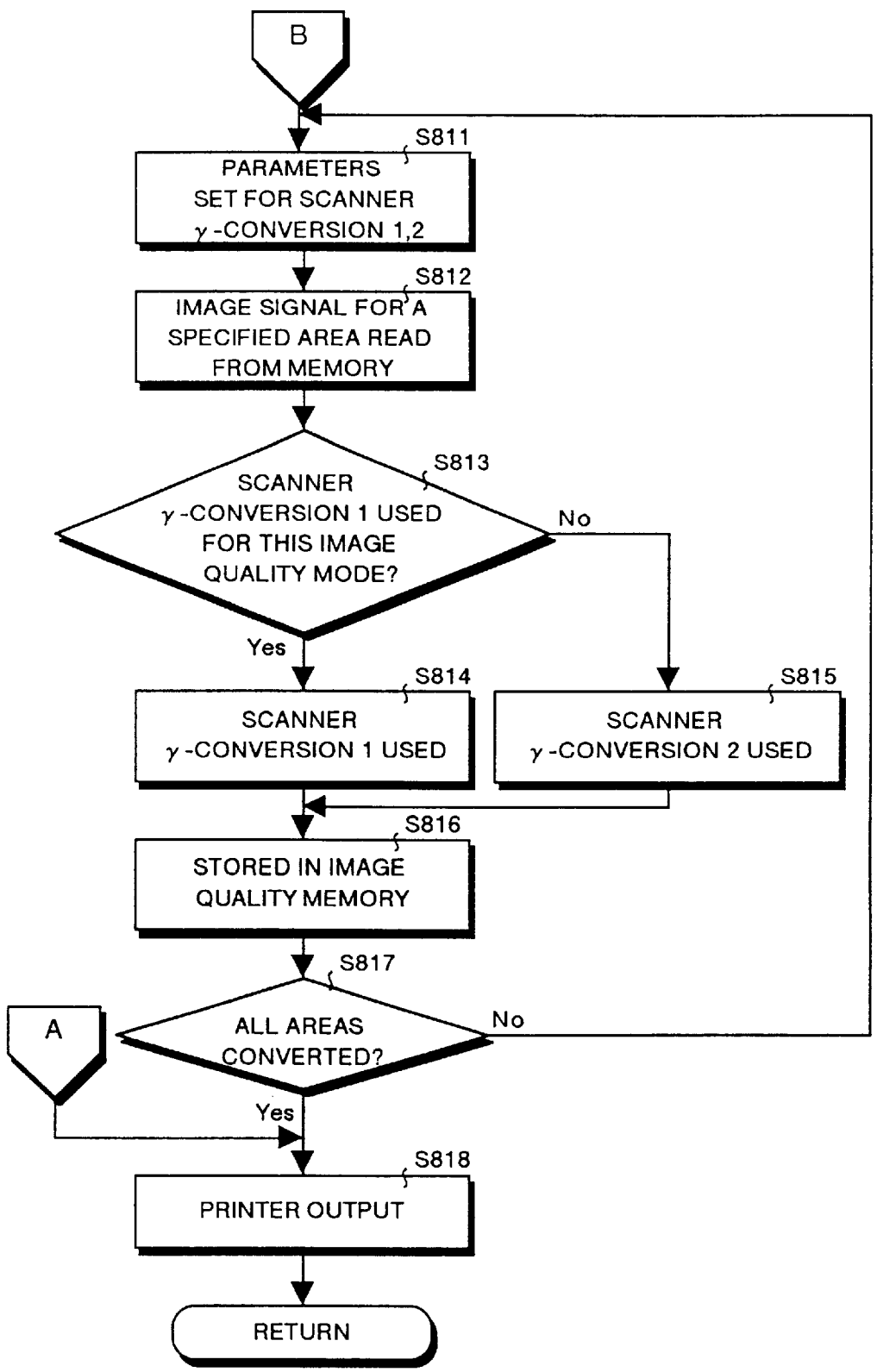
FIG. 60 is a flow chart showing an operational sequence in a copying operation in the area processing in Embodiment 4.

Next description is made for operations for executing RGB γ-conversion for each image processing function for a specified document shown in FIG. 54 with reference to flow charts in FIG. 59 and FIG. 60.

In this processing, at first a document is read with a scanner (step S801), and a read document is displayed on an operating screen (step S802). Then an image quality mode is set for a desired area on a document (step S803).

Figure 61:
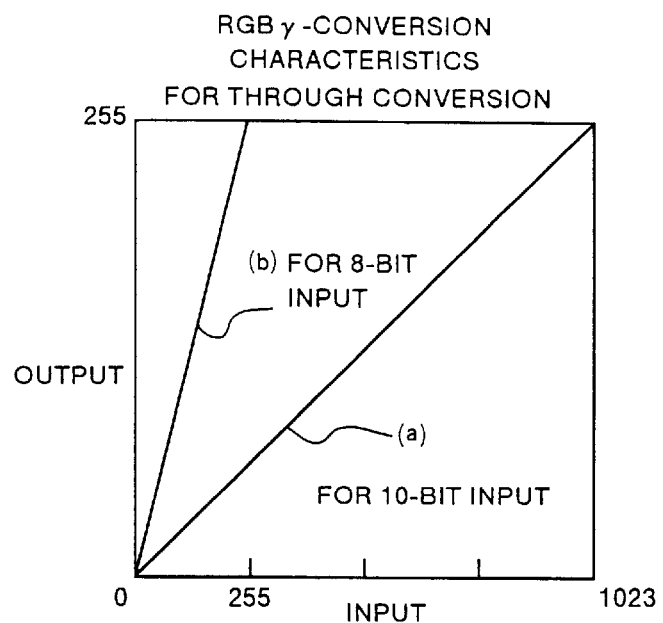
FIG. 61 is a view showing an RGB γ-conversion characteristics for 10-bit and 8-bit conversion and for no conversion in Embodiment 4.

When an image quality mode is set, an RGB γ-conversion table for ordinary paper is set in the first scanner γ-conversion section 471, and a through RGB γ-conversion table for converting a 10-bit signal to an 8-bit signal is set in the second scanner γ-conversion section 472 (step S804). The conversion table for converting a 10-bit signal to an 8-bit signal is as shown (a) in FIG. 61. (b) in FIG. 61 shows a through RGB γ-conversion table for receiving an 8-bit signal and outputting a 10-bit signal, although not shown herein.

When parameters are set in the first and second scanner γ-conversion sections 471 and 472 in step S804, a document is read with the scanner (step S805), and determination is made as to whether the read area is one to which the RGB γ-conversion table for ordinary paper set in the first scanner γ-conversion section 471 or not (step S806).

The selector 473 is switched according to a result of determination so that an image signal from the scanner 220 is inputted into the first scanner γ-conversion section 471 or into the second scanner γ-conversion section 472 (step S807, S809). Namely the area 0 in the character mode and the area 2 in the ink jet document mode are subjected to RGB γ-conversion in the first scanner γ-conversion section 471 (step S807). And a result of the conversion is stored in the image memory 224 (step S808).

On the other hand, for the areas 1, 3, and 4 other than those described above, image signals obtained by converting a 10-bit signal to an 8-bit signal by referring to the RBG γ-conversion table set in the second scanner γ-conversion section 472 is delivered to processing sections in the subsequent stage (step S809). Then in step S810, a received image signal is stored in the image memory 224.

Then, the RGB γ-conversion table for pictures on development paper is set in the first scanner γ-conversion section 471 and the RGB γ-conversion table for a document written with a fluorescent pen in the second scanner γ-conversion section 472 (step S811). In this case, both of the RGB γ-conversion tables are used for converting a 10-bit signal to an 8-bit signal.

Then the third selector 482 is switched so that an image signal for a specified area is read out from the memory 481 and an image signal stored in the memory 481 is outputted to the first selector 473 (step S812), and determination is made as to whether the image signal read out from the image memory 224 is in the mode using the first scanner γ-conversion section 471 or not (step S813). Namely, the third selector 482 is switched according to a result of determination as to whether the current mode is the development paper picture mode or fluorescent pen mode so that an image signal from the image memory 224 is inputted to the first scanner γ-conversion section 471 or the second scanner γ-conversion section 472.

According to this switching operation, and image signal from the image memory 224 is converted by using the RGB γ-conversion table in the first scanner γ-conversion section 471 or RGB γ-conversion table in the second scanner γ-conversion section 472 (step S814, step S815). To describe this operation further detailedly, in step S814, an image signal for the area 1 in the development paper picture mode is subjected to RGB conversion by using the first scanner γ-conversion section 471, and in step S815, an image signal for the area 3 in the fluorescent pen mode is subjected to RGB γ-conversion by the second scanner γ-conversion section 472. A result of conversion in step S814 or in step S815 is overwritten in a memory area (areas 1 and 3) onto which an image signal from the image memory 224 is read out (step S816).

The operations described above are executed to all areas, and when conversion of image signals for all the areas is finished, the signals are outputted to a printer, and an image is formed according to a result of conversion (step S818).

Herein an area in the pictrography mode is not converted with an appropriate RGB γ-conversion table, and for this reason for the area 4 which is an area in the pictrography mode, system control returns from step S817 to step S811, and the following processing sequence is repeated.

Namely in step S811, an RGB γ-conversion table for pictrography is set in the first scanner γ-conversion section 471. Then in step S812, an image signal for the area 4 set in the pictography document mode is read from the image memory 224 and is inputted into the first selector 473 in step S812. In step S813, the image signal read from the image memory 224 is inputted into the first scanner γ-conversion section 471. Then, the image signal inputted into the first scanner γ-conversion section 471 is subjected to RGB γ-conversion in step S814, an image signal for the area 4 in the image memory 224 is overwritten on the stored image signal in step S816, an output from the third selector 482 is switched to the subsequent stage side in step S817, and the image processing in the image memory 224 and on is executed with the output provided to a printer, and an image is outputted according to the converted image signal.

Figure 62:
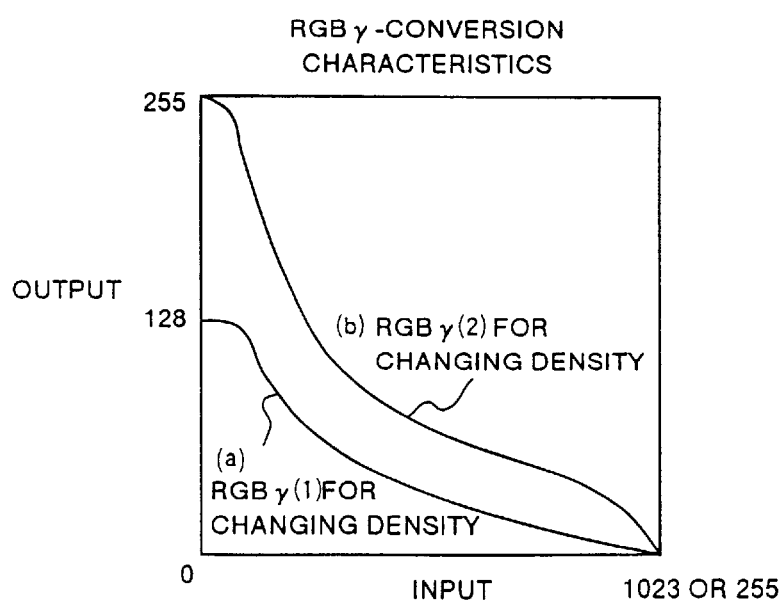
FIG. 62 is a view showing the RGB γ-conversion characteristics for density conversion in Embodiment 4.

It should be noted that, although detailed description is not made in description of Embodiment 4, a density of an image for a specified particular area (copy density) can be changed by using an RGB γ-conversion table such as that for converting a 10-bit signal to an 8-bit signal as shown in FIG. 61 or a through scanner γ-conversion table. In other words, when a maximum value of an output from the RGB γ-conversion table for an ordinary document in FIG. 55 is lowered from 255 to 128 (b to a) as shown in FIG. 62, an image density for a specified area can be lowered. This processing is executed according to a sequence like that shown in the flow charts in FIG. 59 and FIG. 60. It should be noted that, although an image density is lowered in (a) of FIG. 62, the image density may be raised, for instance, from that shown (a) in FIG. 62 to that shown (b) in FIG. 62 by using the R(conversion table as shown in (b) of FIG. 62.

As clearly understood from the description above, with Embodiment 4 of the present invention, a plurality of RGB gradation conversion tables each used for gradation conversion of RGB read signals from a scanner, a plurality of color correction coefficients, and a plurality of YMCK gradation correction tables are prepared respectively so that the gradation conversion tables can be switched when copying a sheet of document and images prepared by referring to various types of RGB gradation conversion tables are stored in an image memory, and further the stored image signals are inputted again into an RGB conversion table. With the features as described above, it is not necessary to have a plurality of switchable RGB gradation conversion tables, which makes it possible to suppress cost increase. When different types of document such as a printed document and a picture on development coexist on one sheet of document, image processing most suited to a document type can be executed by switching image processing parameters according to each image area.

Further two types of RGB gradation conversion table for image read signals, namely one for conversion and the other for no conversion are prepared, a result of gradation conversion executed by switching the two gradation conversion tables according to each particular area on a document is stored in an image memory, and the stored image signal is again inputted into the RGB conversion table, thus the number of gradation conversion tables being suppressed and image quality being improved with the cost suppressed.

As image processing is executed by repeatedly executing a first operation of storing an image signal obtained by reading a document in a storing unit, a second operation of setting appropriate parameters in an RGB gradation conversion table, a third operation of reading an image signal for a particular area on a document from the storing unit, a fourth operation of converting an image signal for the particular area in the gradation conversion table, and a fifth table of storing the converted image signal in the storing unit several times, an image quality of an image for an entire document can substantially be improved.

Further as an appropriate one can be selected from RGB gradation conversion table dedicated to image quality modes for a document written with a fluorescent pen and a thermally-transferred document according to an image area, even if there are a plurality of document types in one sheet of document, faithfulness of a copied image thereof to the original document can be improved in terms of colors.

Further an image density can be adjusted by changing an image signal outputted from a scanner prior to color correction with a gradation conversion table for an ordinary table, so that a density of a n image for a particular area in a document can easily be changed by setting an appropriate RGB conversion table.

Although only characteristic sections were described in description of Embodiment 1 to Embodiment 4 above, it is needless to say that Embodiments 1 to 4 can be applied to the same image forming apparatus. Also it is needless to say that an image forming apparatus, in which a portion of all of the features are combined therein, is within a scope of the present invention.

As described above, the forming apparatus according to the present invention comprises an image reader for reading image data by optically scanning a document image placed at a reading position; an image processor for receiving image data from the image reader and subjecting the image data to image processing; an image forming unit for forming an image on a transfer material based on the image data having been subjected to image processing by the image processor; and a particular area setting unit for setting an arbitrary image area in the document image as a particular area; wherein the image processor receives, when the particular area is set by the particular area setting unit, image data corresponding to the particular area, generates a plurality of monitor image data having been subjected by setting a different image quality mode for each data respectively; and the image forming unit receives the plurality of monitor image data, allocates each monitor image data at a different position on the same transfer material respectively, and forms a plurality of monitor images on the same transfer material, and for this reason there is provided the effect that images for particular areas (monitor images) each processed in a respective different image quality mode can be formed at different positions on one sheet of form so that an image for each mode can easily and visually be checked and an appropriate mode can easily be selected.

The image forming apparatus according to the present invention further comprises an image mode setting unit for setting, by selecting a desired monitor image from the plurality of monitor images formed on the same transfer material, image quality mode corresponding to the selected monitor image, and for this reason there is provided the effect that an image quality mode most suited to a document to be copied can easily be selected and the image quality mode can easily be set visually checking outputted monitor images without being aware of details of each image quality modes set in a color copying machine.

In the image forming apparatus according to the present invention, the image processor receives, when an image mode is set by the image mode setting unit, image data corresponding to the particular area, and generates a plurality of monitor image data having been subjected to image processing by setting a plurality of different image processing parameters corresponding to the set image mode respectively, so that image processing corresponding to manufacturers types of the particular image quality mode or particular processing for a particular type (resolution or the like) is executed and an output list is provided on one sheet of transfer material, and for this reason there is provided the effect that a user can select preferable processing from an outputted image list according to a manufacturer or a type or a resolution of a copying machine used for preparation of the copied document.

The image forming apparatus according to the present invention further comprises a specifying unit for previously specifying a plurality of image modes used for generation of an monitor image from a plurality of image quality modes; wherein said image processor receives, when an image quality mode is specified by the specifying unit, image data corresponding to said particular area, and generates a plurality of monitor image data having been subjected to image processing by using the specified image quality mode, and for this reason there is provided the effect that a user can select only an image quality mode required for outputting an image satisfying the user's intention, which enables reduction of work load.

In the image forming apparatus according to the present invention, the image processor generates, together with the monitor image data, mode identifying information indicating to which image quality mode each monitor image data corresponds to, and for this reason there is provided the effect that a number, an image quality mode or the like can be clearly shown for each monitor image and a user can easily understand in what mode each monitor image is, which improves the operability as well as the workability.

In the image forming apparatus according to the present invention, the particular area setting unit makes it possible, when setting the particular area, only to set the particular area so that a plurality of monitor images formed according to the particular area are accommodated on a specified transfer material, and for this reason there is provided the effect that such a mistake as that a monitor image can not be accommodated in one sheet of form can be prevented and a user can select an image quality mode suited to each document by visually checking the monitor images.

The image forming apparatus according to the present invention further comprises a monitor image arrangement specifying unit for specifying or changing arrangement of a plurality of monitor images formed on the transfer material, and for this reason comparison of outputted monitor image can easily be made by freely rearranging monitor images for various image quality modes, and that because of the feature as described above, a user can easily execute color correction according to a manufacturer and a type of a copying machine and also to a type of a document to be copied.

The image forming apparatus according to the present invention further comprises a monitor image size-changing unit for specifying size change of the monitor images, and for this reason there is provided the effect that a user can specify a compressed image when the entire image is to be compared to the original document, or a particular portion of an expanded image when a portion of the image is to be compared to the original document and also comparison of monitor images becomes easier. Also there is provided the effect that a copied image can be compared to the original document by setting a scale of a specified to that of a copied document.

The image forming apparatus according to the present invention comprises an image reader for reading image data by optically scanning a document image placed at a reading position; an image processor for receiving image data from said image reader and subjecting the image data to image processing; an image forming unit for forming an image on a transfer material based on the image data having been subjected to image processing by the image processor; and an image mode selector for selecting a desired image mode from a plurality of image quality modes to which image processing parameters corresponding to types of document previously read by the image reader have been set; wherein the image quality modes selector makes it possible, when selecting a desired image quality modes from the plurality of image modes, to select a set of desired image processing parameters from a plurality sets of image processing parameters in image quality modes for the same document type, and for this reason there is provided the effect that an optimal copy can be obtained from various types of document.

In the image forming apparatus according to the present invention, the plurality sets of image processing parameters selectable in the image quality modes for the same document type are those corresponding to manufacturers of printers each for forming the document type, a plurality of manufacturers of copying machines, machine types of printers, or types of copying machines, and for this reason there is provided the effect that a desired copy can be obtained according to each document.

In the image forming apparatus according to the present invention, the plurality sets of image processing parameters selectable in the image modes for the same document type are those corresponding to resolutions of the document type or color tastes of color materials, and for this reason there is provided the effect that a desired copy can be obtained according to each document.

In the image forming apparatus according to the present invention, the image modes for the same document type is any of developing paper, output from a printer using an ink jet or toner or a copy thereof, print, a thermally transferred document, or a map, and for this reason there is provided the effect that a desired copy can be obtained according to each document by preparing a plurality sets of image processing parameters for one document type or one image quality mode and selecting an appropriate set according to a document type.

In the image forming apparatus according to the present invention, the image processing parameters set to the image quality modes for the same document type include any of a space filter, a gradation conversion table, a dither, a color conversion coefficient, and a determination criteria for a character or a picture, and for this reason there is provided the effect that a desired copy can be obtained according to each document by preparing a plurality sets of image processing parameters for one document type or one image quality mode and selecting an appropriate set according to a document type.

The image forming apparatus according to the present invention comprises an image reader for reading image data by optically scanning a document image placed at a reading position; an image processor for receiving image data from said image reader and subjecting the image data to image processing; an image forming unit for forming an image on a transfer material based on the image data having been subjected to image processing by said image processor; a plurality of first gradation conversion tables capable of being switched in response to a plurality of image areas in said document image for subjecting image data outputted from the image reader to gradation conversion; a storing unit for storing therein image data outputted from said first gradation conversion table; a first input unit for inputting the image data stored in the storing unit in said first gradation conversion table; a second input unit for switching image data outputted from said image reader to image data outputted from said storing unit or vice versa and inputting the image data into said first gradation conversion table; a color correcting unit capable of being switched in response to said plurality of image area for subjecting an output signal from said image reader to color correction according to a used color material; and a second gradation conversion table capable of being switched in response to said plurality of image areas for subjecting the image data having been subjected to correction by said color correcting unit to gradation conversion, and for this reason there is provided the effect that it is possible to provide an image forming apparatus insuring faithfulness of a copied image in terms of colors to the original document regardless of a document type or setting for print and without causing cost increase.

In the image forming apparatus according to the present invention, switching of the first gradation conversion table is executed between a gradation conversion table for no gradation in which gradation conversion is not executed and a gradation conversion table for conversion in which gradation conversion is executed, and for this reason there is provided the effect that the number of required gradation conversion tables can be suppressed and an image quality can be improved without causing cost increase.

The image forming apparatus according to the present invention further comprises a control unit for setting parameters corresponding to a plurality of areas in the document image in the first gradation conversion table, reading out image data for the specified area from the storing unit according to the necessity, executing gradation conversion according to the first gradation conversion table, and storing the image data having been subjected to gradation conversion in the storing unit; wherein the control units repeats the control by required times, and for this reason there is provided the effect that optimal image processing is executed according to the necessity and an image quality of a copy of a document as a whole with a plurality of document types included therein can substantially be improved.

In the image forming apparatus according to the present invention, the first gradation conversion table has image quality modes corresponding to any of a document on development paper, a document written by a fluorescent pen, and a document printed by means of terminal transfer, and for this reason there is provided the effect that faithfulness of a copied image in terms of colors to the original document can be improved even if there are a plurality of document types included in one sheet of document.

In the image forming apparatus according to the present invention, the first gradation conversion table has modes for converting density, and for this reason there is provided the effect that a density of a copied image for a particular area in a document can easily be changed by setting an appropriate gradation conversion table.

This application is based on Japanese patent applications No. HEI 9-133032, No. HEI 9-114838, No. HEI 9-132908, No. HEI 9-215252 and No. HEI 10-080982 filed in the Japanese Patent Office on Apr. 10, 1997, May 2, 1997, May 6, 1997, Aug. 8, 1997 and Mar. 27, 1998, respectively, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image forming apparatus, comprising:

an image reader configured to read image data by optically scanning a document image placed at a reading position;

an image processor configured to receive said image data from said image reader and to process said image data to form processed image data;

an image separation unit configured to automatically separate the document image into at least a character area and a picture area; and an image forming unit configured to form an image on a transfer material based on the processed image data, wherein said image processor includes:

a plurality of first gradation conversion units from which an initial gradation conversion unit is selected for an image area having been selected from a plurality of image areas in said document image, said initial gradation conversion unit configured to subject image data corresponding to said selected image area to gradation conversion;

a storing unit configured to store therein image data outputted from said initial gradation conversion unit;

a first selector unit configured to output the image data stored in said storing unit into said image forming unit;

a second selector unit configured to select between image data outputted from said image reader and image data outputted from said first selector unit, and to input the selected image data into said initial gradation conversion unit;

a color correcting unit configured to operate in response to each of said plurality of image areas and configured to subject an output signal from said image reader to color correction according to a used color material; and a second gradation conversion unit configured to operate in response to each of said plurality of image areas and configured to subject the image data having been subjected to correction by said color correcting unit to gradation conversion, wherein said image processor performs first image processing for the character area, and said image processor performs second image processing, different from said first image processing, for the picture area.

2. The image forming apparatus according to claim 1, wherein selection of said initial gradation conversion unit is executed between a gradation conversion unit in which gradation conversion is not executed and another gradation conversion unit in which gradation conversion is executed.

3. The image forming apparatus according to claim 1, further comprising:

a control unit configured to set parameters corresponding to each of a plurality of areas in said document image in said initial gradation conversion unit, read out image data for the specified area from said storing unit as needed, execute gradation conversion according to said initial gradation conversion unit, and store the image data having been subjected to gradation conversion in said storing unit, wherein said control unit repeats an operation a predetermined number of times.

4. The image forming apparatus according to claim 1, wherein said initial gradation conversion unit has image quality modes corresponding to one of a document on development paper, a document written by a fluorescent pen, and a document printed by way of terminal transfer.

5. The image forming apparatus according to claim 1, wherein said initial gradation conversion unit has modes for converting density.

* * * * *